US012111962B2

(12) United States Patent
Dedonato et al.

(10) Patent No.: US 12,111,962 B2
(45) Date of Patent: Oct. 8, 2024

(54) USER INTERFACES AND DEVICE SETTINGS BASED ON USER IDENTIFICATION

(71) Applicant: Apple Inc., Cupertino, CA (US)

(72) Inventors: Amy Dedonato, San Francisco, CA (US); Gregg Suzuki, Daly City, CA (US); Kristi Elaine Schmidt Bauerly, Los Altos, CA (US); Peter D. Anton, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/582,902

(22) Filed: Jan. 24, 2022

(65) Prior Publication Data

US 2022/0269333 A1 Aug. 25, 2022

Related U.S. Application Data

(60) Provisional application No. 63/151,597, filed on Feb. 19, 2021.

(51) Int. Cl.
| | | |
|---|---|---|
| G06F 3/01 | (2006.01) | |
| G04G 9/00 | (2006.01) | |
| G04G 21/02 | (2010.01) | |
| G06F 3/0482 | (2013.01) | |
| G06F 21/32 | (2013.01) | |
| G06V 40/18 | (2022.01) | |

(52) U.S. Cl.
CPC ............. *G06F 3/011* (2013.01); *G04G 9/007* (2013.01); *G04G 21/025* (2013.01); *G06F 3/0482* (2013.01); *G06F 21/32* (2013.01); *G06V 40/197* (2022.01)

(58) Field of Classification Search
CPC ........ G06F 3/011; G06F 3/0482; G06F 21/32; G06F 1/163; G06F 1/1686; G06F 1/1694; G06F 3/013; G06F 3/017; G06F 3/04842; G06F 3/04847; G04G 9/007; G04G 21/025; G04G 9/0064; G04G 21/08; G06V 40/197; G06V 10/34; G06V 40/70
See application file for complete search history.

(56) References Cited

U.S. PATENT DOCUMENTS

| | | |
|---|---|---|
| 6,230,188 B1 | 5/2001 | Marcus |
| 8,112,787 B2 | 2/2012 | Buer |
| 8,239,471 B2 | 8/2012 | McIsaac et al. |
| 8,689,001 B1 | 4/2014 | Satish et al. |
| 9,313,170 B1 | 4/2016 | Shoemaker et al. |

(Continued)

FOREIGN PATENT DOCUMENTS

| | | |
|---|---|---|
| CN | 101529832 A | 9/2009 |
| CN | 104487927 A | 4/2015 |

(Continued)

OTHER PUBLICATIONS

Applicant-Initiated Interview Summary received for U.S. Appl. No. 16/667,174, mailed on Oct. 25, 2021, 2 pages.

(Continued)

*Primary Examiner* — Rami R Okasha
(74) *Attorney, Agent, or Firm* — DLA Piper LLP (US)

(57) ABSTRACT

The present disclosure generally relates to user interface for electronic devices, including wearable electronic devices, and device settings based on user identification.

30 Claims, 27 Drawing Sheets

(56) References Cited

U.S. PATENT DOCUMENTS

| | | | |
|---|---|---|---|
| 10,067,636 B2* | 9/2018 | Palmaro | G06F 3/017 |
| 10,510,047 B1 | 12/2019 | Benkreira et al. | |
| 10,510,073 B2 | 12/2019 | Wong et al. | |
| 10,572,024 B1* | 2/2020 | Saba | G01S 15/88 |
| 10,698,701 B1 | 6/2020 | De Jong et al. | |
| 11,107,265 B2* | 8/2021 | Tang | G06F 1/163 |
| 2003/0046557 A1 | 3/2003 | Miller et al. | |
| 2005/0021975 A1 | 1/2005 | Liu | |
| 2007/0013662 A1 | 1/2007 | Fauth | |
| 2007/0078786 A1 | 4/2007 | Bous et al. | |
| 2007/0245148 A1 | 10/2007 | Buer | |
| 2007/0284432 A1 | 12/2007 | Abouyounes | |
| 2008/0216171 A1* | 9/2008 | Sano | H04L 9/32 726/19 |
| 2009/0055910 A1 | 2/2009 | Lee | |
| 2009/0067689 A1 | 3/2009 | Porter et al. | |
| 2010/0217780 A1 | 8/2010 | Erola et al. | |
| 2011/0126280 A1 | 5/2011 | Asano | |
| 2011/0138450 A1 | 6/2011 | Kesanupalli et al. | |
| 2013/0198823 A1 | 8/2013 | Hitchcock et al. | |
| 2013/0321279 A1* | 12/2013 | Engle | G06F 3/0304 345/168 |
| 2014/0055591 A1* | 2/2014 | Katz | G06F 21/32 348/78 |
| 2014/0191927 A1* | 7/2014 | Cho | G06F 3/011 345/8 |
| 2014/0195815 A1 | 7/2014 | Taveau et al. | |
| 2014/0281561 A1 | 9/2014 | Etchegoyen et al. | |
| 2015/0046336 A1 | 2/2015 | Cummins | |
| 2015/0058191 A1 | 2/2015 | Khan et al. | |
| 2015/0067496 A1 | 3/2015 | Missig et al. | |
| 2015/0067602 A1 | 3/2015 | Bernstein et al. | |
| 2015/0074615 A1 | 3/2015 | Han et al. | |
| 2015/0089636 A1 | 3/2015 | Martynov et al. | |
| 2015/0134956 A1 | 5/2015 | Stachura et al. | |
| 2015/0135310 A1* | 5/2015 | Lee | G06F 1/1684 726/20 |
| 2015/0142141 A1* | 5/2015 | Okabayashi | G05B 15/02 700/83 |
| 2015/0149899 A1 | 5/2015 | Bernstein et al. | |
| 2015/0161371 A1* | 6/2015 | Hoshi | G06F 21/445 726/19 |
| 2015/0170146 A1 | 6/2015 | Ji et al. | |
| 2015/0186636 A1 | 7/2015 | Tharappel et al. | |
| 2015/0317638 A1 | 11/2015 | Donaldson | |
| 2015/0324615 A1 | 11/2015 | Matsumoto et al. | |
| 2015/0348001 A1 | 12/2015 | Van Os et al. | |
| 2016/0007007 A1* | 1/2016 | Nevet | G06V 40/166 726/19 |
| 2016/0078434 A1 | 3/2016 | Huxham et al. | |
| 2016/0092877 A1 | 3/2016 | Chew | |
| 2016/0131902 A1* | 5/2016 | Ambrus | G06F 3/013 345/156 |
| 2016/0142407 A1 | 5/2016 | Chun et al. | |
| 2016/0164866 A1 | 6/2016 | Oberheide et al. | |
| 2016/0179210 A1* | 6/2016 | Sakai | G06F 3/018 345/156 |
| 2016/0241555 A1 | 8/2016 | Vo et al. | |
| 2016/0248840 A1 | 8/2016 | Bockhold et al. | |
| 2016/0277371 A1 | 9/2016 | Maxwell | |
| 2016/0292404 A1* | 10/2016 | Tseng | G06F 21/31 |
| 2016/0313801 A1* | 10/2016 | Wagner | G06F 1/163 |
| 2016/0350522 A1 | 12/2016 | Chi et al. | |
| 2017/0024091 A1 | 1/2017 | Hosier, Jr. | |
| 2017/0024581 A1 | 1/2017 | Grubel et al. | |
| 2017/0045946 A1* | 2/2017 | Smoot | G06F 1/163 |
| 2017/0046704 A1 | 2/2017 | Büchner et al. | |
| 2017/0063763 A1 | 3/2017 | Hu et al. | |
| 2017/0147186 A1 | 5/2017 | Velusamy et al. | |
| 2017/0147800 A1 | 5/2017 | Huang et al. | |
| 2017/0147861 A1 | 5/2017 | Li | |
| 2017/0228791 A1 | 8/2017 | Min | |
| 2017/0331817 A1 | 11/2017 | Votaw et al. | |
| 2017/0337542 A1 | 11/2017 | Kim et al. | |
| 2018/0013773 A1 | 1/2018 | Valgenti et al. | |
| 2018/0052514 A1* | 2/2018 | Liu | G06V 40/10 |
| 2018/0114010 A1 | 4/2018 | Van Os et al. | |
| 2018/0213059 A1 | 7/2018 | Alsina et al. | |
| 2018/0225436 A1* | 8/2018 | Dadu | H04W 4/80 |
| 2018/0234496 A1 | 8/2018 | Ratias | |
| 2018/0310070 A1 | 10/2018 | Murray | |
| 2018/0338720 A1* | 11/2018 | Gupta | G06F 1/163 |
| 2018/0348861 A1* | 12/2018 | Uscinski | G06F 3/012 |
| 2018/0373318 A1* | 12/2018 | Yang | G06F 3/012 |
| 2019/0080072 A1* | 3/2019 | Van Os | G06F 3/016 |
| 2019/0250708 A1* | 8/2019 | Gupta | G06T 19/006 |
| 2019/0286290 A1* | 9/2019 | Banerjee | G06F 9/4451 |
| 2020/0043236 A1* | 2/2020 | Miller | G02B 27/0179 |
| 2020/0065470 A1 | 2/2020 | Van Os et al. | |
| 2020/0089311 A1* | 3/2020 | Chou | G06F 3/012 |
| 2020/0244659 A1 | 7/2020 | Kunda et al. | |
| 2020/0387227 A1* | 12/2020 | Erivantcev | G06F 3/011 |
| 2021/0049021 A1 | 2/2021 | De Jong et al. | |
| 2021/0204115 A1* | 7/2021 | Gorsica, IV | H04W 4/70 |
| 2021/0306344 A1 | 9/2021 | Han et al. | |
| 2021/0350012 A1* | 11/2021 | Delaney | H04L 63/105 |
| 2021/0400032 A1 | 12/2021 | Ryu et al. | |
| 2022/0109671 A1* | 4/2022 | Zaman | H04W 12/37 |
| 2022/0269767 A1 | 8/2022 | Van Os et al. | |
| 2023/0014800 A1 | 1/2023 | De Jong et al. | |

FOREIGN PATENT DOCUMENTS

| | | |
|---|---|---|
| CN | 104508618 A | 4/2015 |
| CN | 104580184 A | 4/2015 |
| CN | 104903835 A | 9/2015 |
| CN | 105357196 A | 2/2016 |
| CN | 105474224 A | 4/2016 |
| CN | 105612543 A | 5/2016 |
| CN | 105794244 A | 7/2016 |
| CN | 106503506 A | 3/2017 |
| EP | 1950678 A1 | 7/2008 |
| EP | 3273378 A1 | 1/2018 |
| KR | 10-2016-0105296 A | 9/2016 |
| WO | 2007/041834 A1 | 4/2007 |
| WO | 2014/105263 A1 | 7/2014 |
| WO | 2015/112868 A1 | 7/2015 |
| WO | 2015/153990 A1 | 10/2015 |
| WO | 2020/039327 A1 | 2/2020 |

OTHER PUBLICATIONS

Brief Communication Regarding Oral Proceedings received for European Patent Application No. 17865509.8, mailed on Nov. 1, 2021, 2 pages.
Certificate of Examination received for Australian Patent Application No. 2017101425, mailed on Jan. 17, 2018, 2 pages.
Decision to Grant received for Danish Patent Application No. PA201770804, mailed on Jun. 28, 2019., 2 pages.
Decision to Refuse received for European Patent Application No. 17865509.8, mailed on Jan. 4, 2022, 13 pages.
European Search Report received for European Patent Application No. 17865509.8, mailed on Oct. 2, 2019, 5 pages.
Intention to Grant received for Danish Patent Application No. PA201770804, mailed on Apr. 10, 2019, 2 pages.
International Preliminary Report on Patentability received for PCT Patent Application No. PCT/US2017/058368, mailed on Feb. 19, 2019, 5 pages.
International Preliminary Report on Patentability received for PCT Patent Application No. PCT/US2020/035464, mailed on Dec. 16, 2021, 7 pages.
International Search Report and Written Opinion received for PCT Patent Application No. PCT/US2017/058368, mailed on Feb. 23, 2018, 12 pages.
International Search Report and Written Opinion received for PCT Patent Application No. PCT/US2020/035464, mailed on Sep. 14, 2020, 10 pages.
International Search Report and Written Opinion received for PCT Patent Application No. PCT/US2021/036410, mailed on Sep. 15, 2021, 13 pages.

(56) References Cited

OTHER PUBLICATIONS

Invitation to Pay Additional Fee received for PCT Patent Application No. PCT/US2017/058368, mailed on Dec. 14, 2017, 2 pages.
Minutes of the Oral Proceedings received for European Patent Application No. 17865509.8, mailed on Jan. 4, 2022, 8 pages.
Non-Final Office Action received for U.S. Appl. No. 15/782,068, mailed on Jun. 3, 2019, 17 Pages.
Non-Final Office Action received for U.S. Appl. No. 16/667,174, mailed on Jun. 24, 2021, 16 pages.
Non-Final Office Action received for U.S. Appl. No. 16/915,572, mailed on Dec. 8, 2021, 20 pages.
Non-Final Office Action received for U.S. Appl. No. 17/104,750, mailed on Dec. 17, 2021, 25 pages.
Notice of Acceptance received for Australian Patent Application No. 2017317605, mailed on Aug. 28, 2019, 3 Pages.
Notice of Acceptance received for Australian Patent Application No. 2019250143, mailed on Jan. 29, 2021, 3 pages.
Notice of Allowance received for Chinese Patent Application No. 201910498825.3, mailed on Mar. 8, 2021, 2 pages (1 page of English Translation and 1 page of Official Copy).
Notice of Allowance received for U.S. Appl. No. 15/782,068, mailed on Sep. 24, 2019, 7 pages.
Notice of Allowance received for U.S. Appl. No. 16/585,178, mailed on Jan. 29, 2020, 9 pages.
Office Action received for Australian Patent Application No. 2017317605, mailed on Apr. 11, 2019, 4 pages.
Office Action received for Australian Patent Application No. 2017317605, mailed on Feb. 22, 2019, 4 pages.
Office Action received for Australian Patent Application No. 2019250143, mailed on Dec. 3, 2020, 5 pages.
Office Action received for Australian Patent Application No. 2019250143, mailed on Sep. 15, 2020, 5 pages.
Office Action received for Chinese Patent Application No. 201780069966.2, mailed on Jun. 1, 2021, 23 pages (12 pages of English Translation and 11 pages of Official Copy).
Office Action received for Chinese Patent Application No. 201910498825.3, mailed on May 21, 2020, 16 pages (9 pages of English Translation and 7 pages of Official Copy).
Office Action received for Danish Patent Application No. PA201770804, mailed on Feb. 1, 2018, 9 pages.
Office Action received for Danish Patent Application No. PA201770804, mailed on May 31, 2018, 6 pages.
Office Action received for Danish Patent Application No. PA201770804, mailed on Nov. 6, 2018., 4 pages.
Office Action received for European Patent Application No. 17865509.8, mailed on Jul. 28, 2020, 8 pages.
Office Action received for European Patent Application No. 17865509.8, mailed on Oct. 10, 2019, 6 pages.
Office Action received for German Patent Application No. 202017005507.4, mailed on Feb. 5, 2018, 2 pages (1 page of English Translation and 1 page of Official Copy).
Result of Consultation received for European Patent Application No. 17865509.8, mailed on Nov. 2, 2021, 3 pages.
Search Report received for Germany Patent Application No. 202017005507.4, mailed on Jan. 2, 2019, 6 pages (1 page of English Translation and 5 pages of Official Copy).
Summons to Attend Oral Proceedings received for European Patent Application No. 17865509.8, mailed on Jul. 14, 2021, 8 pages.
Applicant-Initiated Interview Summary received for U.S. Appl. No. 17/949,963, mailed on May 23, 2023, 2 pages.
Intention to Grant received for European Patent Application No. 20746436.3, mailed on May 12, 2023, 9 pages.
International Preliminary Report on Patentability received for PCT Patent Application No. PCT/US2021/036410, mailed on Jan. 5, 2023, 7 pages.
Applicant-Initiated Interview Summary received for U.S. Appl. No. 16/915,572, mailed on Apr. 13, 2022, 2 pages.
Applicant-Initiated Interview Summary received for U.S. Appl. No. 17/104,750, mailed on Feb. 11, 2022, 4 pages.

Corrected Notice of Allowance received for U.S. Appl. No. 16/667,174, mailed on Apr. 12, 2022, 2 pages.
Corrected Notice of Allowance received for U.S. Appl. No. 16/667,174, mailed on Mar. 9, 2022, 2 pages.
Extended European Search Report received for European Patent Application No. 22159861.8, mailed on Jul. 8, 2022, 10 pages.
Final Office Action received for U.S. Appl. No. 17/104,750, mailed on Jun. 9, 2022, 31 pages.
International Search Report and Written Opinion received for PCT Patent Application No. PCT/US2022/016804, mailed on Jul. 25, 2022, 18 pages.
International Search Report and Written Opinion received for PCT Patent Application No. PCT/US2022/016804, mailed on Jul. 28, 2022, 18 pages.
Invitation to Pay Additional Fees and Partial International Search Report received for PCT Patent Application No. PCT/US2022/016804, mailed on Jun. 2, 2022, 13 pages.
Notice of Acceptance received for Australian Patent Application No. 2021202959, mailed on Jun. 8, 2022, 3 pages.
Notice of Allowance received for Chinese Patent Application No. 201780069966.2, mailed on Feb. 23, 2022, 4 pages (1 page of English Translation and 3 pages of Official Copy).
Notice of Allowance received for Chinese Patent Application No. 202080040618.4, mailed on Aug. 9, 2022, 7 pages (4 pages of English Translation and 3 pages of Official Copy).
Notice of Allowance received for U.S. Appl. No. 16/667,174, mailed on Feb. 24, 2022, 7 pages.
Notice of Allowance received for U.S. Appl. No. 16/667,174, mailed on Sep. 13, 2022, 7 pages.
Notice of Allowance received for U.S. Appl. No. 16/915,572, mailed on Jul. 21, 2022, 6 pages.
Notice of Allowance received for U.S. Appl. No. 17/104,750, mailed on Dec. 7, 2022, 9 pages.
Office Action received for Australian Patent Application No. 2021202959, mailed on Apr. 22, 2022, 6 pages.
Office Action received for European Patent Application No. 20746436.3, mailed on Sep. 15, 2022, 7 pages.
Bate Ben, "Effective Examples of Mobile App Login Screens", Available online at: https://web.archive.org/web/20180406231319/https://1stwebdesigner.com/mobile-app-login-screens/, Mar. 30, 2018, 7 pages.
Thirumavalavan Viruthagiri, "A Spamless Internet", Available at: https://www.dombox.org/dombox. pdf, Feb. 2019, 299 pages.
Thirumavalavan Viruthagiri, "Dombox—The Zero Spam Mail System", Available Online at: https://web.archive.org/web/20190217071649/https://medium.com/@Viruthagiri/dombox-the-zero-spam-mail-system-2b08ff7 432cd, Feb. 17, 2019, 32 pages.
Non-Final Office Action received for U.S. Appl. No. 17/949,963, mailed on Apr. 26, 2023, 10 pages.
Decision to Grant received for European Patent Application No. 20746436.3, mailed on Sep. 21, 2023, 2 pages.
Final Office Action received for U.S. Appl. No. 17/949,963, mailed on Sep. 13, 2023, 15 pages.
International Preliminary Report on Patentability received for PCT Patent Application No. PCT/US2022/016804, mailed on Aug. 31, 2023, 13 pages.
Extended European Search Report received for European Patent Application No. 23197205.0, mailed on Dec. 21, 2023. 7 pages.
Jonathan Bernstein, "How to Check Your Google and Facebook Connected Apps", Online Available at: https://web.archive.org/web/20190117093115/https://www.online-techtips.com/computer-tips/check-google-facebook-connected-apps/, Apr. 12, 2018, 12 pages.
Non-Final Office Action received for U.S. Appl. No. 17/743,363, mailed on Dec. 20, 2023, 8 pages.
Senseful,"Swipe to delete vs. edit button tapped on iPhone", Online Available at: https://stackoverflow.com/questions/3647125/swipe-to-delete-vs-edit-button-tapped-on-iphone, Sep. 5, 2010, 4 pages.
Notice of Allowance received for U.S. Appl. No. 17/949,963, mailed on Jan. 31, 2024, 9 pages.
Applicant-Initiated Interview Summary received for U.S. Appl. No. 17/949,963, mailed on Oct. 31, 2023, 2 pages.
Corrected Notice of Allowance received for U.S. Appl. No. 17/743,363, mailed on Mar. 13, 2024, 2 pages.

(56) References Cited

OTHER PUBLICATIONS

Notice of Allowance received for U.S. Appl. No. 17/743,363, mailed on Mar. 5, 2024, 8 pages.
Corrected Notice of Allowance received for U.S. Appl. No. 17/743,363, mailed on Apr. 24, 2024, 2 pages.
Intention to Grant received for European Patent Application No. 22159861.8, mailed on Apr. 5, 2024, 9 pages.

* cited by examiner

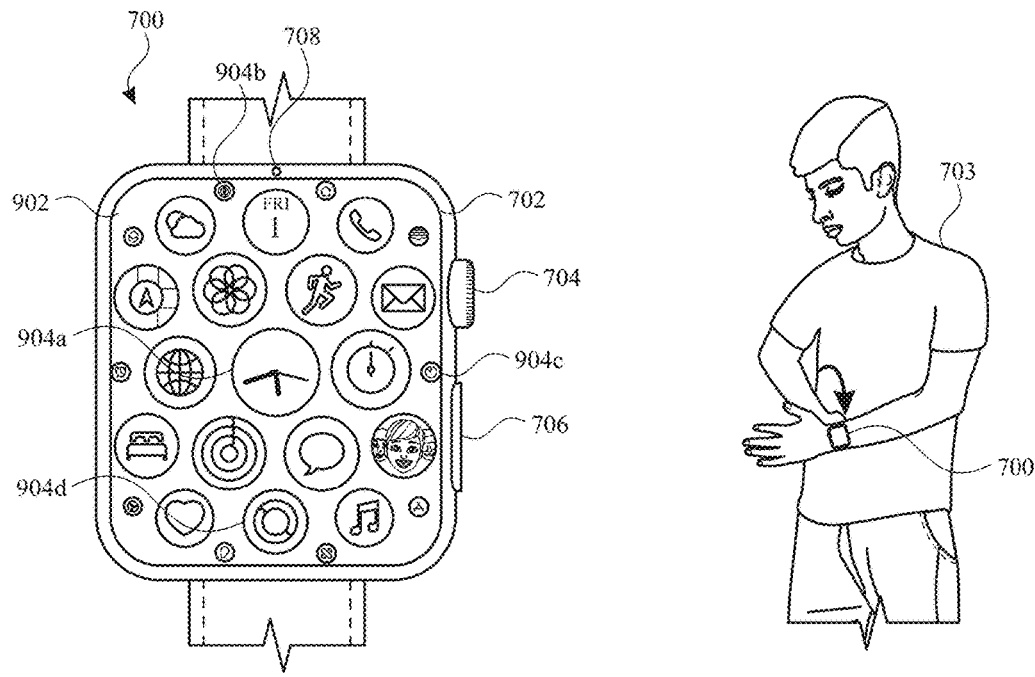
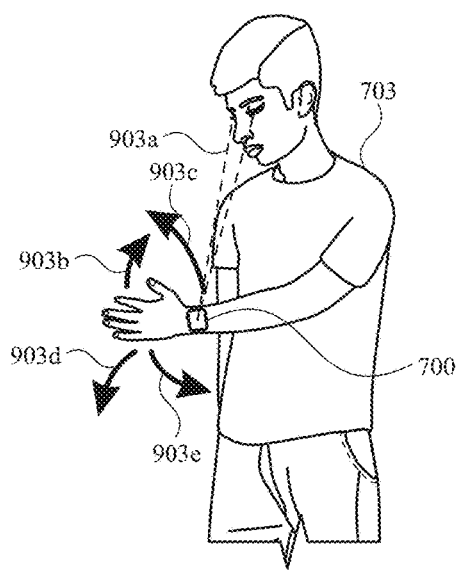
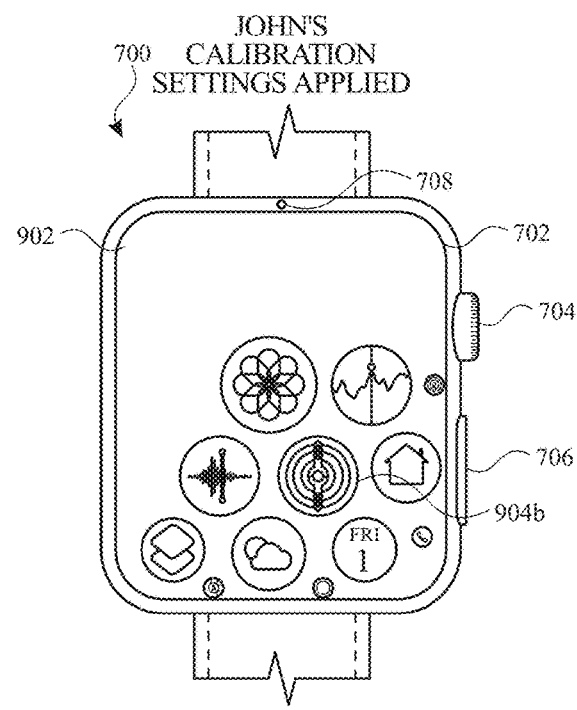
*FIGURE 9A*
*FIGURE 9B*
*FIGURE 9C*

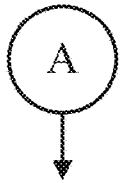

1008

1010

1016
In accordance with a determination that the respective user is not the first user:

1018
Generate a response to the input based on the movement or position of the portion of the respective user's body and without using the first set of device calibration settings that are specific to the first user.

1020
In accordance with a determination that the respective user is an unregistered user:

1022
Generate a response to the input based on the movement or position of the portion of the respective user's body and a second set of device calibration settings that are different from the first set of device calibration settings and that represent a set of guest device calibration settings for an unregistered user.

1024
In accordance with a determination that the respective user is a second user that has previously registered with the computer system different from the first user:

1026
Generate a response to the input based on the movement or position of the portion of the respective user's body and a third set of device calibration settings that are different from the first set of device calibration settings and are specific to the second user.

*FIGURE 10B*

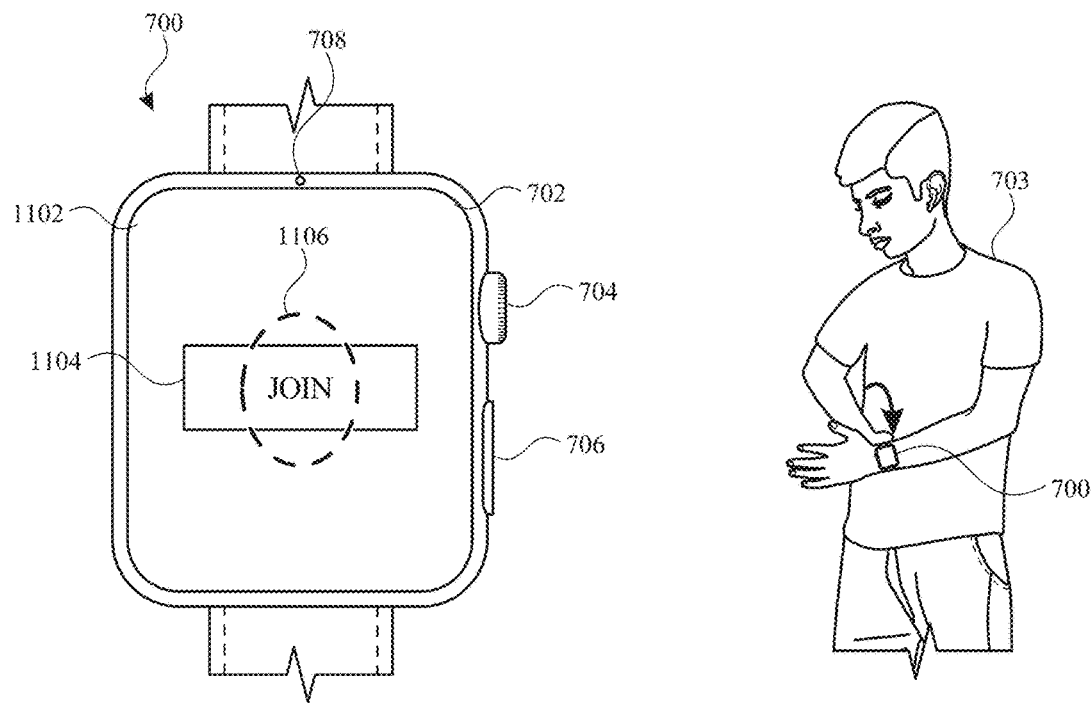
*FIGURE 11A*
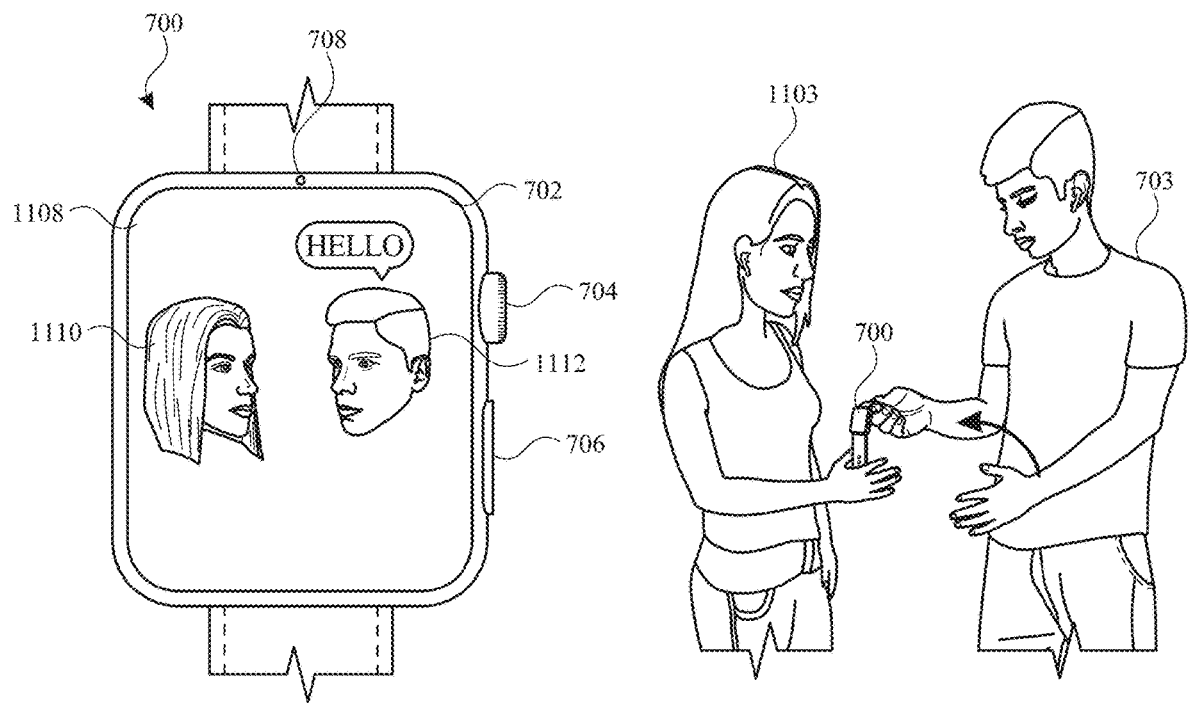
*FIGURE 11B*  *FIGURE 11C*

1204

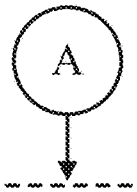

1216
The avatar is visually representative of a user of the first computer system.

1218
The avatar is visually representative of a user of a second computer system different from the first computer system.

1220
The avatar is displayed at one or more computer systems of one or more users that are interacting with the user of the respective computer system.

1222
At least a portion of the avatar is displayed via a display generation component that is in communication with the respective computer system.

1402
While the computer system is placed on a body of a first user:

1404
Display, via the display generation component, a first user interface corresponding to a first application, wherein the first user interface is displayed in a first mode with permitted access to a plurality of features associated with the first user.

1406
While the first user interface is displayed in the first mode with permitted access to the plurality of features associated with the first user:

1408
Detect, via the one or more input devices, that the computer system has been removed from the body of the first user.

1410
After detecting that the computer system has been removed from the body of the first user:

1412
Detect, via the one or more input devices, that the computer system has been placed on a body of a respective user

*FIGURE 14A*

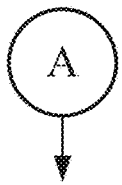

1414
In response to detecting that the computer system has been placed on the body of the respective user:

1416
In accordance with a determination that biometric information received via the one or more input devices corresponds to the first user:

1418
Display, via the display generation component, the first user interface in the first mode with permitted access to the plurality of features associated with the first user

1420
In accordance with a determination that biometric information received via the one or more input devices does not correspond to the first user, and that a set of handover criteria has been satisfied:

1422
Display, via the display generation component, the first user interface in a second mode with restricted access to one or more of the plurality of features associated with the first user.

1424
In accordance with a determination that biometric information received via the one or more input devices does not correspond to the first user, and that a set of handover criteria has not been satisfied:

1426
Forgo display of the first user interface.

*FIGURE 14B*

USER INTERFACES AND DEVICE SETTINGS BASED ON USER IDENTIFICATION

CROSS-REFERENCE TO RELATED APPLICATION

This application claims priority to U.S. Provisional Patent Application No. 63/151,597, entitled "USER INTERFACES AND DEVICE SETTINGS BASED ON USER IDENTIFICATION," filed on Feb. 19, 2021, the contents of which is hereby incorporated by reference in its entirety.

TECHNICAL FIELD

The present disclosure relates generally to computer systems that are in communication with a display generation component and, optionally, one or more input devices that provide computer-generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems in communication with a display generation component and, optionally, one or more input devices are reduced or eliminated by the disclosed systems. In some embodiments, the computer system is a desktop computer with an associated display. In some embodiments, the computer system is a portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface.

There is a need for electronic devices with improved methods and interfaces for automatically displaying one or more user interfaces and/or automatically applying one or more device settings based on identification (e.g., automatic identification) of a user. Such methods and interfaces may complement or replace conventional methods for interacting with a computer system. Such methods and interfaces reduce the number, extent, and/or the nature of the inputs from a user and produce a more efficient human-machine interface.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9F illustrate exemplary user interfaces for automatically applying one or more device calibration settings based on identification of a user, in accordance with some embodiments.

FIGS. 10A-10B are a flow diagram illustrating an exemplary process for automatically applying one or more device calibration settings based on identification of a user, in accordance with some embodiments.

FIGS. 11A-11F illustrate exemplary user interfaces for automatically applying and displaying a user avatar based on identification of a user, in accordance with some embodiments.

FIGS. 12A-12B are a flow diagram illustrating an exemplary process for automatically applying and displaying a user avatar based on identification of a user, in accordance with some embodiments.

FIGS. 14A-14B illustrate exemplary user interfaces for displaying content based on handover criteria, in accordance with some embodiments.

DESCRIPTION OF EMBODIMENTS

Figure 1:
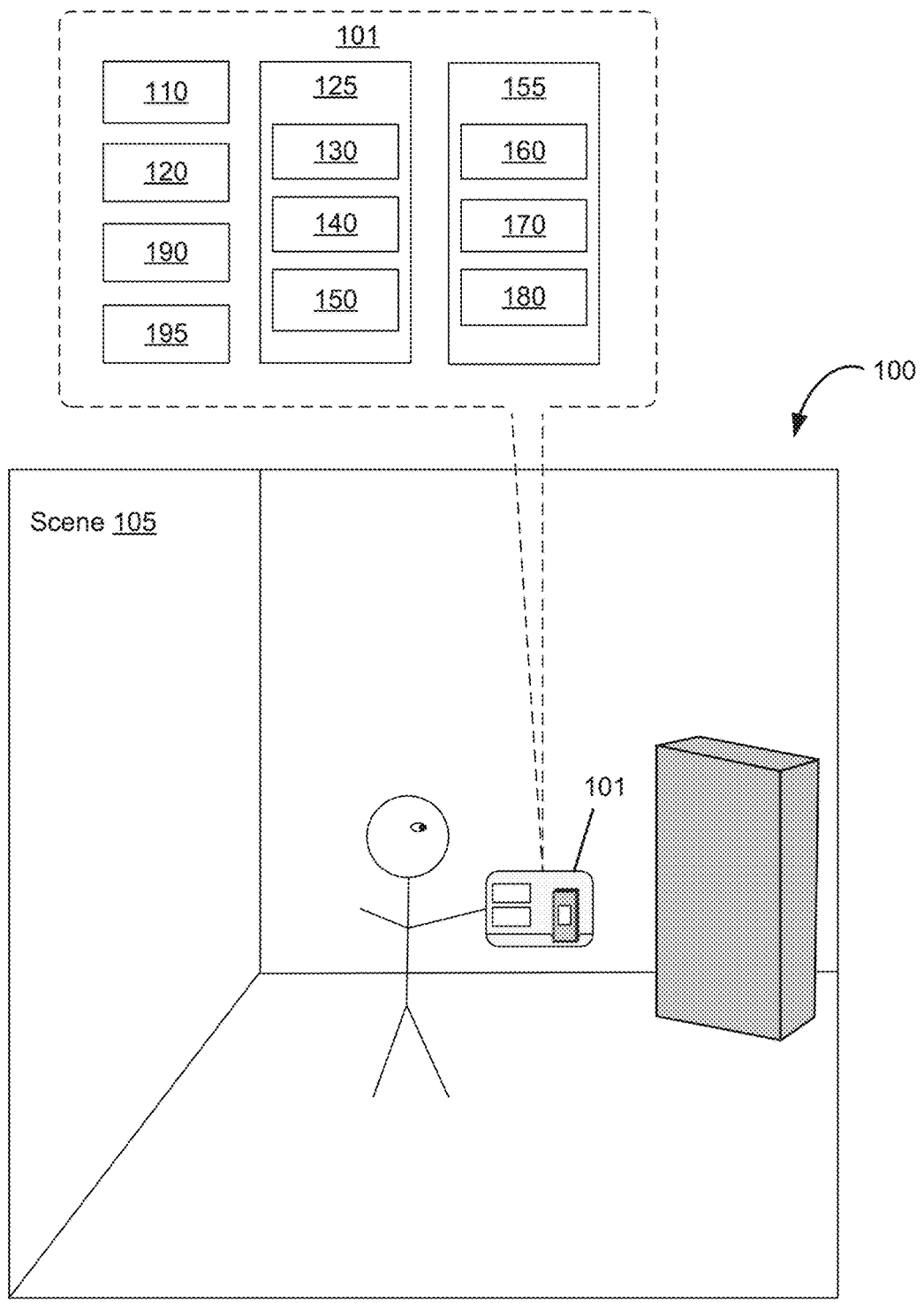
FIG. 1 illustrates an operating environment of a computer system for providing extended reality (XR) experiences, in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system automatically applies and/or enables one or more user settings based on identification of a user. The computer system is in communication with a display generation component and one or more input devices. The computer system detects that at least a portion of the computer system has been placed on a body of a respective user. In response to detecting that the computer system has been placed on the body of the respective user, and in accordance with a determination that biometric information received via the one or more input devices corresponds to a first registered user, the computer system enables the computer system to be used with one or more settings associated with a first user account associated with the first registered user. In response to detecting that the computer system has been placed on the body of the respective user, and in accordance with a determination that the biometric information received via the one or more input devices does not correspond to the first registered user, the computer system forgoes enabling the computer system to be used with the one or more settings associated with the first user account associated with the first registered user.

In some embodiments, a computer system automatically applies device calibration settings based on identification of a user. The computer system is in communication with a display generation component and one or more input devices. The computer system detects that at least a portion of the computer system has been placed on a body of a respective user. Subsequent to detecting that at least a portion of the computer system has been placed on the body of the respective user, the computer system detects an input from the respective user based on a movement or position of at least a portion of the body of the respective user. In response to detecting the input from the respective user, the computer system responds to the input from the respective user. In accordance with a determination that the respective user is a first user that has previously registered with the computer system, the computer system generates a response to the input based on the movement or position of the portion of the respective user's body and a first set of device calibration settings that are specific to the first user. In accordance with a determination that the respective user is not the first user, the computer system generates a response to the input based on the movement or position of the portion of the respective user's body and without using the first set of device calibration settings that are specific to the first user.

In some embodiments, a first computer system displays a digital avatar based on identification of a user. The first computer system is in communication with a display generation component and one or more input devices. The first computer system detects a request to display an avatar of a user of a respective computer system. In response to detecting the request to display the avatar, the first computer system displays an avatar of the user of the respective computer system. In accordance with a determination that the user of the respective computer system is a registered user of the respective computer system, the first computer system displays the avatar with an appearance that was selected by the user of the respective computer system, wherein the avatar moves based on movement of the user detected by one or more sensors of the respective computer system. In accordance with a determination that the user of the respective computer system is not a registered user of the respective computer system, the first computer system displays the avatar with a placeholder appearance that is not representative of an appearance of the user of the respective computer system, wherein the avatar moves based on movement of the user detected by one or more sensors of the respective computer system.

In some embodiments, a computer system displays content based on identification of a user and based on handover criteria. The computer system is in communication with a display generation component and one or more input devices. While the computer system is placed on a body of a first user, the computer system displays, via the display generation component, a first user interface corresponding to a first application, wherein the first user interface is displayed in a first mode with permitted access to a plurality of features associated with the first user. While the first user interface is displayed in the first mode with permitted access to the plurality of features associated with the first user, the computer system detects, via the one or more input devices, that the computer system has been removed from the body of the first user. After detecting that the computer system has been removed from the body of the first user, the computer system detects, via the one or more input devices, that the computer system has been placed on a body of a respective user. In response to detecting that the computer system has been placed on the body of the respective user, and in accordance with a determination that biometric information received via the one or more input devices corresponds to the first user, the computer system displays, via the display generation component, the first user interface in the first mode with permitted access to the plurality of features associated with the first user. In response to detecting that the computer system has been placed on the body of the respective user, and in accordance with a determination that the biometric information received via the one or more input devices does not correspond to the first user, and that a set of handover criteria has been satisfied, the computer system displays, via the display generation component, the first user interface in a second mode with restricted access to one or more of the plurality of features associated with the first user.

FIGS. 1-6 provide a description of example computer systems for providing XR experiences to users. FIGS. 7A-7H illustrate exemplary user interfaces for automatically applying one or more user settings based on identification of a user. FIG. 8 is a flow diagram illustrating methods of automatically applying one or more user settings based on identification of a user in accordance with some embodiments. The user interfaces in FIGS. 7A-7H are used to illustrate the processes described below, including the processes in FIG. 8. FIGS. 9A-9F illustrate exemplary user interfaces for automatically applying one or more device calibration settings based on identification of a user. FIGS. 10A-10B are a flow diagram illustrating methods of automatically applying one or more device calibration settings based on identification of a user in accordance with some embodiments. The user interfaces in FIGS. 9A-9F are used to illustrate the processes described below, including the processes in FIGS. 10A-10B. FIGS. 11A-11F illustrate exemplary user interfaces for automatically applying and displaying a user avatar based on identification of a user. FIGS. 12A-12B are a flow diagram illustrating methods of automatically applying and displaying a user avatar based on identification of a user in accordance with some embodiments. The user interfaces in FIGS. 11A-11F are used to illustrate the processes described below, including the processes in FIGS. 12A-12B. FIGS. 13A-13K illustrate exemplary user interfaces for displaying content based on handover criteria. FIGS. 14A-14B are a flow diagram illustrating methods of displaying content based on handover criteria in accordance with some embodiments. The user interfaces in FIGS. 13A-13K are used to illustrate the processes described below, including the processes in FIGS. 14A-14B.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display.

Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
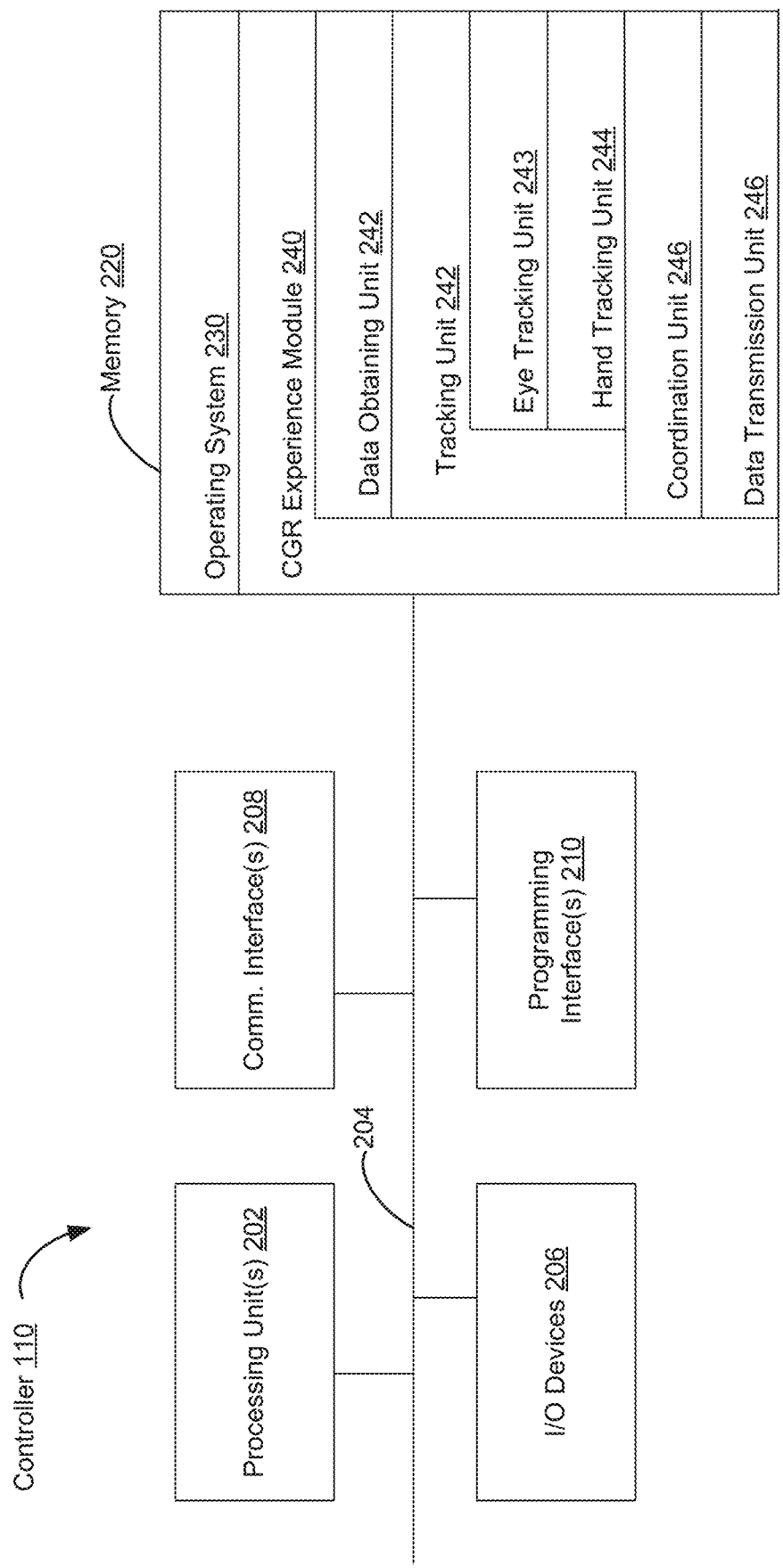
FIG. 2 is a block diagram illustrating a controller of a computer system that is configured to manage and coordinate an XR experience for the user, in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 245 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
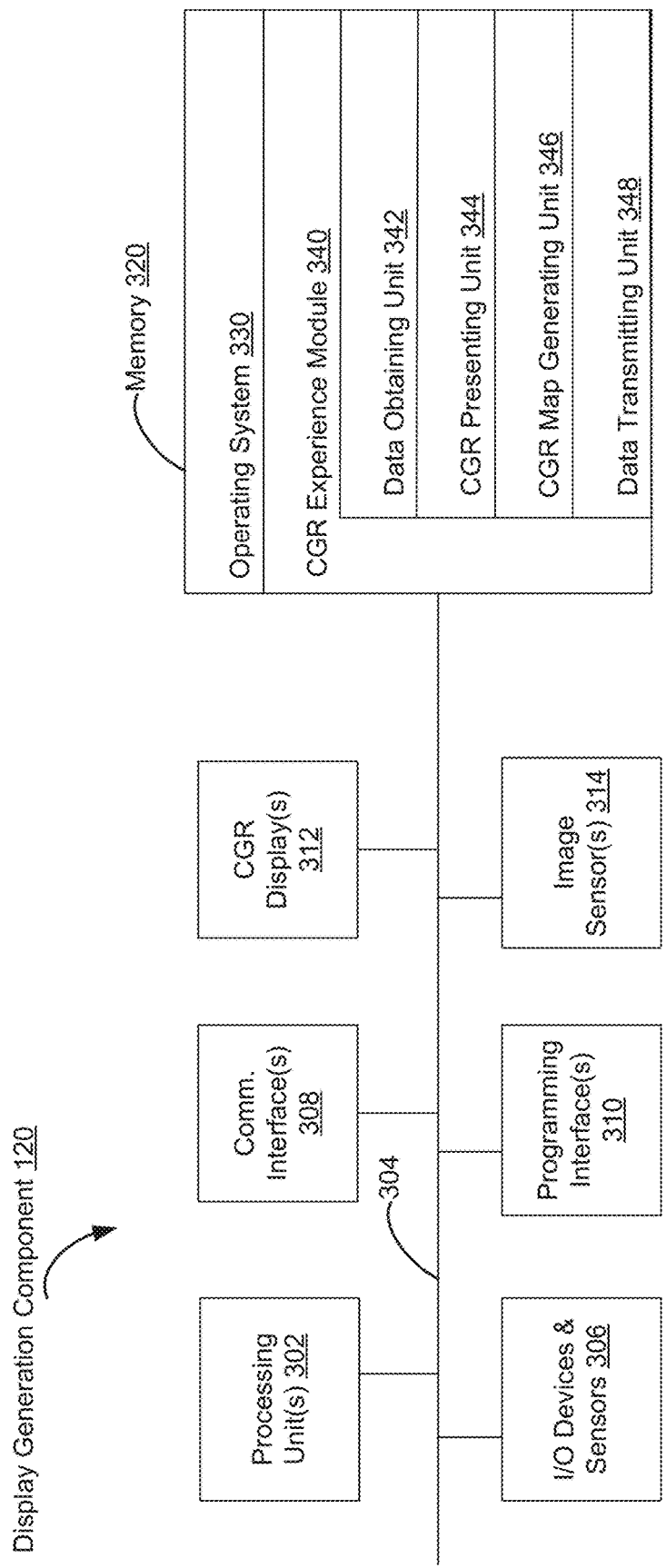
FIG. 3 is a block diagram illustrating a display generation component of a computer system that is configured to provide a visual component of the XR experience to the user, in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (LR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
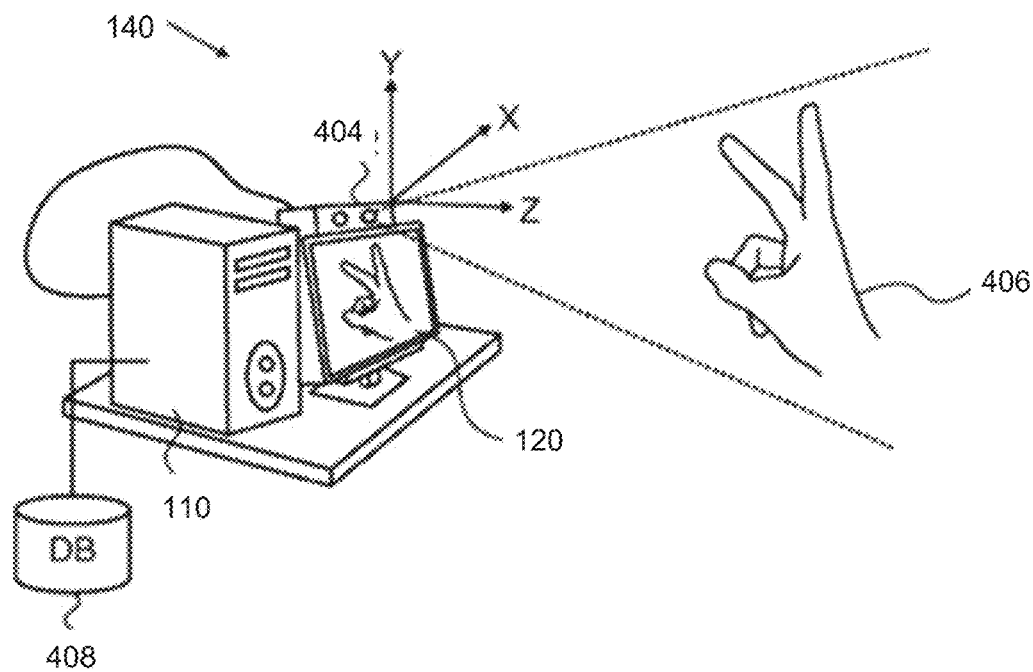
FIG. 4 illustrates a hand tracking unit of a computer system that is configured to capture gesture inputs of the user, in accordance with some embodiments.
Figure 4:
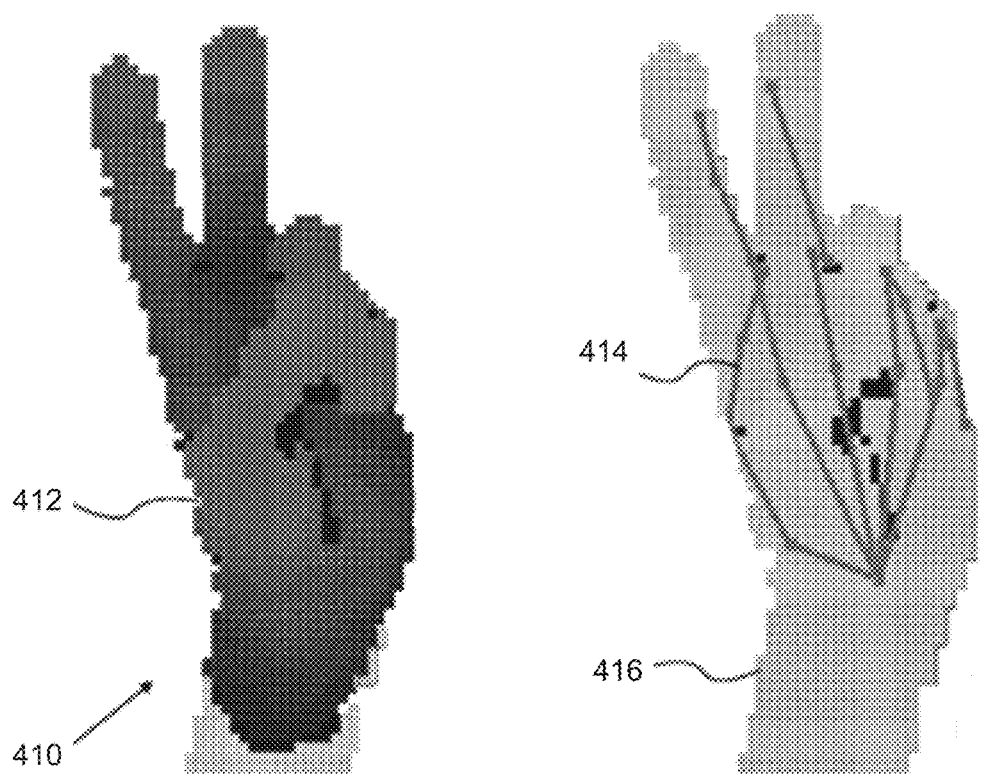

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
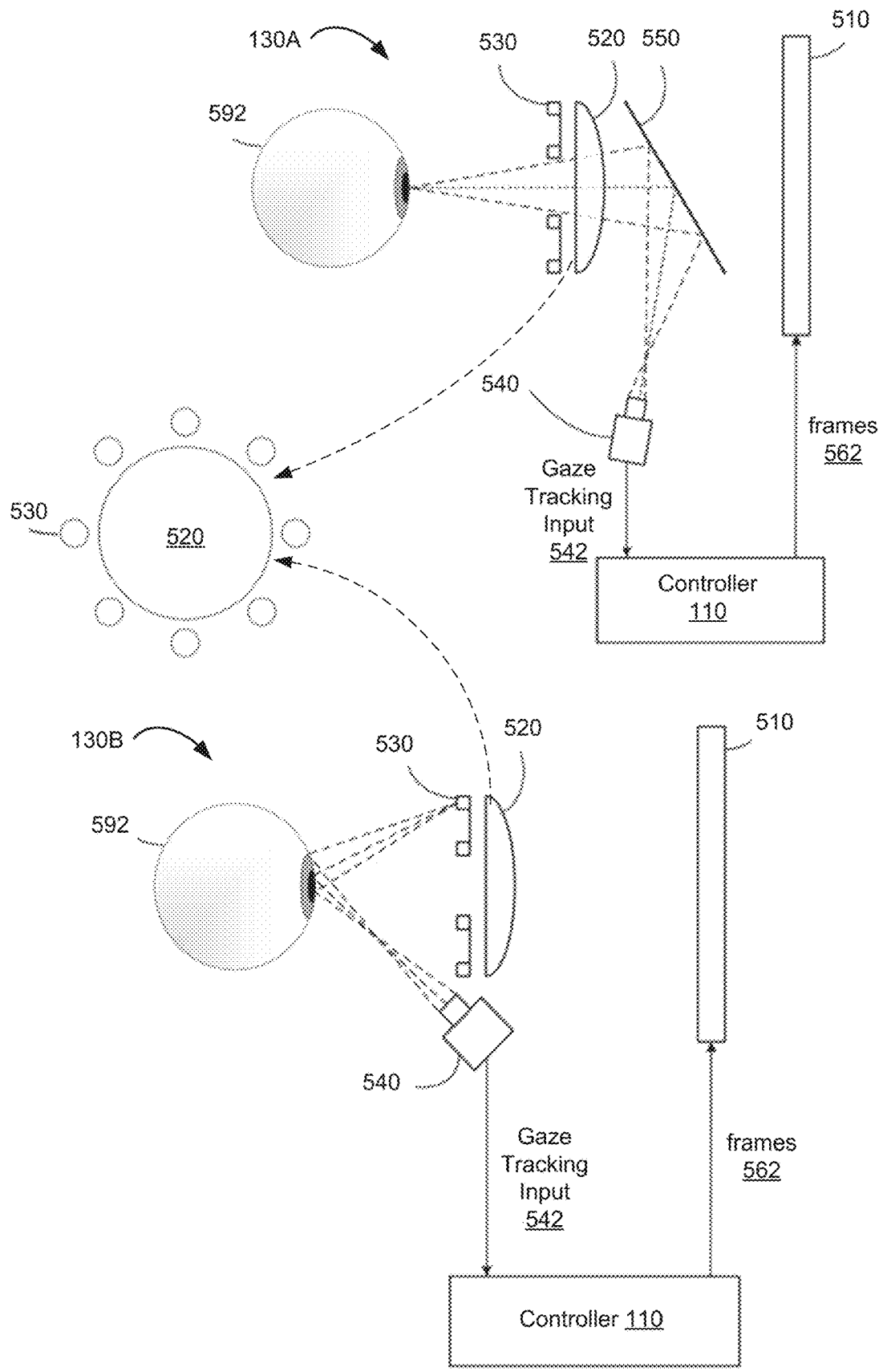
FIG. 5 illustrates an eye tracking unit of a computer system that is configured to capture gaze inputs of the user, in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 may be located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
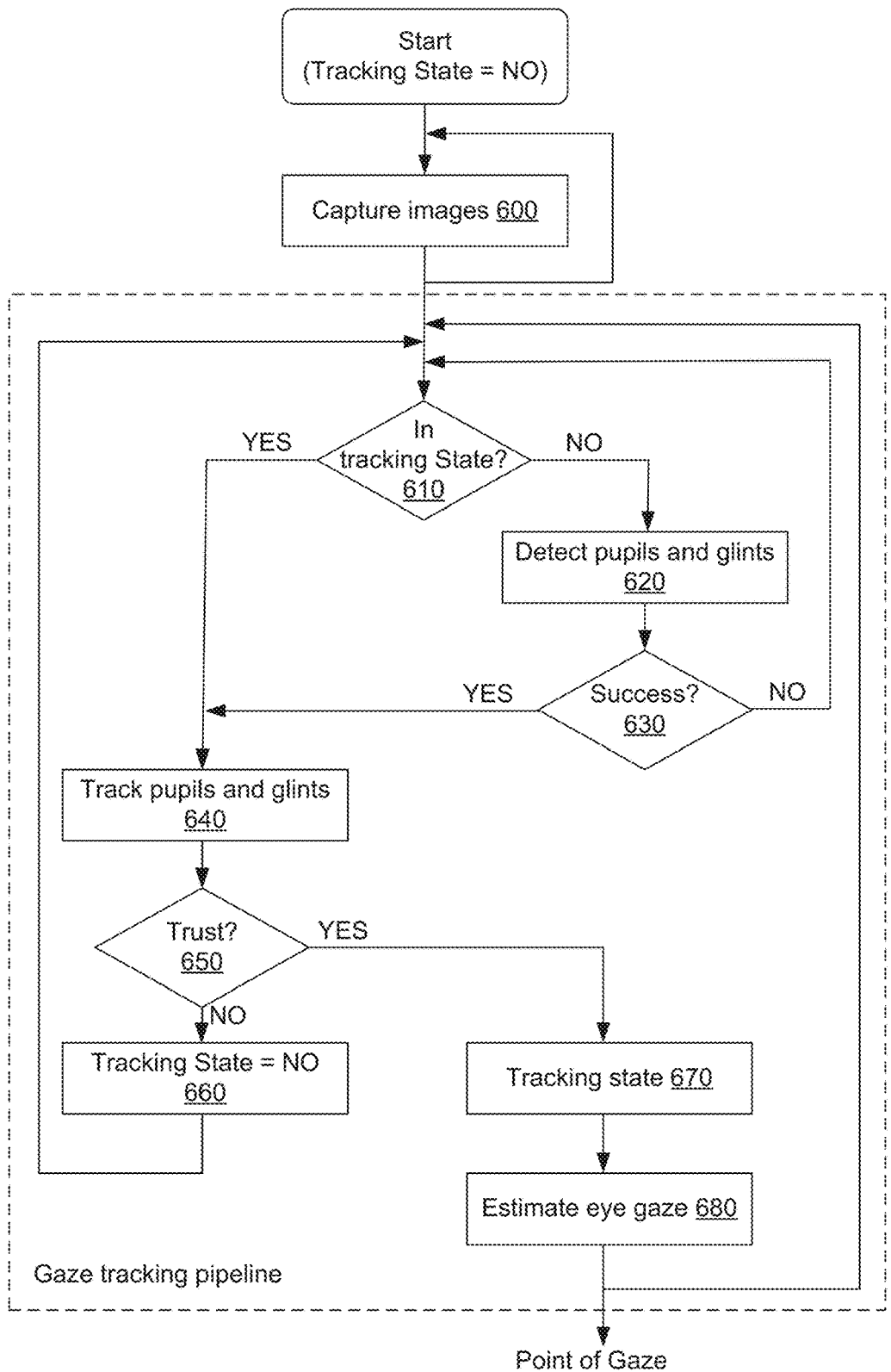
FIG. 6 is a flowchart illustrating a glint-assisted gaze tracking pipeline, in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associates Processes

Attention is now directed towards embodiments of user interfaces ("UI") and associated processes that may be implemented on a computer system, such as a portable multifunction device or a head-mounted device, in communication with a display generation component and (optionally) one or more input devices.

FIGS. 7A-7H illustrate exemplary user interfaces for automatically applying one or more user settings based on identification of a user, in accordance with some embodiments. The user interfaces in these figures are used to illustrate the processes described below, including the processes in FIG. 8.

Figure 7A:
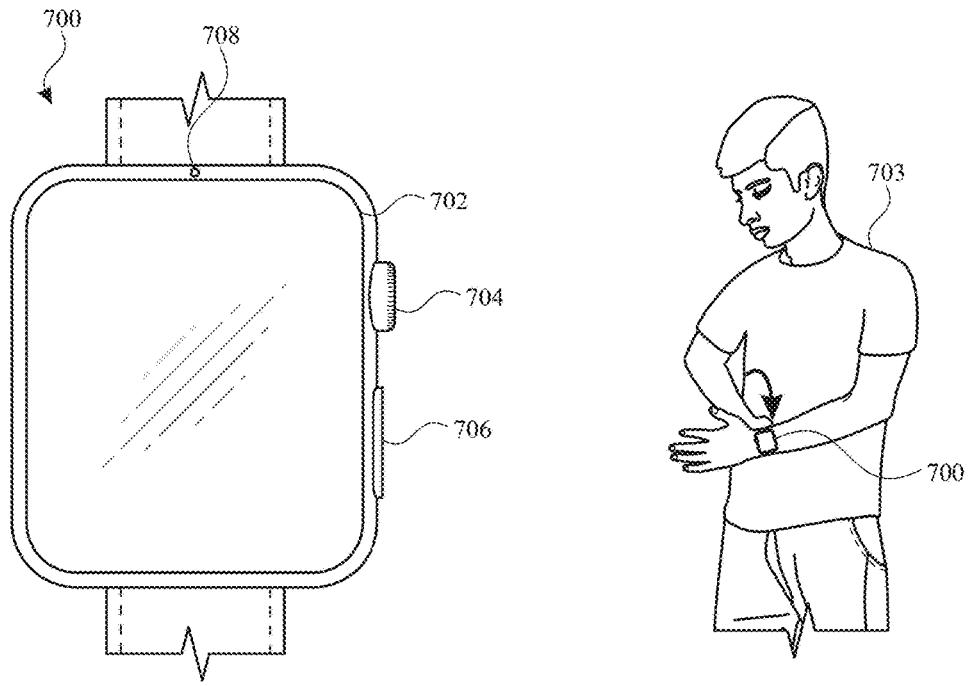
FIGS. 7A-7H illustrate exemplary user interfaces for automatically applying one or more user settings based on identification of a user, in accordance with some embodiments.
Figure 8:
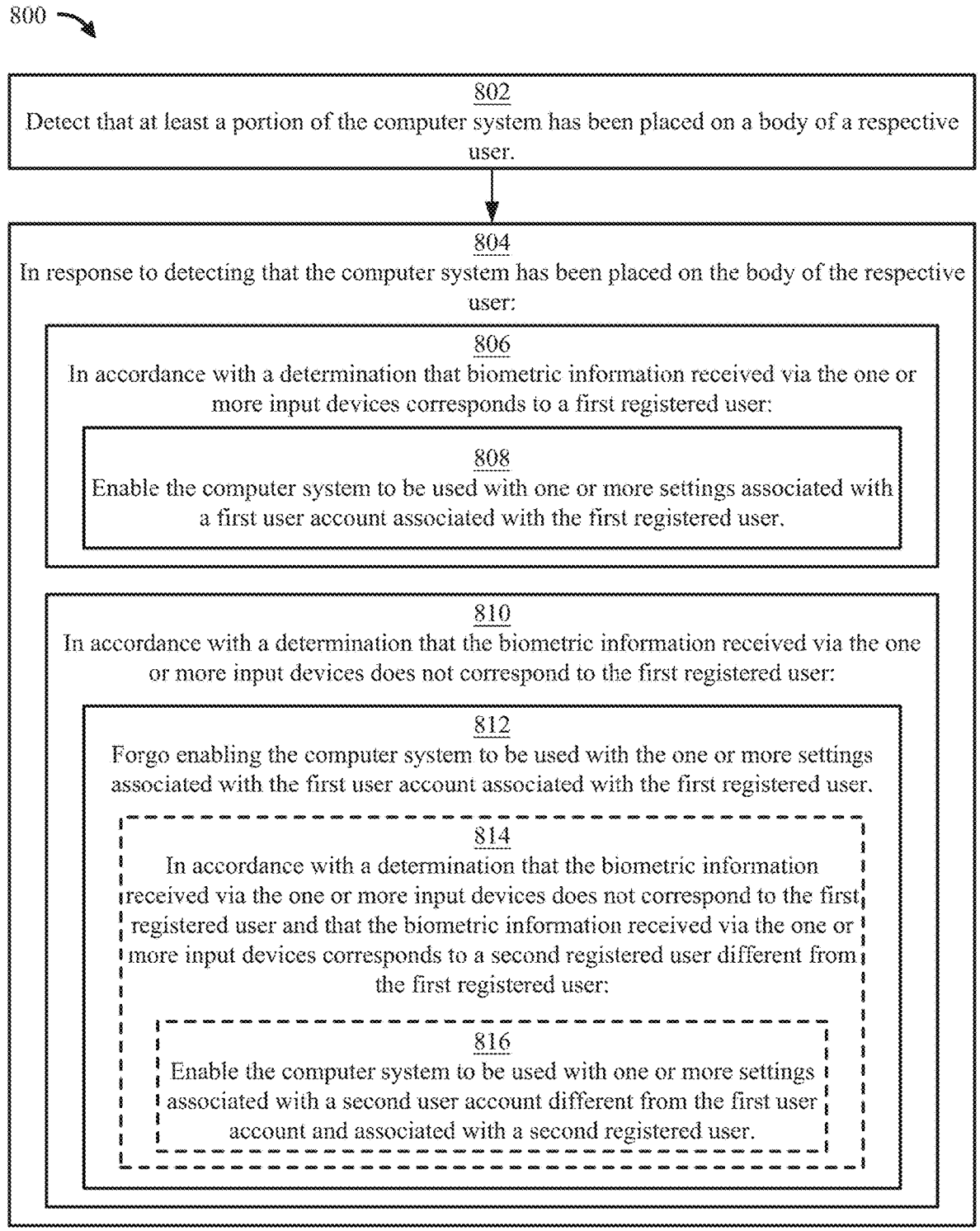
FIG. 8 is a flow diagram illustrating an exemplary process for automatically applying one or more user settings based on identification of a user, in accordance with some embodiments.

FIG. 7A depicts an electronic device 700, which is a smartwatch that includes a touch-sensitive display 702, a rotatable and depressible input mechanism 704 (e.g., rotatable and depressible in relation to a housing or frame of the device), a button 706, and a camera 708. In some embodiments described below, electronic device 700 is a wearable smartwatch device. In some embodiments, electronic device 700 is a smart phone, a tablet, a head-mounted system (e.g., a headset), or other computer system that includes and/or is in communication with a display device (e.g., display screen, projection device, and the like). Electronic device 700 is a computer system (e.g., computer system 101 in FIG. 1).

At FIG. 7A, user 703 places electronic device 700 on his wrist. Electronic device 700 detects (e.g., via one or more sensors) that electronic device 700 has been placed on the body of a user. In some embodiments, electronic device 700 detects that one or more criteria have been satisfied indicating that electronic device 700 has been placed on the body of a user. In some embodiments, where electronic device 700 is a head-mounted system, electronic device 700 detects (e.g., via one or more sensors) that electronic device 700 has been placed onto a head and/or face of the user.

In FIG. 7A, in response to detecting that electronic device 700 has been placed on the body of a user, electronic device 700 attempts to automatically identify user 703. In some embodiments, electronic device 700 can attempt to identify user 703 in various ways. For example, electronic device 700 optionally attempts to automatically identify the user based on biometric information, such as facial recognition, eye (e.g., iris) recognition, and/or fingerprint recognition. In FIG. 7A, electronic device 700 collects biometric information (e.g., a facial scan and/or eye (e.g., iris) scan using camera 708) in response to detecting that electronic device 700 has been placed on the body of the user.

Figure 7B:
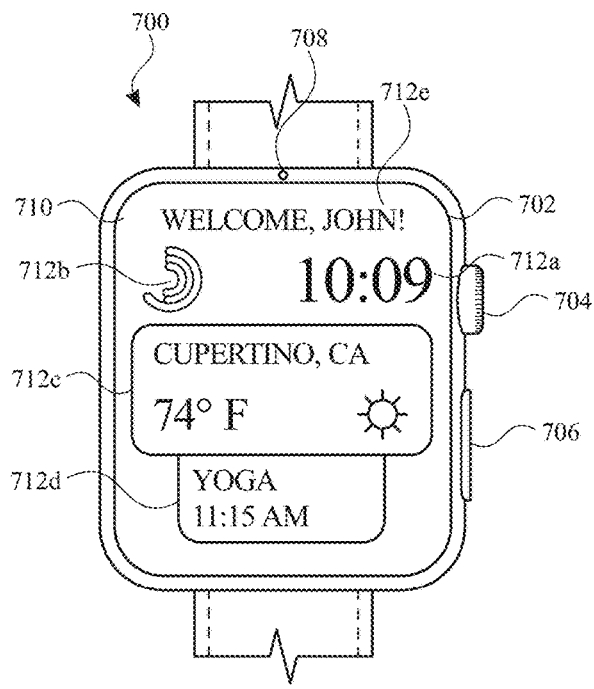

FIG. 7B depicts a first example scenario in which electronic device 700 has identified user 703 (e.g., based on biometric information) as a first registered user, John. For example, electronic device 700 compares the collected biometric information to enrolled biometric information (of electronic device 700) to identify user 703 as the first registered user (and thereby optionally logging user 703 into electronic device 700 using a first user account). In response to identifying user 703 as the first registered user, electronic device 700 displays a personalized user interface 710 that corresponds to (e.g., corresponds uniquely to and/or specifically to) the first registered user. In the depicted embodiment, personalized user interface 710 is indicative of a successful login into a first user account associated with the first registered user. In some embodiments, electronic device 700 logging into a user account associated with a registered user includes displaying a personalized user interface associated with the registered user, applying one or more device settings associated with (e.g., specified by) the registered user, providing access to secure information associated with the registered user, and the like. In some embodiments, applying one or more device settings associated with the registered user includes, for example, applying and/or displaying a visual representation (e.g., an avatar) corresponding to the registered user and/or applying one or more device calibration settings (e.g., eye movement calibration, hand movement calibration, and/or head movement calibration) corresponding to the registered user. Personalized user interface 710 includes a visual indication 712e indicative of successful identification of user 703 as the first registered user, and indicative of a successful login into the first user account associated with the first registered user.

Personalized user interface 710 includes a time indication 712a and multiple affordances (e.g., watch face complications). In some embodiments, each affordance is associated with an application on device 700 (e.g., electronic device 700 launches an associated application upon selection of a respective affordance and/or electronic device 700 displays information from the associated application upon selection of a respective affordance).

Physical activity affordance 712b is indicative of a measured level of physical activity of the first registered user, and is specific to (e.g., corresponds uniquely to) the first registered user. Physical activity complication 712b includes three concentric rings, and each ring is indicative of a different physical activity metric for the first registered user. For example, a first ring is indicative of a number of calories burned by the first registered user during the current day, a second ring is indicative of a number of minutes the user has been active during the current day, and a third ring is indicative of the number of hours during the day in which the user has stood up for a threshold amount of time or a threshold number of times. In the depicted embodiment, the first ring is indicative of progress towards a calorie goal, the second ring is indicative of progress towards a target number of exercise minutes for a day, and the third ring is indicative of progress towards a target number of standing hours for a day. Physical activity affordance 712b is optionally based on physical activity of user 703 collected (e.g., by other devices and transmitted to electronic device 700) before user 703 wears electronic device 700.

Weather affordance 712c indicates current weather conditions for a particular location. In some embodiments, the particular location is associated with (e.g., is selected by and/or is specified by) the first registered user.

Calendar affordance 712d indicates one or more upcoming calendar appointments for the first registered user. In some embodiments, the one or more upcoming calendar appointments are identified based on calendar information specific to the first registered user. In FIG. 7B, calendar affordance 712d indicates that the next upcoming event in the first registered user's calendar is a calendar entry titled "YOGA" at 11:15 am.

In some embodiments, personalized user interface 710 is specific to the first registered user at least in that the first registered user has selected and/or specified one or more aspects of personalized user interface 710. For example, the first registered user has selected affordances 712a-d and the displayed locations and/or positions of affordances 712a-d, and the first registered user has specified the information to the displayed in affordances 712a-d (e.g., the first registered user has specified the location for weather affordance 712c, and has entered the calendar information to be displayed in calendar affordance 712d). Different users would see different affordances and/or different information in each affordance, an example of which is discussed below with reference to FIG. 7C.

In FIG. 7B, electronic device 700 is a smartwatch, and depicts personalized user interface 710 having personalized affordances/watch face complications. In some embodiments, electronic device 700 is a head-mounted system (e.g., a headset). In some embodiments in which electronic device 700 is a head-mounted system, personalized user interface 710 includes similar personalized affordances to those discussed above. In some embodiments in which electronic device 700 is a head-mounted system, personalized user interface 710 includes a personalized virtual environment (e.g., a personalized virtual environment that has been selected by and/or that is specific to the registered user), a real-time virtual communication session user interface that is associated with (e.g., specific to) the registered user, and/or one or more application icons that are associated with the registered user (e.g., selected by and/or specific to the registered user).

Figure 7C:
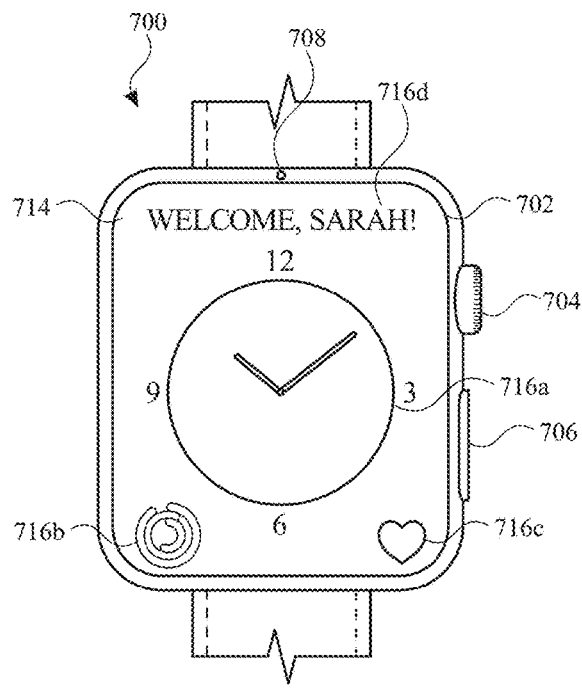

FIG. 7C depicts a second example scenario in which, in response to detecting that electronic device 700 has been placed on the body of a user, electronic device 700 has identified (e.g., based on biometric information) user 703 as a second registered user, Sarah. In response to identifying user 703 as the second registered user, electronic device 700 displays a second personalized user interface 714 that corresponds to (e.g., corresponds uniquely to and/or specifically to) the second registered user and is different from personalized user interface 710. In the depicted embodiment, personalized user interface 714 is indicative of a successful login into a second user account associated with the second registered user. Personalized user interface 714 includes a visual indication 716*d* indicative of successful identification of user 703 as the second registered user, and indicative of a successful login into the second user account associated with the second registered user. In some embodiments, logging into a user account associated with the second registered user includes displaying a personalized user interface associated with the second registered user, applying one or more device settings associated with (e.g., specified by) the second registered user, providing access to secure information associated with the second registered user, and the like. In some embodiments, applying one or more device settings associated with the second registered user can include, for example, applying and/or displaying a visual representation (e.g., an avatar) corresponding to the second registered user and/or applying one or more device calibration settings (e.g., eye movement calibration, hand movement calibration, and/or head movement calibration) corresponding to the second registered user.

As illustrated in FIG. 7C, personalized user interface 714 has a different visual appearance from personalized user interface 710. For example, personalized user interface 714 has an analog time indication 716*a*, whereas personalized user interface 710 has a digital time indication 712*a*. Personalized user interface 714 has a physical activity affordance 716*b*, similar to physical activity affordance 712*b* in FIG. 7B, but physical activity affordance 716*b* is displayed at a different position on display 702. Additionally, physical activity affordance 716*b* corresponds to (e.g., is specific to) the second registered user, and displays physical activity metrics indicative of (e.g., measured based on) the physical activity of the second registered user (whereas physical activity affordance 712*b* displays physical activity metrics indicative of physical activity of the first registered user). Personalized user interface 714 also has heart rate affordance 716*c*, which was selected for inclusion in personalized user interface 714 by the second registered user, but was not selected for inclusion in personalized user interface 710 by the first registered user.

In FIG. 7C, electronic device 700 is a smartwatch. In some embodiments, electronic device 700 is a head-mounted system (e.g., a headset). In some embodiments in which electronic device 700 is a head-mounted system, personalized user interface 714 includes similar personalized affordances to those discussed above. In some embodiments in which electronic device 700 is a head-mounted system, personalized user interface 714 includes a personalized virtual environment (e.g., a personalized virtual environment that has been selected by and/or that is specific to the registered user), a real-time virtual communication session user interface that is associated with (e.g., specific to) the registered user, and/or one or more application icons that are associated with the registered user (e.g., selected by and/or specific to the registered user). In some embodiments in which electronic device 700 is a head-mounted system, logging into a user account associated with the second registered user includes displaying a personalized user interface associated with the second registered user, applying one or more device settings associated with (e.g., specified by) the second registered user, providing access to secure information associated with the second registered user, and the like. In some embodiments, applying one or more device settings associated with the second registered user can include, for example, applying and/or displaying a visual representation (e.g., an avatar) corresponding to the second registered user and/or applying one or more device calibration settings (e.g., eye movement calibration, hand movement calibration, and/or head movement calibration) corresponding to the second registered user.

Figure 7D:
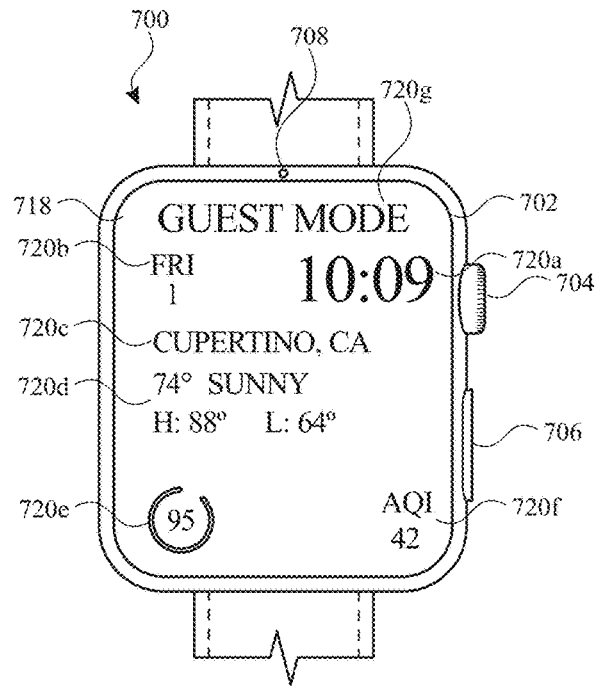

FIG. 7D depicts a third example scenario in which, in response to detecting that electronic device 700 has been placed on the body of a user, electronic device 700 has determined that user 703 is not a previously registered user (e.g., electronic device 700 has failed to match biometric information from user 703 with stored biometric information for a previously registered user). In response to the determination that user 703 is not a previously registered user, electronic device 700 displays guest user interface 718. Guest user interface 718 is indicative of identification of user 703 as a guest user (e.g., indicative of a failure to identify user 703 as a registered user), and includes visual indication 720*g* that is indicative of identification of the user 703 as a guest user (e.g., indicative of a failure to identify user 703 as a registered user).

Guest user interface 718 is not associated with a registered user, and contains (e.g., only) information that is not specific to any individual user. For example, guest user interface 718 includes time indication 720*a*, date affordance 720*b*, weather affordance 720*c*, battery level affordance 720*e*, and air quality affordance 720*f*.

Figure 7E:
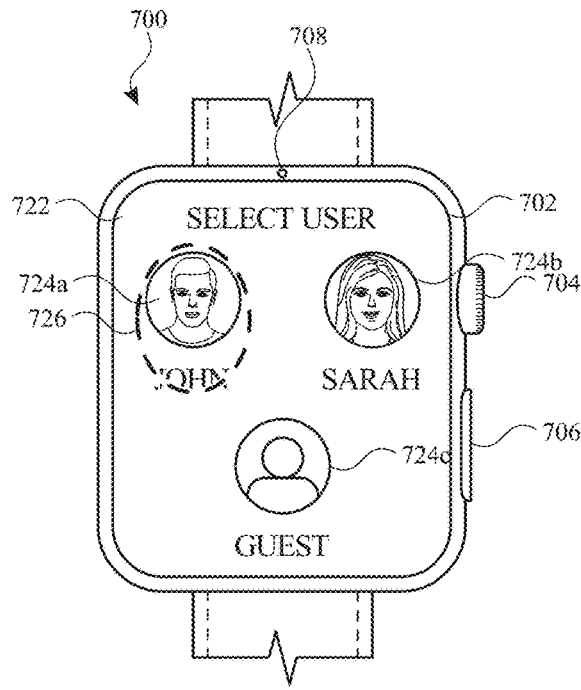

FIG. 7E depicts an alternative embodiment of the third example scenario in which electronic device 700 has determined that user 703 is not a previously registered user (e.g., has failed to match biometric information from user 703 with stored biometric information for a previously registered user). In some embodiments, in response to the determination that user 703 is not a previously registered user, electronic device 700 displays user picker user interface 722. User picker user interface 722 includes selectable objects 724*a*-724*c*, which correspond to different users. First selectable object 724*a* corresponds to a first registered user, John, second selectable object 724*b* corresponds to a second registered user, Sarah, and third selectable object 724*c* corresponds to an unregistered, guest user. Receiving a user input corresponding to selection of first selectable object 724*a* is indicative of a request to log into a first user account associated with the first registered user, receiving a user input corresponding to selection of selectable object 724*b* is indicative of a request to log into a second user account associated with the second registered user, and receiving a user input corresponding to selection of selectable object 724*c* is indicative of a request to display a guest user interface (e.g., guest user interface 718 of FIG. 7D).

In FIG. 7E, electronic device 700 detects user input 726 at a location on display 702 corresponding to selectable object 724*a*, which corresponds to the first registered user.

In FIG. 7E, electronic device 700 is a smartwatch. In some embodiments, electronic device 700 is a head-mounted system (e.g., a headset). In some embodiments in which electronic device 700 is a head-mounted system, user picker interface 722 and/or selectable objects 724a-724c are presented within a virtual environment. In FIG. 7E, user input 726 is received via a touch-screen input. In some embodiments in which electronic device 700 is a head-mounted system, user inputs are received, for example, based on eye movement, hand movement, and/or hand gestures by a user to navigate within a displayed user interface (e.g., user picker interface 722) and select various selectable objects (e.g., selectable objects 724a-724c).

Figure 7F:
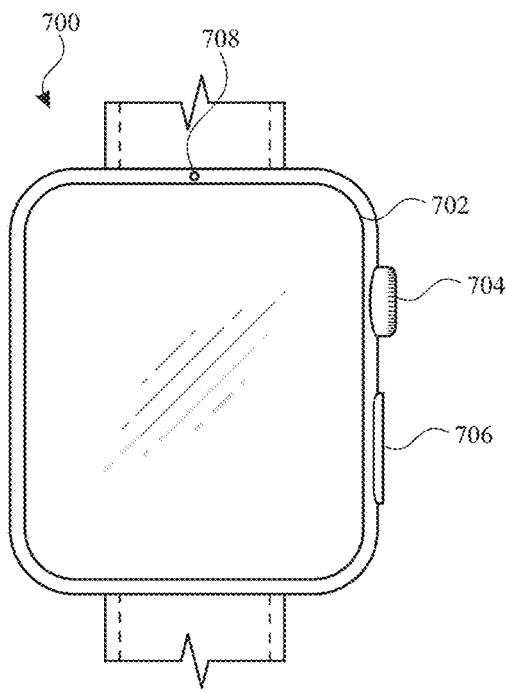
Figure 7F:
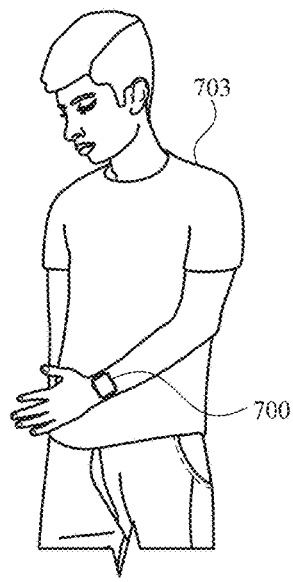

In FIG. 7F, in response to detecting user input 726, electronic device 700 collects updated biometric information (e.g., facial scan information, eye (e.g., retina, iris) scan information, and/or fingerprint information) from user 703 to determine whether or not user 703 is the first registered user (e.g., to determine whether the updated biometric information corresponds to the first registered user and/or to determine whether the updated biometric information corresponds to stored biometric information corresponding to the first registered user). If the updated biometric information is determined to correspond to the first registered user, electronic device 700 (optionally logs into the first user account and) displays personalized user interface 710 (FIG. 7B) indicative of a successful login into the first user account associated with the first registered user. If the updated biometric information is not determined to correspond to the first registered user, electronic device 700 forgoes logging into the first user account (and forgoes displaying personalized user interface 710).

Figure 7G:
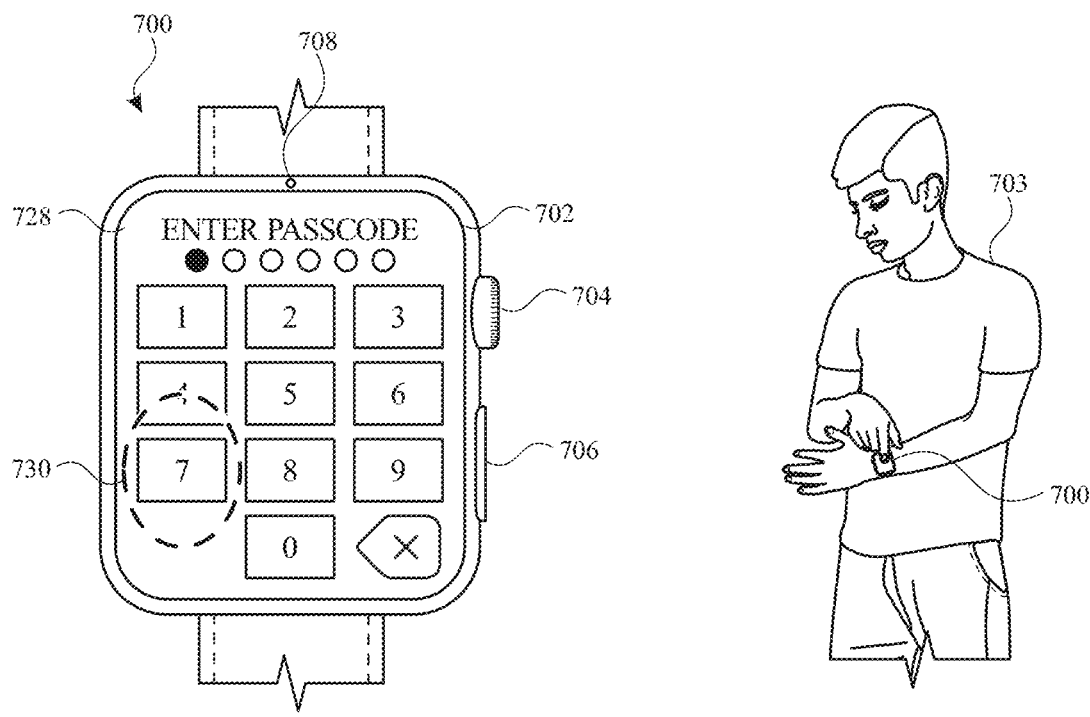

In FIG. 7G, in response to a determination that the updated biometric information does not correspond to the first registered user, electronic device 700 displays passcode entry user interface 728. Passcode entry user interface 728 displays a keypad for a user to enter a passcode corresponding to the first registered user. If the user enters (e.g., via touch inputs 730, voice inputs, and/or other user inputs) the correct passcode, electronic device 700 logs into the first user account (and, optionally, displays user interface 710, applies one or more user settings associated with the first user account, and/or provides access to secure content associated with the first user account). If the user does not enter the correct passcode, electronic device 700 forgoes logging into the first user account (and, optionally, forgoes displaying user interface 710, forgoes applying one or more user settings associated with the first user account, and/or forgoes providing access to secure content associated with the first user account).

In some embodiments, a user is provided with the option to enable or disable automated biometric authentication. In such embodiments, if a user has disabled automated biometric authentication, electronic device 700 forgoes storing biometric information for the user. In such scenarios, a user logs into his or her user account, for example, by entering a passcode specific to the user account (e.g., using passcode entry user interface 728). Accordingly, in some embodiments, if the first registered user, John, has opted out of automated biometric authentication (e.g., has disabled automated biometric authentication), then, in response to user input 726 in FIG. 7E, electronic device 700 optionally forgoes attempting automated biometric authentication (FIG. 7F), and (e.g., directly) displays passcode entry user interface 728 (FIG. 7G).

In FIGS. 7F-7G, electronic device 700 is a smartwatch. In some embodiments, electronic device 700 is a head-mounted system (e.g., a headset). In some embodiments in which electronic device 700 is a head-mounted system, passcode entry user interface 728 is displayed within a virtual environment. In FIG. 7G, user inputs 730 are received via a touch-screen input. In some embodiments in which electronic device 700 is a head-mounted system, user inputs are received, for example, based on eye movement, hand movement, and/or hand gestures by a user to navigate within a displayed user interface (e.g., passcode entry user interface 728) and select various selectable objects.

Figure 7H:
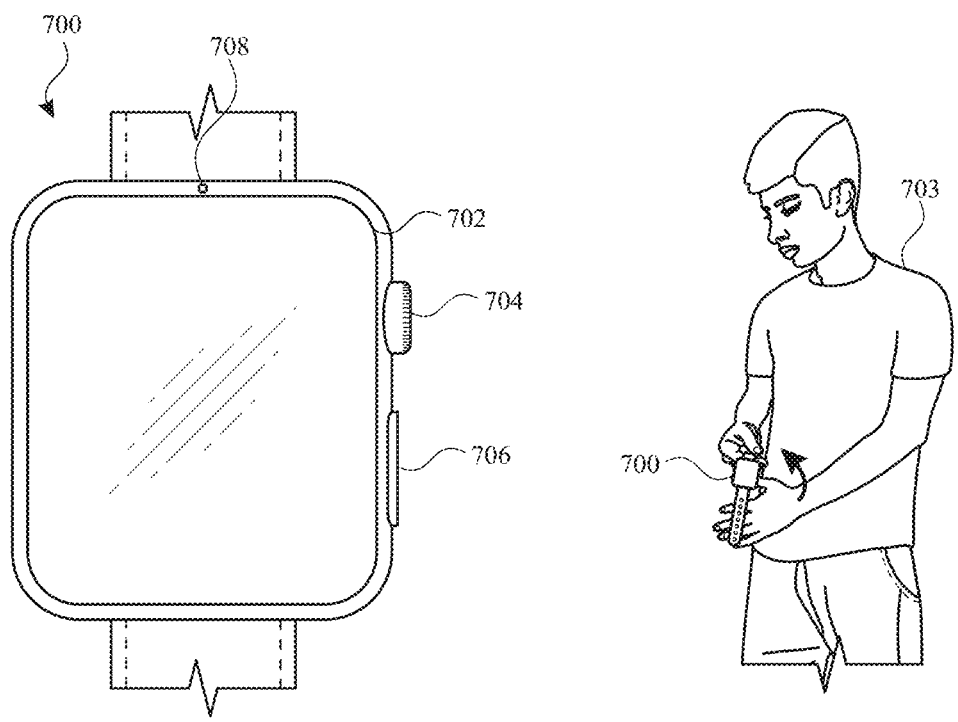

In FIG. 7H, user 703 has removed electronic device 700 from his body. Electronic device 700 detects that electronic device 700 is no longer positioned on the body of the user. In response to detecting that electronic device 700 is no longer positioned on the body of the user, electronic device 700 optionally logs out of any user account into which electronic device 700 was logged in, and ceases to display any user interface that was being displayed. Logging out of a user account can include, for example, ceasing to display a personalized user interface associated with the user account, ceasing to apply one or more user settings associated with the user account, and/or ceasing to provide access to secure content associated with the user account.

In the depicted embodiments, electronic device 700 is a smartwatch, and FIGS. 7A-7H depict user 703 putting the smartwatch on his wrist, or taking the smartwatch off his wrist. However, as discussed above, in some embodiments, electronic device 700 is a different device, such as a head-mounted system (e.g., a headset) that is designed to be worn on the user's head. In such embodiments, electronic device 700 can attempt to automatically identify the user when it is determined that electronic device 700 has been placed on the user's head (e.g., based on iris recognition and/or facial recognition when electronic device 700 is placed on the user's head). Additionally, in such embodiments, content, such as user interfaces 710, 714, 710, 714, 718, 722, and 728 is optionally displayed via a display generation component that is in communication with the head-mounted system, and the one or more user inputs are optionally received via one or more input devices in communication with the head-mounted system.

FIG. 8 is a flow diagram illustrating a method for automatically applying one or more user settings based on identification of a user using an electronic device in accordance with some embodiments. Method 800 is performed at a computer system (e.g., 101, 700) (e.g., a smartphone, tablet, head-mounted display generation component) that is in communication with a display generation component (e.g., 702) (e.g., a visual output device, a 3D display, a display having at least a portion that is transparent or translucent on which images can be projected (e.g., a see-through display), a projector, a heads-up display, a display controller) and one or more input devices (e.g., camera 708, touch-screen display 702) (e.g., a touch-screen; an infrared camera; a depth camera; a visible light camera; an eye tracking device, a hand tracking device). Some operations in method 800 are, optionally, combined, the orders of some operations are, optionally, changed, and some operations are, optionally, omitted.

As described below, method 800 provides an intuitive way for automatically applying one or more user settings based on identification of a user. The method reduces the cognitive burden on a user for applying one or more user settings, thereby creating a more efficient human-machine interface. For battery-operated computing devices, enabling a user to apply one or more user settings faster and more efficiently conserves power and increases the time between battery charges.

In some embodiments, the computer system (e.g., device 700) (e.g., a smart phone, a smart watch, a tablet, and/or a wearable device) that is in communication with a display generation component (e.g., display 702) (e.g., a display controller; a touch-sensitive display system; a display (e.g., integrated and/or connected), a 3D display, a transparent display, a projector, and/or a heads-up display) and one or more input devices (e.g., 702, 704, 706, 708) (e.g., a touch-sensitive surface (e.g., a touch-sensitive display); a mouse; a keyboard; a remote control; a visual input device (e.g., a camera); an audio input device (e.g., a microphone); and/or a biometric sensor (e.g., a fingerprint sensor, a face identification sensor, and/or an iris identification sensor)), detects (802) that at least a portion of the computer system has been placed on a body of a respective user (e.g., user 703 of FIG. 7A).

In response to detecting that the computer system has been placed on the body of the respective user (804), and in accordance with a determination that biometric information received via the one or more input devices (e.g., a fingerprint, an image (e.g., a photograph and/or a scan) representative of the face of the respective user, and/or iris identification information (e.g., iris scan information)) corresponds to a first registered user (806) (e.g., FIGS. 7A-7B) (e.g., a first registered user of a plurality of users) (e.g., a user that has been previously registered on the computer system) (e.g., in accordance with a determination that the respective user is the first registered user), the computer system enables (808) the computer system to be used with one or more settings associated with (e.g., specified by) a first user account associated with the first registered user (e.g., logging the computer system into the first user account) (e.g., displaying personalized user interface 710 in FIG. 7B. In some embodiments, in response to detecting that the computer system has been placed on the body of the respective user, the computer system receives, via the one or more input devices, biometric information (e.g., corresponding to the respective user). In some embodiments, biometric information is received while the at least the portion of the computer system is being worn by the respective user. In some embodiments, the method further comprises optionally displaying, via the display generation component, a first user interface (e.g., personalized user interface 710) that corresponds to the first registered user (in some embodiments, the first user interface is indicative of a successful login to the first user account corresponding to the first registered user (e.g., a first user account of a plurality of accounts)). In some embodiments, enabling the computer system to be used with one or more settings associated with the first user account (e.g., logging the computer system into the first user account) includes one or more of: applying a first set of user preferences associated with the first user account, providing access to certain encrypted and/or secure user files associated with the first user account, and/or loading calibration information associated with the first user account.

In response to detecting that the computer system (e.g., 700) has been placed on the body of the respective user (804), and in accordance with a determination that the biometric information received via the one or more input devices (e.g., 708) does not correspond to the first registered user (810) (e.g., in accordance with a determination that the respective user is not the first registered user), the computer system forgoes (812) enabling the computer system (e.g., 700) to be used with the one or more settings associated with the first user account associated with the first registered user (e.g., FIGS. 7C-7E) (e.g., forgoing logging the computer system into the first user account associated with the first registered user). In some embodiments, forgoing enabling the computer system to be used with the one or more settings associated with the first user account associated with the first registered user includes forgoing displaying the first user interface that corresponds to the first registered user.

Forgoing enabling the computer system to be used with one or more settings associated with the first user account associated with the first registered user (e.g., forgoing logging the computer system into the first user account associated with the first registered user) when it is determined that biometric information does not correspond to the first registered user enhances security and can prevent unauthorized users from initiating sensitive operations. Forgoing enabling the computer system to be used with one or more settings associated with the first user account associated with the first registered user (e.g., forgoing logging the computer system into the first user account associated with the first registered user) when it is determined that biometric information does not correspond to the first registered user also enhances the operability of the device and makes the user-device interface more efficient (e.g., by restricting unauthorized access) which, additionally, reduces power usage and improves battery life of the device by limiting the performance of restricted operations.

Automatically enabling the computer system to be used with one or more settings associated with the first user account associated with the first registered user (e.g., automatically logging the computer system into the first user account associated with the first registered user) when it is determined that biometric information received via the one or more input devices corresponds to the first registered user provides the user the ability to log in to the first user account without requiring the user to explicitly request login. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically enabling the computer system to be used with one or more settings associated with the first user account associated with the first registered user (e.g., automatically logging the computer system into the first user account associated with the first registered user) when it is determined that biometric information corresponds to the first registered user allows for the computer system to be placed in a locked state more frequently and for a greater period of time, as it is very easy and convenient for a user to re-enter a logged-in state. Allowing for the computer system to be placed in a locked state for a greater period of time enhances security. Automatically enabling the computer system to be used with one or more settings associated with the first user account associated with the first registered user (e.g., automatically logging the computer system into the first user account associated with the first registered user) when it is determined that biometric information corresponds to the first registered user also enhances the operability of the device and makes the user-device interface more efficient (e.g., by restricting unauthorized access)

which, additionally, reduces power usage and improves battery life of the device by limiting the performance of restricted operations.

In some embodiments, in response to detecting that the computer system (e.g., 700) has been placed on the body of the respective user (804), and in accordance with a determination that the biometric information received via the one or more input devices (e.g., 708) does not correspond to the first registered user and that the biometric information received via the one or more input devices corresponds to a second registered user (e.g., a second registered user of a plurality of users) (e.g., a user that has been previously registered on the computer system) (e.g., in accordance with a determination that the respective user is the second registered user) different from the first registered user (814), the computer system (e.g., 703) enables (816) the computer system to be used with one or more settings associated with (or specified by) a second user account different from the first user account and associated with the second registered user (e.g., logging the computer system into a second user account different from the first user account and associated with the second registered user) (e.g., displaying personalized user interface 714 in FIG. 7C).

In some embodiments, enabling the computer system to be used with one or more settings associated with the second user account different from the first user account and associated with the second registered user (e.g., logging the computer system into the second user account different from the first user account and associated with the second registered user) comprises displaying, via the display generation component, a second user interface (e.g., personalized user interface 714) that corresponds to the second registered user. In some embodiments, the second user interface is indicative of a successful login to the second user account corresponding to the second registered user. In some embodiments, enabling the computer system to be used with one or more settings associated with the second user account different from the first user account and associated with the second registered user (e.g., logging the computer system into the second user account) includes one or more of: applying a second set of user preferences associated with the second user account, providing access to certain encrypted and/or secure user files associated with the second user account, and/or loading calibration information associated with the second user account.

Automatically enabling the computer system to be used with one or more settings associated with the second user account associated with the second registered user (e.g., automatically logging the computer system into the second user account associated with the second registered user) when it is determined that biometric information received via the one or more input devices corresponds to the second registered user provides the user the ability to log in to the second user account without requiring the user to explicitly request login. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user (e.g., 703), and in accordance with a determination that the biometric information received via the one or more input devices (e.g., 708) does not correspond to a registered user (e.g., is recognized as a person/user but does not correspond to any user that is registered on the computer system), the computer system enters a guest mode of operation (e.g., displaying guest user interface 718 of FIG. 7D). In some embodiments, entering the guest mode of operation comprises enabling the computer system to be used with one or more settings associated with a guest user account different from the first user account (e.g., logging the computer system into a guest user account different from the first user account). In some embodiments, entering the guest mode of operation comprises displaying, via the display generation component, a guest user interface (e.g., guest user interface 718) that corresponds to an unregistered user. In some embodiments, entering the guest mode of operation includes one or more of: applying a default set of user preferences associated with the guest user account and/or loading calibration information (e.g., a default set of calibration settings) associated with the guest user account.

Entering a guest mode of operation when it is determined that biometric information received via the one or more input devices does not correspond to a registered user enhances security and can prevent unauthorized users from initiating sensitive operations (e.g., by preventing a guest user from accessing secure information of a registered user). Entering a guest mode of operation when it is determined that biometric information received via the one or more input devices does not correspond to a registered user also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system (e.g., 700) has been placed on the body of the respective user, and in accordance with a determination that the biometric information received via the one or more input devices (e.g., 708) does not correspond to a registered user (e.g., does not correspond to any user that is registered on the computer system), the computer system forgoes logging the computer system into any user account (e.g., guest user interface 718 of FIG. 7D, user picker user interface 722 of FIG. 7E). In some embodiments, forgoing logging the computer system into any user account includes optionally displaying, via the display generation component, a user interface (e.g., guest user interface 718 of FIG. 7D, user picker user interface 722 of FIG. 7E) that is indicative of a failed attempt to log in to a user account.

Forgoing logging the computer system into any user account when it is determined that biometric information received via the one or more input devices does not correspond to a registered user enhances security and can prevent unauthorized users from initiating sensitive operations. Forgoing logging the computer system into any user account when it is determined that biometric information received via the one or more input devices does not correspond to a registered also enhances the operability of the device and makes the user-device interface more efficient (e.g., by restricting unauthorized access) which, additionally, reduces power usage and improves battery life of the device by limiting the performance of restricted operations.

In some embodiments, while the computer system (e.g., 700) is enabled to be used with one or more settings associated with the first user account associated with the first registered user (e.g., while the computer system is logged into the first user account associated with the first registered user), the computer system (e.g., 700) detects that the at least the portion of the computer system has been removed from the body of the respective user (e.g., user 703, FIG. 7H) (e.g., detecting that the computer system is no longer being worn by the respective user). In response to detecting that the at least the portion of the computer system has been removed from the body of the respective user, the computer system ceases to enable the computer system to be used with the one or more settings associated with the first user account associated with the first registered user (e.g., logging the computer system out of the first user account associated with the first registered user) (FIG. 7H). In some embodiments, ceasing to enable the computer system to be used with the one or more settings associated with the first user account associated with the first registered user (e.g., logging the computer system out of the first user account) includes one or more of: removing application of a first set of user preferences associated with the first user account, prohibiting access to certain encrypted and/or secure user files associated with the first user account, and/or removing application of calibration information associated with the first user account.

Ceasing to enable the computer system to be used with the one or more settings associated with the first user account associated with the first registered user (e.g., logging the computer system out of the first user account) when it is determined that the computer system has been removed from the body of the respective user enhances security and can prevent unauthorized users from initiating sensitive operations. Ceasing to enable the computer system to be used with the one or more settings associated with the first user account associated with the first registered user (e.g., logging the computer system out of the first user account) when it is determined that the computer system has been removed from the body of the respective user also enhances the operability of the device and makes the user-device interface more efficient (e.g., by restricting unauthorized access) which, additionally, reduces power usage and improves battery life of the device by limiting the performance of restricted operations.

In some embodiments, the biometric information received via the one or more input devices is iris identification information; the determination that biometric information received via the one or more input devices corresponds to the first registered user comprises a determination that iris identification information (e.g., iris scan information) received via the one or more input devices corresponds to the first registered user; and the determination that biometric information received via the one or more input devices does not correspond to the first registered user comprises a determination that iris identification information (e.g., iris scan information) received via the one or more input devices does not correspond to the first registered user. For example, in some embodiments, the computer system is a head-mounted device (e.g., a headset), and iris identification information is provided via one or more input devices that are in communication with the computer system (e.g., eye tracking device 130).

Automatically identifying a user based on iris identification information provides the user the ability to perform various actions without explicit input (e.g., logging into his or her user account without requiring the user to explicitly request login). Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with the determination that the biometric information received via the one or more input devices corresponds to a respective registered user, the computer system displays a visual indication that the computer system has been enabled to be used with one or more settings associated with the respective registered user (e.g., personalized user interface 710, indicator 712, personalized user interface 714, indicator 716*d*) (e.g., has been logged into the user account associated with the respective registered user) (e.g., displaying text including a name and/or username of the respective registered user, displaying an avatar and/or image corresponding to the respective registered user).

Displaying a visual indication that the computer system has been enabled to be used with one or more settings associated with the respective registered user (e.g., has been logged into the user account associated with the respective registered user) provides the user with feedback about the current state of the device (e.g., that the computer system has been logged into the user account). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with a determination that the biometric information received via the one or more input devices does not correspond to a registered user (e.g., does not correspond to a user that has been previously registered on the computer system), the computer system displays a user selection user interface (e.g., user interface 722) comprising a plurality of selectable options including: a first selectable option (e.g., selectable option 724*a*) corresponding to the first registered user (e.g., a name, an avatar, initials, and/or other visual representation corresponding to the first registered user); and a second selectable option (e.g., selectable option 724*b*) corresponding to a second registered user different from the first registered user. In some embodiments, the determination that the biometric information received via the one or more input devices does not correspond to a registered user includes a determination that the biometric information received via the one or more input devices does not satisfy one or more certainty thresholds with respect to each of one or more registered users.

Displaying a user selection user interface in response to a determination that the biometric information received via the one or more input devices does not correspond to a registered user provides the user with feedback about the current state of the device (e.g., that biometric information received via the one or more input devices does not correspond to a registered user). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the user selection user interface (e.g., user interface 722) comprising the plurality of selectable options (e.g., options 724a-724c), the computer system receives a user input (e.g., user input 726) corresponding to selection of a respective selectable option of the plurality of selectable options, the respective selectable option corresponding to a respective registered user. After receiving the user input corresponding to selection of the respective selectable option, the computer system receives, via the one or more input devices, updated biometric information (e.g., FIG. 7F). In response to receiving the updated biometric information (e.g., a fingerprint, an image (e.g., a photograph and/or a scan) representative of the face of the respective user, and/or iris identification information (e.g., iris scan information)), and in accordance with a determination that biometric information received via the one or more input devices corresponds to the respective registered user, enabling the computer system to be used with one or more settings associated with a respective user account associated with the respective registered user (e.g., displaying user interface 710 of FIG. 7B) (e.g., logging the computer system into a respective user account associated with the respective registered user). In some embodiments, the computer system optionally displays, via the display generation component, a respective user interface that corresponds to the respective registered user (e.g., personalized user interface 610). In some embodiments, the respective user interface is indicative of a successful login to the respective user account corresponding to the respective registered user. In some embodiments, enabling the computer system to be used with one or more settings associated with the respective user account associated with the respective registered user (e.g., logging the computer system into the respective user account) includes one or more of: applying a set of user preferences associated with the respective user account, providing access to certain encrypted and/or secure user files associated with the respective user account, and/or loading calibration information associated with the respective user account). In response to receiving the updated biometric information, and in accordance with a determination that biometric information received via the one or more input devices does not correspond to the respective registered user, the computer system forgoes enabling the computer system to be used with the one or more settings associated with (e.g., and/or specified by) the respective user account associated with the respective registered user (e.g., forgoing logging the computer system into the respective user account associated with the respective registered user) (e.g., displaying passcode entry user interface 628).

Forgoing enabling the computer system to be used with the one or more settings associated with the respective user account associated with the respective registered user (e.g., forgoing logging the computer system into the respective user account associated with the respective registered user) when it is determined that biometric information does not correspond to the respective registered user enhances security and can prevent unauthorized users from initiating sensitive operations. Forgoing enabling the computer system to be used with the one or more settings associated with the respective user account associated with the respective registered user (e.g., forgoing logging the computer system into the respective user account associated with the respective registered user) when it is determined that biometric information does not correspond to the respective registered user also enhances the operability of the device and makes the user-device interface more efficient (e.g., by restricting unauthorized access) which, additionally, reduces power usage and improves battery life of the device by limiting the performance of restricted operations.

In some embodiments, while displaying the user selection user interface (e.g., user interface 722) comprising the plurality of selectable options (e.g., options 724a-724c), the computer system receives a user input (e.g., user input 726) corresponding to selection of a respective selectable option of the plurality of selectable options, the respective selectable option corresponding to a respective registered user. After receiving the user input corresponding to selection of the respective selectable option and in accordance with a biometric criterion not being met (e.g., the biometric criterion is not met when the respective registered user is not enrolled in (e.g., did not opt into) biometric authentication), and in accordance with a determination that a first setting of the respective registered user is not enabled (e.g., a biometric authentication setting to enable biometric authentication (e.g., an iris scan authentication setting)), the computer system displays, via the display generation component, a passcode entry user interface (e.g., user interface 728). After receiving the user input corresponding to selection of the respective selectable option and in accordance with a biometric criterion not being met (e.g., the biometric criterion is not met when the respective registered user is not enrolled in (e.g., did not opt into) biometric authentication), and in accordance with a determination that the first setting of the respective registered user is enabled, the computer system performs automatic biometric authentication (e.g., FIG. 7F) (and, optionally, forgoes displaying the passcode entry user interface). In some embodiments, the computer system receives, via the one or more input devices, updated biometric information (e.g., a fingerprint, an image (e.g., a photograph and/or a scan) representative of the face of the respective user, and/or iris identification information (e.g., iris scan information)) (e.g., FIG. 7F). In some embodiments, performing automatic biometric authentication includes: in accordance with a determination that updated biometric information (e.g., a fingerprint, an image (e.g., a photograph and/or a scan) representative of the face of the respective user, and/or iris identification information (e.g., iris scan information)) received via the one or more input devices corresponds to the respective registered user, enabling the computer system to be used with one or more settings associated with (or specified by) a respective user account associated with the respective registered user (e.g., displaying user interface 710 of FIG. 7B) (e.g., logging the computer system into a respective user account associated with the respective registered user); and in accordance with a determination that the updated biometric information received via the one or more input devices does not correspond to the respective registered user, forgoing enabling the computer system to be used with one or more settings associated with the respective user account associated with the respective registered user (e.g., displaying passcode entry user interface 728 of FIG. 7G) (e.g., forgoing logging the computer system into the respective user account associated with the respective registered user).

In some embodiments, enabling the computer system to be used with one or more settings associated with the respective user account associated with the respective registered user (e.g., logging the computer system into the respective user account associated with the respective registered user) includes displaying, via the display generation component, a respective user interface that corresponds to the respective registered user. In some embodiments, the respective user interface is indicative of a successful login to the respective user account corresponding to the respective registered user. In some embodiments, enabling the computer system to be used with one or more settings associated with the respective user account associated with the respective registered user (e.g., logging the computer system into the respective user account) includes one or more of: applying a set of user preferences associated with the respective user account, providing access to certain encrypted and/or secure user files associated with the respective user account, and/or loading calibration information associated with the respective user account.

Forgoing enabling the computer system to be used with one or more settings associated with the respective user account associated with the respective registered user (e.g., forgoing logging the computer system into the respective user account associated with the respective registered user) when it is determined that biometric information does not correspond to the respective registered user enhances security and can prevent unauthorized users from initiating sensitive operations. Forgoing enabling the computer system to be used with one or more settings associated with the respective user account associated with the respective registered user (e.g., forgoing logging the computer system into the respective user account associated with the respective registered user) when it is determined that biometric information does not correspond to the respective registered user also enhances the operability of the device and makes the user-device interface more efficient (e.g., by restricting unauthorized access) which, additionally, reduces power usage and improves battery life of the device by limiting the performance of restricted operations.

Note that details of the processes described above with respect to method 800 (e.g., FIG. 8) are also applicable in an analogous manner to the methods described below. For example, methods 1000, 1200, and/or 1400 optionally include one or more of the characteristics of the various methods described above with reference to method 800. For example, a user-specific set of device calibration settings (method 1000) and/or a user avatar having a particular visual appearance (method 1200) may be enabled on the computer system as part of the one or more settings associated with the first user account being enabled on the computer system, as recited in method 800. In another example, user-specific settings can be applied and/or unapplied based on automatic user identification when a device is handed off between users, as recited in method 1400. For brevity, these details are not repeated below.

FIGS. 9A-9F illustrate exemplary user interfaces for automatically applying one or more device calibration settings based on identification of a user, in accordance with some embodiments. The user interfaces in these figures are used to illustrate the processes described below, including the processes in FIGS. 10A-10B.

FIG. 9A depicts electronic device 700, which is a smartwatch that includes a touch-sensitive display 702, a rotatable and depressible input mechanism 704 (e.g., rotatable and depressible in relation to a housing or frame of the device), a button 706, and a camera 708. In some embodiments described below, electronic device 700 is a wearable smartwatch device. In some embodiments, electronic device 700 is a smart phone, a tablet, a head-mounted system (e.g., a headset), or other computer system that includes and/or is in communication with a display device (e.g., display screen, projection device, and the like). Electronic device 700 is a computer system (e.g., computer system 101 in FIG. 1).

At FIG. 9A, user 703 places electronic device 700 on his wrist. Electronic device 700 detects (e.g., via one or more sensors) that electronic device 700 has been placed on the body of a user. In some embodiments, electronic device 700 detects that one or more criteria have been satisfied indicating that electronic device 700 has been placed on the body of a user.

In the depicted embodiment, electronic device 700 is a smartwatch, and FIG. 9A depicts user 703 placing the smartwatch on his wrist. However, as discussed above, in some embodiments, electronic device 700 is a different device, such as a head-mounted system (e.g., a headset) that is designed to be worn on the user's head. In such embodiments, electronic device 700 detects (e.g., via one or more sensors) that electronic device 700 has been placed on the head of a user and/or detects that one or more criteria have been satisfied indicating that electronic device 700 has been placed on the head of a user.

In FIG. 9A, in response to detecting that electronic device 700 has been placed on the body of a user, electronic device 700 attempts to automatically identify user 703. In some embodiments, electronic device 700 attempts to identify user 703 in various ways. For example, electronic device 700 optionally attempts to automatically identify the user based on biometric information, such as facial recognition, eye (e.g., iris) recognition, and/or fingerprint recognition. In FIG. 7A, electronic device 700 collects biometric information (e.g., a facial scan and/or eye (e.g., iris) scan using camera 708) in response to detecting that electronic device 700 has been placed on the body of the user.

In the depicted embodiment, electronic device 700 is a smartwatch, and FIG. 9A depicts user 703 placing the smartwatch on his wrist. However, as discussed above, in some embodiments, electronic device 700 is a different device, such as a head-mounted system (e.g., a headset) that is designed to be worn on the user's head. In such embodiments, electronic device 700 optionally attempts to automatically identify the user when it is determined that electronic device 700 has been placed on the user's head (e.g., based on iris recognition and/or facial recognition when the device is placed on the user's head).

In FIG. 9A, electronic device 700 displays application picker user interface 902. Application picker user interface 902 includes a plurality of application icons. Each application icon is associated with an application, and selection of an application icon causes electronic device 700 to display (e.g., by opening) the application associated with the application icon. Application picker user interface 902 includes clock application affordance 904a which is displayed at a center position of display 702. Application picker user interface 902 also includes compass application affordance 904b, timer application affordance 904c, and podcast application affordance 904d.

In FIG. 9B, electronic device 700 detects one or more user inputs 903a-903e. Electronic device 700 detects the one or more user inputs 903a-903e based on information from one or more sensors, such as one or more cameras, gyroscopes, accelerometers, pressure sensors, eye movement sensors (e.g., scanners and/or cameras), and/or microphones. In the depicted embodiment, the one or more user inputs 903a-903e correspond to navigational inputs to navigate within user interface 902. In the depicted embodiment, the one or more user inputs 903a-903e includes eye movement inputs (e.g., 903a) (e.g., gaze movement, eye focus movement), and hand and/or wrist movement inputs 903b-903e. In some embodiments, user inputs can include other and/or additional inputs, such as head movement inputs, torso movement inputs, leg and/or foot movement inputs, and/or touch inputs.

Figure 9D:
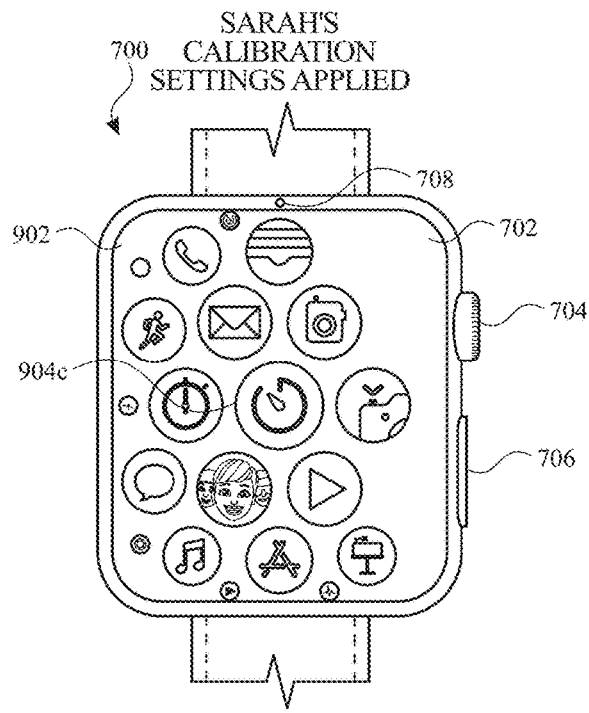
Figure 9E:
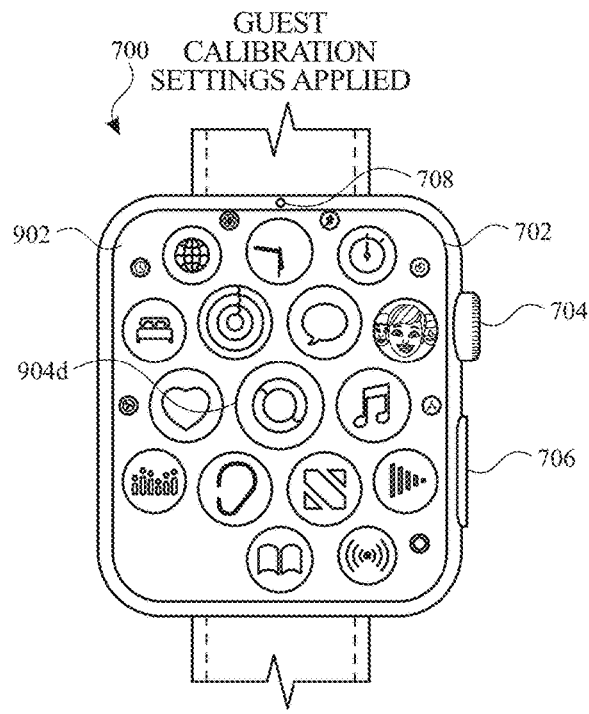
Figure 10A:
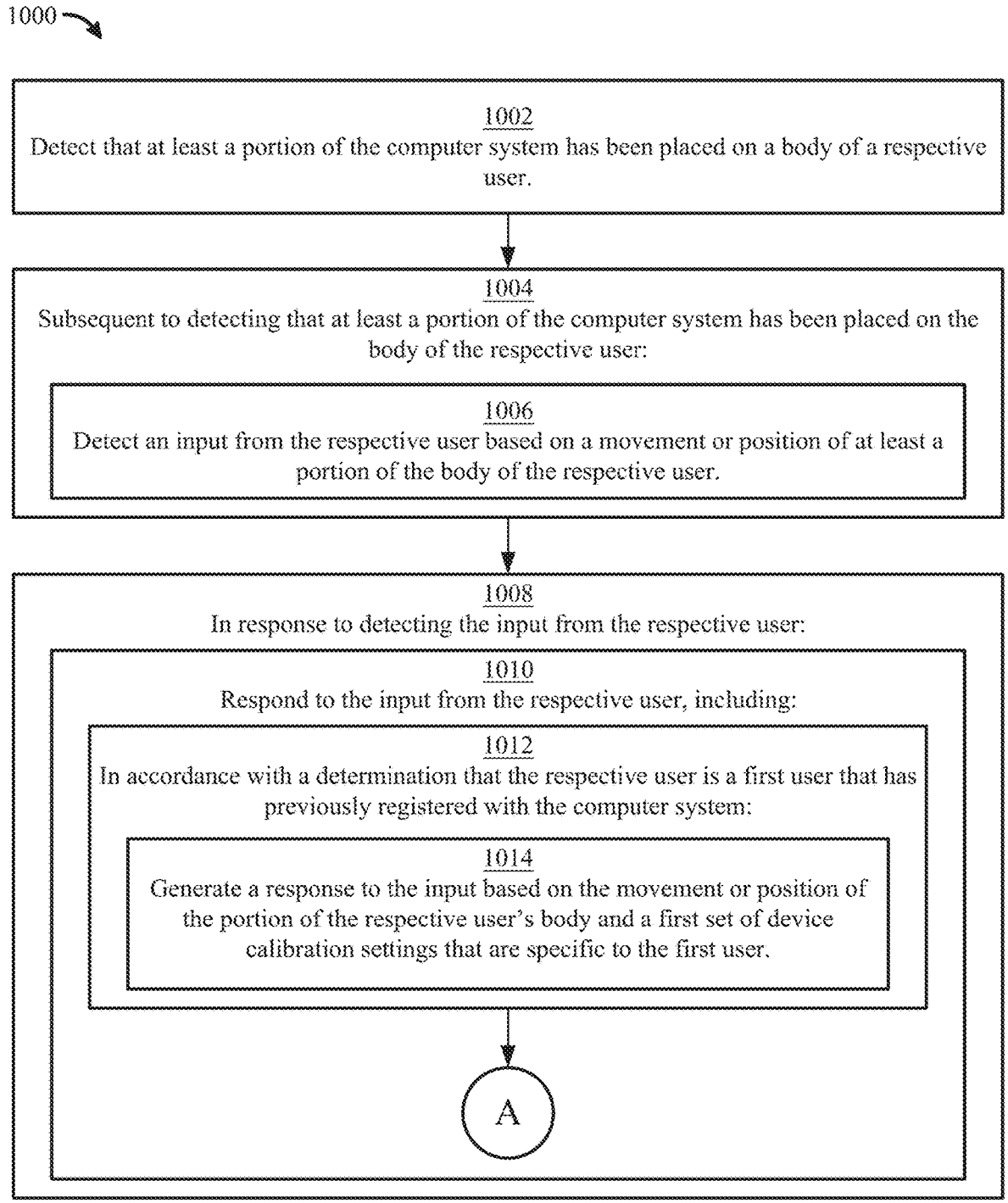

FIGS. 9C-9E depict various example scenarios in which electronic device 700 responds to the user inputs 903a-903e in different ways based on automated identification of user 703.

FIG. 9C depicts a first example scenario in which electronic device 700 has identified user 703 (e.g., based on biometric information) as a first registered user, John. In response to identifying user 703 as the first registered user, electronic device 700 applies a first set of device calibration settings that correspond to the first registered user. Device calibration settings can include, for example, eye movement calibration settings, hand movement calibration settings, head movement calibration settings, torso movement calibration settings, foot and/or leg movement calibration settings, and/or touch pressure calibration settings. Furthermore, because the first set of device calibration settings corresponding to the first registered user have been applied, electronic device 700 responds to user inputs 903a-903e based on (e.g., according to, in accordance with) user inputs 903a-903e and the first set of device calibration settings. In the depicted example, electronic device 700 updates display of application picker user interface 902 to display navigation within application picker user interface 902 based on user inputs 903a-903e and the first set of device calibration settings. In FIG. 9C, compass application affordance 904b, previously positioned at a top left position of display 702 in FIG. 9A, has been moved closer to the center position of display 702 in response to user inputs 903a-903e.

FIG. 9D depicts a second example scenario in which electronic device 700 has identified user 703 (e.g., based on biometric information) as a second registered user, Sarah. In response to identifying user 703 as the second registered user, electronic device 700 applies a second set of device calibration settings that correspond to the second registered user (e.g., different from the first set of device calibration settings). Electronic device 700 responds to user inputs 903a-903e based on (e.g., according to, in accordance with) user inputs 903a-903e and the second set of device calibration settings. In the depicted example, electronic device 700 updates display of application picker user interface 902 to display navigation within application picker user interface 902 based on user inputs 903a-903e and the second set of device calibration settings. In FIG. 9D, timer application affordance 904c, previously positioned at a rightmost position of display 702 in FIG. 9A, has been moved to the center position of display 702 in response to user inputs 903a-903e. Accordingly, as a result of different sets of device calibration settings being applied in FIGS. 9C and 9D, electronic device 600 has responded differently to the same set of user inputs 903a-903e.

FIG. 9E depicts a third example scenario in which electronic device 700 has determined that user 703 is not a previously registered user (e.g., electronic device 700 has failed to match biometric information from user 703 with stored biometric information for a previously registered user). In response to determining that user 703 is not a registered user, electronic device 700 applies a third (e.g., guest) set of device calibration settings that correspond to an unregistered, guest user (and, in some embodiments, are different from the first and second sets of device calibration settings). Electronic device 700 responds to user inputs 903a-903e based on (e.g., according to, in accordance with) the user inputs 903a-903e and the third (guest) set of device calibration settings. In the depicted example, electronic device 700 updates display of application picker user interface 902 to display navigation within application picker user interface 902 based on user inputs 903a-903e and the third (guest) set of device calibration settings. In FIG. 9E, podcast application affordance 904d, previously positioned at a bottom center position of display 702 in FIG. 9A, has been moved to the center position of display 702 in response to user inputs 903a-903e. Accordingly, as a result of different sets of device calibration settings being applied in FIGS. 9C, 9D, and 9E, electronic device 700 has responded differently to the same set of user inputs 903a-903e.

In FIGS. 9C-9E, electronic device 700 and application picker user interface 902 are used as examples to demonstrate application of different sets of device calibration settings based on identification of a user. Such features can be applied in a similar manner to different situations and scenarios. For example, in some embodiments, electronic device 700 is a head-mounted system (e.g., headset). In some such embodiments, electronic device 700 displays a three-dimensional user interface and/or a virtual environment. A user navigates within the three-dimensional user interface and/or the virtual environment by providing one or more user inputs, which in some embodiments include gaze and/or eye movement, hand movement, head movement, and/or torso movement. In response to the user inputs, electronic device 700 navigates within the three-dimensional user interface and/or virtual environment. Navigation within the three-dimensional user interface and/or virtual environment can differ based on different sets of device calibration settings being applied (e.g., different sets of eye movement calibration, hand movement calibration, and/or head movement calibration for different users).

In some embodiments, a set of device calibration settings for a registered user is determined based on one or more calibration inputs provided by the registered user. In some embodiments, electronic device 700 requests, and a user optionally provides, the one or more calibration inputs during an enrollment and/or registration process. For example, electronic device 700 instructs a user to move parts of the user's body (e.g., hand, arms, legs, feet, torso, head, and/or eyes) in a predefined manner, and/or electronic device 700 asks the user to track movement of an object with his or her eyes. Based on the one or more calibration inputs, electronic device 700 optionally determines and stores one or more values (e.g., offset values) that at least partially define device calibration settings for that registered user.

In some embodiments, a set of guest device calibration settings represent a default set of device calibration settings, and the default set of device calibration settings are determined without any user input (e.g., without calibration inputs). In such embodiments, guest users do not have to provide any calibration inputs, and user inputs provided by the guest user are processed according to the default set of device calibration settings. In some embodiments, a set of guest device calibration settings are determined based on one or more calibration inputs provided by a guest user. For example, electronic device 700 optionally asks a guest user to provide one or more calibration inputs in order to determine the device calibration settings to be applied for the guest user. In some embodiments, the one or more calibration inputs that are requested of and/or received from the guest user can represent a subset of (e.g., less than) the one or more calibration inputs that are requested of and/or received from a registered user. For example, a guest user is asked to provide fewer calibration inputs than a registered user is asked to provide.

Figure 9F:
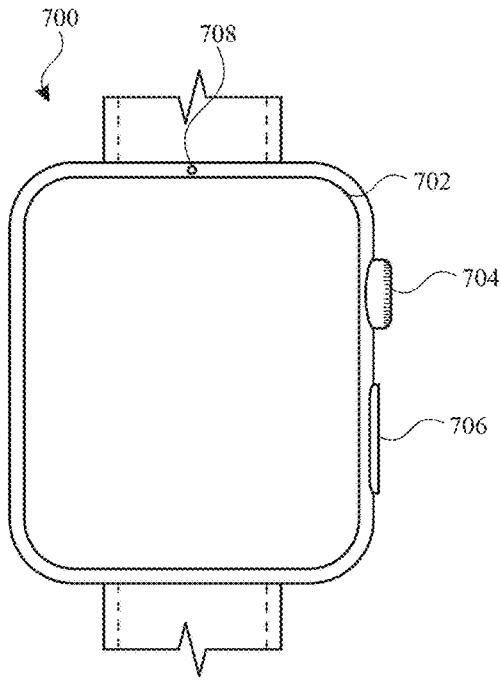
Figure 9F:
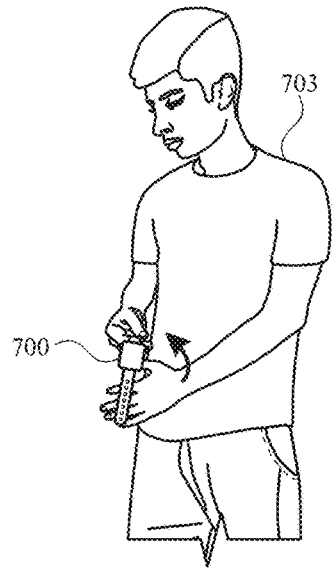

In FIG. 9F, user 703 has removed electronic device 700 from his body. Electronic device 700 detects that electronic device 700 is no longer positioned on the body of the user. In response to detecting that electronic device 700 is no longer positioned on the body of the user, electronic device 700 optionally logs out of any user account into which it was logged in, including ceasing to apply device calibration settings that were being applied for user 703. Logging out of a user account can include, for example, ceasing to display a user interface that was being displayed prior to the device 700 being removed from the user's body, ceasing to apply one or more user settings that were being applied (e.g., device calibration settings), and/or ceasing to provide access to secure content associated with the user account.

In the depicted embodiments, electronic device 700 is a smartwatch, and FIGS. 9A-9F depict user 703 putting the smartwatch on his wrist, or taking the smartwatch off his wrist, and also providing user inputs 903a-903e via the smartwatch. However, as discussed above, in some embodiments, electronic device 700 is a different device, such as a head-mounted system (e.g., a headset) that is designed to be worn on the user's head. In such embodiments, electronic device 700 optionally attempts to automatically identify the user when it is determined that the electronic device 700 has been placed on the user's head (e.g., based on iris recognition and/or facial recognition when the device is placed on the user's head). Additionally, in such embodiments, content, such as user interface 902, is optionally displayed via the head-mounted system, and one or more user inputs (e.g., user inputs 903a-903e) are received via one or more input devices in communication with the head-mounted system. Similarly, device calibration settings are optionally applied for the head-mounted system and the one or more input devices in communication with the head-mounted system. For example, device calibration settings can include eye gaze calibration settings, head movement calibration settings, hand and/or arm movement calibration settings, torso calibration settings, and/or foot and/or leg calibration settings.

FIGS. 10A-10B are a flow diagram illustrating a method for automatically applying one or more device calibration settings based on identification of a user using an electronic device in accordance with some embodiments. Method 1000 is performed at a computer system (e.g., 101, 700) in communication with a display generation component and one or more input devices. Some operations in method 1000 are, optionally, combined, the orders of some operations are, optionally, changed, and some operations are, optionally, omitted.

As described below, method 1000 provides an intuitive way for automatically applying one or more device calibration settings based on identification of a user. The method reduces the cognitive burden on a user for applying device calibration settings, thereby creating a more efficient human-machine interface. For battery-operated computing devices, enabling a user to applying device calibration settings faster and more efficiently conserves power and increases the time between battery charges.

In some embodiments, a computer system (e.g., device 700, computer system 101) (e.g., a smart phone, a smart watch, a tablet, a head-mounted device and/or a wearable device) that is in communication with a display generation component (e.g., display 702) (e.g., a display controller; a touch-sensitive display system; a display (e.g., integrated and/or connected), a 3D display, a transparent display, a projector, and/or a heads-up display) and one or more input devices (e.g., 702, 704, 706, 708) (e.g., a touch-sensitive surface (e.g., a touch-sensitive display); a mouse; a keyboard; a remote control; a visual input device (e.g., a camera); an audio input device (e.g., a microphone); and/or a biometric sensor (e.g., a fingerprint sensor, a face identification sensor, and/or an iris identification sensor)), detects (1002) that at least a portion of the computer system has been placed on a body of a respective user (e.g., user 703). Subsequent to detecting that at least a portion of the computer system has been placed on the body of the respective user (1004), the computer system detects an input (e.g., user inputs 903a-903e in FIG. 9B) from the respective user based on a movement or position of at least a portion of the body of the respective user (e.g., a position of a respective user's head, hands, eyes or other body part).

In response to detecting the input from the respective user, the computer system (e.g., device 700) responds (1010) to the input (e.g., user inputs 903a-903e in FIG. 9B) from the respective user. In accordance with a determination that the respective user is a first user that has previously registered with the computer system (1012) (e.g., based on an option selected by the respective user identifying the respective user as the first user or based on automatic biometric identification of the respective user as the first user), the computer system generates (1014) a response to the input based on the movement or position of the portion of the respective user's body and a first set of device calibration settings (e.g., movement calibration, hand calibration, and/or eye calibration) that are specific to the first user (e.g., FIG. 9C). In accordance with a determination that the respective user is not the first user (1016) (e.g., based on an option selected by the respective user indicating that the respective user is not the first user or based on automatic biometric identification of the respective user as someone other than the first user), the computer system generates (1018) a response to the input (e.g., user inputs 903a-903e in FIG. 9B) based on the movement or position of the portion of the respective user's body and without using the first set of device calibration settings that are specific to the first user (e.g., FIG. 9D).

In some embodiments, generating a response to the input based on the movement or position of the portion of the respective user's body and without using the first set of device calibration settings includes generating a response to the input based on the movement or position of the portion of the respective user's body and a second set of device calibration settings different from the first set of device calibration settings (e.g., a default set of device calibration settings, and/or guest device calibration settings) (e.g., without applying the first set of device calibration settings).

In some embodiments, in response to detecting that at least the portion of the computer system has been placed on the body of the respective user, the computer system receives, via the one or more input devices, biometric information (e.g., corresponding to the respective user). In accordance with a determination that biometric information received via the one or more input devices (e.g., a fingerprint, an image (e.g., a photograph, and/or a scan) representative of the respective user's face, and/or iris identification information (e.g., iris scan information)) corresponds to a first registered user (e.g., a first registered user of a plurality of users) (e.g., a user that has been previously registered on the computer system), the computer system applies a first set of device calibration settings corresponding to the first registered user (e.g., movement calibration, hand calibration, and/or eye calibration) (e.g., without applying the second set of device calibration settings); and in accordance with a determination that the biometric information received via the one or more input devices does not correspond to a registered user (e.g., does not correspond to any user that has previously registered on the computer system), the computer system applies a second set of device calibration settings different from the first set of device calibration settings (e.g., a default set of device calibration settings, and/or guest device calibration settings) (e.g., without applying the first set of device calibration settings)).

Automatically applying a first set of device calibration settings specific to a first user when it is determined that the respective user is the first user provides the user the ability to use the system with user-specific settings without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, generating the response to the input (e.g., user inputs 903a-903e in FIG. 9B) based on the movement or position of the portion of the respective user's body and without using the first set of device calibration settings that are specific to the first user comprises: in accordance with a determination that the respective user is an unregistered user (1020) (e.g., is not a user that is registered on the computer system) (e.g., based on an option selected by the respective user indicating that the respective user is not a registered user (e.g., is a guest user), or based on automatic biometric identification of the respective user as an unregistered user), generating (1022) a response to the input (e.g., user inputs 903a-903e in FIG. 9B) based on the movement or position of the portion of the respective user's body and a second set of device calibration settings (e.g., movement calibration, hand calibration, and/or eye calibration) that are different from the first set of device calibration settings and that represent a set of guest device calibration settings for an unregistered user (e.g., without applying the first set of device calibration settings) (e.g., FIG. 9E). In some embodiments, the second set of device calibration settings that represent the set of guest device calibration settings are applied for any user that is identified as an unregistered user. In some embodiments, subsequent to generating the response to the input based on the movement or position of the portion of the respective user's body and the second set of device calibration settings that represent a set of guest device calibration settings for an unregistered user, the computer system detects that the computer system has been removed from the body of the respective user. Subsequent to detecting that the computer system has been removed from the body of the respective user, the computer system detects that at least a portion of the computer system has been placed on a body of a second respective user, wherein the second respective user is different from the respective user. Subsequent to detecting that at least a portion of the computer system has been placed on the body of the second respective user, the computer system detects an input from the second respective user based on a movement or position of at least a portion of the body of the second respective user. In response to detecting the input from the second respective user, the computer system responds to the input from the second respective user, including: in accordance with a determination that the second respective user is an unregistered user (e.g., is not a user that is registered on the computer system) (e.g., based on an option selected by the second respective user indicating that the second respective user is not a registered user (e.g., is a guest user), or based on automatic biometric identification of the second respective user as an unregistered user), generating a response to the input from the second respective user based on the movement or position of the portion of the second respective user's body and the second set of device calibration settings that represent the set of guest device calibration settings for an unregistered user (e.g., without applying the first set of device calibration settings).

Automatically applying a second set of device calibration settings for an unregistered user when it is determined that the respective user is an unregistered user provides the user the ability to use the system with various settings without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, generating the response to the input based on the movement or position of the portion of the respective user's body and without using the first set of device calibration settings that are specific to the first user comprises: in accordance with a determination that the respective user is a second user that has previously registered with the computer system different from the first user (1024) (e.g., based on an option selected by the respective user or based on automatic biometric identification of the respective user as the second user), generating (1026) a response to the input (e.g., user inputs 903a-903e in FIG. 9B) based on the movement or position of the portion of the respective user's body and a third set of device calibration settings (e.g., movement calibration, hand calibration, and/or eye calibration) that are different from the first set of device calibration settings and are specific to the second user (e.g., without applying the first set of device calibration settings) (e.g., FIG. 9D).

Automatically applying a third set of device calibration settings specific to a second user when it is determined that the respective user is the second user provides the user the ability to use the system with user-specific settings without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of device calibration settings are determined based on a plurality of device calibration inputs received from the first user. In some embodiments, the plurality of device calibration inputs are received as part of an enrollment process for registering the first user on the computer system) (e.g., one or more hand movement inputs, arm movement inputs, eye (e.g., iris) movement inputs that are detected in response to one or more prompts, such as prompts to perform a predetermined gesture or move eyes in a predetermined gaze pattern). Tailoring device calibration settings to a user based on device calibration inputs received from the user enables a device to respond to user inputs more accurately and efficiently. Tailoring device calibration and response to a particular user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, generating the response to the input (e.g., user inputs 903a-903e in FIG. 9B) based on the movement or position of the portion of the respective user's body and without using the first set of device calibration settings that are specific to the first user comprises: in accordance with a determination that the respective user is an unregistered user (e.g., is not a user that has been previously registered on the computer system) (e.g., based on an option selected by the respective user indicating that the respective user is not a registered user (e.g., is a guest user), or based on automatic biometric identification of the respective user as an unregistered user), generating a response to the input based on the movement or position of the portion of the respective user's body and a second set of device calibration settings (e.g., movement calibration, hand calibration, and/or eye calibration) that are different from the first set of device calibration settings and that represent a set of guest device calibration settings for an unregistered user (e.g., without applying the first set of device calibration settings) (e.g., FIG. 9E), wherein the second set of device calibration settings are determined based on a plurality of device calibration inputs received from the unregistered user. In some embodiments, the plurality of device calibration inputs from the unregistered user are optional, and a default set of device calibration settings can be applied without receiving a plurality of device calibration inputs from the unregistered user. In some embodiments, the plurality of device calibration inputs from the unregistered user are mandatory, and the unregistered user cannot proceed to interact with the user interface until the plurality of device calibration inputs have been received from the unregistered user.

In some embodiments, subsequent to detecting that at least a portion of the computer system has been placed on the body of the respective user, and in accordance with a determination that the respective user is an unregistered user, the computer system displays one or more prompts to the unregistered user to provide a plurality of device calibration inputs; and wherein generating the response to the input based on the movement or position of the portion of the respective user's body and without using at least some of the first set of device calibration settings that are specific to the first user comprises, subsequent to displaying the one or more prompts to the unregistered user to provide the plurality of device calibration inputs: in accordance with a determination that the unregistered user has provided the plurality of device calibration inputs, generating a response to the input based on the movement or position of the portion of the respective user's body and a second set of device calibration settings (e.g., movement calibration, hand calibration, and/or eye calibration) that are different from the first set of device calibration settings, wherein the second set of device calibration settings are determined based on the plurality of device calibration inputs received from the unregistered user; and in accordance with a determination that the unregistered user has not provided the plurality of device calibration inputs (e.g., the unregistered user has declined to provide the plurality of device calibration inputs and/or a threshold period of time has passed without the unregistered user providing the plurality of device calibration inputs), generating a response to the input based on the movement or position of the portion of the respective user's body and a third set of device calibration settings that are different from the first and second sets of device calibration settings, wherein the third set of device calibration settings represent a default set of guest calibration settings.

In some embodiments, subsequent to detecting that at least a portion of the computer system has been placed on the body of the respective user, and in accordance with a determination that the respective user is an unregistered user, the computer system displays one or more prompts to the unregistered user to provide a plurality of device calibration inputs; and wherein generating the response to the input based on the movement or position of the portion of the respective user's body and without using at least some of the first set of device calibration settings that are specific to the first user comprises, subsequent to displaying the one or more prompts to the unregistered user to provide the plurality of device calibration inputs: in accordance with a determination that the unregistered user has provided the plurality of device calibration inputs, generating a response to the input based on the movement or position of the portion of the respective user's body and a second set of device calibration settings (e.g., movement calibration, hand calibration, and/or eye calibration) that are different from the first set of device calibration settings, wherein the second set of device calibration settings are determined based on a plurality of device calibration inputs received from the unregistered user; and in accordance with a determination that the unregistered user has not provided the plurality of device calibration inputs (e.g., the unregistered user has declined to provide the plurality of device calibration inputs and/or a threshold period of time has passed without the unregistered user providing the plurality of device calibration inputs), forgoing generating a response to the input based on the movement or position of the portion of the respective user's body.

Tailoring device calibration settings to a user based on device calibration inputs received from the user enables a device to respond to user inputs more accurately and efficiently. Tailoring device calibration and response to a particular user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of device calibration inputs received from the unregistered user are a subset of device calibration inputs that are less than the plurality of device calibration inputs received from the first user. Tailoring device calibration settings to a user based on device calibration inputs received from the user enables a device to respond to user inputs more accurately and efficiently. Tailoring device calibration and response to a particular user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, generating the response to the input (e.g., navigation within user interface 901 in FIGS. 9C-9E) based on the movement or position of the portion of the respective user's body and without using the first set of device calibration settings that are specific to the first user comprises: in accordance with a determination that the respective user is an unregistered user (e.g., is not a user that has been previously registered on the computer system) (e.g., based on an option selected by the respective user indicating that the respective user is not a registered user (e.g., is a guest user), or based on automatic biometric identification of the respective user as an unregistered user), generating a response to the input based on the movement or position of the portion of the respective user's body and a second set of device calibration settings (e.g., movement calibration, hand calibration, and/or eye calibration) that are different from the first set of device calibration settings and that represent a set of guest device calibration settings for an unregistered user (e.g., without applying the first set of device calibration settings) (e.g., guest calibration settings applied in FIG. 9E), wherein the second set of device calibration settings are a default set of device calibration settings and are not based on user input from the unregistered user.

Automatically applying a second set of device calibration settings for an unregistered user when it is determined that the respective user is an unregistered user provides the user the ability to use the system with various settings without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of device calibration settings includes one or more eye and/or gaze movement calibration settings. Tailoring device calibration settings, including eye calibration settings, to a user enables a device to respond to user inputs more accurately and efficiently. Tailoring device calibration and response to a particular user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of device calibration settings includes one or more hand movement calibration settings. Tailoring device calibration settings, including hand calibration settings, to a user enables a device to respond to user inputs more accurately and efficiently. Tailoring device calibration and response to a particular user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, generating the response to the input based on the movement or position of the portion of the respective user's body and the first set of device calibration settings that are specific to the user comprises enabling the computer system (e.g., 700) to be used with the first set of device calibration settings that are specific to the first user. While the computer system is enabled to be used with the first set of device calibration settings that are specific to the first user (e.g., while the computer system is logged into the first user account), the computer system detects that the at least the portion of the computer system has been removed from the body of the respective user (e.g., detecting that the computer system is no longer being worn by the respective user). In response to detecting that the at least the portion of the computer system has been removed from the body of the respective user (e.g., for longer than a predetermined threshold duration of time), the computer system ceases to enable the computer system to be used with the first set of device calibration settings that are specific to the first user (e.g., FIG. 9F) (e.g., logging the computer system out of the first user account associated with the first user). In some embodiments, logging the computer system out of the first user account includes removing application of the first set of device calibration settings that are specific to the first user. In some embodiments, in response to detecting that the at least the portion of the computer system has been removed from the body of the respective user for longer than a predetermined threshold duration of time, the computer system is logged out of the first user account independent of how the computer system was logged into the first user account (e.g., whether by biometric authentication, passcode authentication, or other authentication).

Ceasing to enable the computer system to be used with the first set of device calibration settings that are specific to the first user (e.g., logging the computer system out of the first user account) when it is determined that the computer system has been removed from the body of the respective user enhances security. For example, ceasing to enable the computer system to be used with the first set of device calibration settings (e.g., logging the computer system out of the first user account) when it is determined that the computer system has been removed from the body of the respective user can prevent unauthorized users from initiating sensitive operations. Ceasing to enable the computer system to be used with the first set of device calibration settings (e.g., logging the computer system out of the first user account) when it is determined that the computer system has been removed from the body of the respective user also enhances the operability of the device and makes the user-device interface more efficient (e.g., by restricting unauthorized access, and by preventing users from using the device with device calibration settings specific to another user) which, additionally, reduces power usage and improves battery life of the device by limiting the performance of restricted operations.

In some embodiments, the determination that the respective user is the first user is performed automatically in response to detecting that at least the portion of the computer system has been placed on the body of a user (e.g., FIG. 9A) (e.g., automatic biometric identification/authentication based on biometric information collected from the respective user via the one or more input devices).

Automatically identifying a user, and applying a user-specific set of device calibration settings, when it is determined that at least a portion of a computer system has been placed on the body of the user provides the user the ability to use the system with user-specific settings without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIGS. 10A-10B) are also applicable in an analogous manner to the methods described elsewhere herein. For example, methods 800, 1200, and/or 1400 optionally include one or more of the characteristics of the various methods described above with reference to method 1000. For example, a set of device calibration settings that are specific to a user can be automatically applied as part of the one or more settings associated with a user recited in method 800, and/or a set of device calibration settings that are specific to a user can be automatically applied along with a user-specific avatar, as recited in method 1200. In another example, user-specific device calibration settings can be applied and/or unapplied based on automatic user identification when a device is handed off between users, as recited in method 1400. For brevity, these details are not repeated below.

FIGS. 11A-11F illustrate exemplary user interfaces for automatically applying and displaying a user avatar based on identification of a user, in accordance with some embodiments. The user interfaces in these figures are used to illustrate the processes described below, including the processes in FIGS. 12A-12B.

FIG. 11A depicts an electronic device 700, which is a smartwatch that includes a touch-sensitive display 702, a rotatable and depressible input mechanism 704 (e.g., rotatable and depressible in relation to a housing or frame of the device), a button 706, and a camera 708. In some embodiments described below, electronic device 700 is a wearable smartwatch device. In some embodiments, electronic device 700 is a smart phone, a tablet, a head-mounted system (e.g., a headset), or other computer system that includes and/or is in communication with a display device (e.g., display screen, projection device, and the like). Electronic device 700 is a computer system (e.g., computer system 101 in FIG. 1).

At FIG. 11A, user 703 places electronic device 700 on his wrist. Electronic device 700 detects (e.g., via one or more sensors) that electronic device 700 has been placed on the body of a user. In some embodiments, electronic device 700 detects that one or more criteria have been satisfied indicating that electronic device 700 has been placed on the body of a user.

In the depicted embodiment, electronic device 700 is a smartwatch, and FIG. 11A depicts user 703 placing the smartwatch on his wrist. However, as discussed above, in some embodiments, electronic device 700 is a different device, such as a head-mounted system (e.g., a headset) that is designed to be worn on the user's head. In such embodiments, electronic device 700 detects (e.g., via one or more sensors) that electronic device 700 has been placed on the head of a user and/or detects that one or more criteria have been satisfied indicating that electronic device 700 has been placed on the head of a user.

In FIG. 11A, in response to detecting that electronic device 700 has been placed on the body of a user, electronic device 700 attempts to automatically identify user 703. In some embodiments, electronic device 700 attempts to identify user 703 in various ways. For example, electronic device 700 optionally attempts to automatically identify the user based on biometric information, such as facial recognition, eye (e.g., iris) recognition, and/or fingerprint recognition. In FIG. 7A, electronic device 700 collects biometric information (e.g., a facial scan and/or eye (e.g., iris) scan using camera 708) in response to detecting that electronic device 700 has been placed on the body of the user. In the example scenario depicted in FIG. 11A, electronic device 700 determines that biometric information from user 703 corresponds to a first registered user, John.

In FIG. 11A, electronic device 700 displays (e.g., after determining that biometric information from user 703 corresponds to the first registered user) user interface 1102 that includes selectable object 1104. Selectable object 1104 corresponds to a co-presence application in which multiple users can enter a co-presence environment to communicate with one another, as will be described in greater detail with respect to later figures. In some embodiments, the co-presence environment is an XR environment (e.g., virtual environment) with one or more avatars that represent users that are present in the XR environment. Electronic device 700 detects user input 1106 at a position on the user interface 1102 that corresponds to selection of selectable object 1104.

In FIG. 11B, in response to user input 1106, electronic device 700 replaces display of user interface 1102 with co-presence user interface 1108. Co-presence user interface 1108 includes first avatar 1110 and second avatar 1112. First avatar 1110 has a visual appearance that corresponds to a remote user that is participating in a co-presence situation with user 703. For example, the remote user is a registered user (e.g., a registered user on a remote electronic device being operated by the registered user; a registered user of a service), and a user account corresponding to the remote user can be associated with avatar appearance information (e.g., avatar appearance information selected and/or specified by the remote user). As discussed above, in FIG. 11A, electronic device 700 has identified user 703 to be the first registered user, John. Based on this identification, electronic device 700 displays avatar 1112, which is an avatar with a visual appearance that corresponds to the first registered user (e.g., corresponds to a first user account that corresponds to the first registered user). In some embodiments, the first registered user has selected and/or specified one or more visual characteristics of avatar 1112 (e.g., hair color, hair shape, face shape, face size, eye color, eye size, mouth shape, mouth size, nose shape, nose size, and/or skin color). In some embodiments, one or more visual features of avatar 1112 move within user interface 1108 in response to movement by user 703. For example, if user 703 moves his or her head, eyebrows, eyes, nose, and/or mouth, avatar 1112 optionally move in a corresponding fashion within the co-presence user interface 1108. Similarly, one or more visual features of avatar 1110 optionally move within user interface 1108 in response to movement by the remote user. While the depicted co-presence user interface 1108 shows avatars 1110, 1112 that include only a head, avatars can include representations of additional portions of a user's body, and those avatar portions can, in some embodiments, move in accordance with corresponding movement by the user of the respective portions of the user's body.

While FIG. 11B is shown from the perspective of electronic device 700, as seen by user 703, it can be understood that analogous features can be described from the perspective of the remote user (represented by avatar 1110) and the electronic device being used and/or operated by the remote user. The remote user's electronic device optionally displays a co-presence user interface similar to co-presence user interface 1108, and optionally displays the two avatars 1110, 1112 that correspond to the remote user and the first registered user (user 703).

In the depicted embodiment, electronic device 700 is a smartwatch, and FIGS. 11A-11B depict user interfaces (e.g., 1102, 1108) via a touch-screen display 702 of electronic device 700. However, as discussed above, in some embodiments, electronic device 700 is a different device, such as a head-mounted system (e.g., a headset) that is designed to be worn on the user's head. In some embodiments, a head-mounted system displays a user interface substantially similar to user interface 1102 of FIG. 11A, and receives one or more user inputs corresponding to selection of selectable object 1104. The user interface may differ in one or more respects from user interface 1102. For example, in some embodiments, the user interface displayed by the head-mounted system is a virtual, three-dimensional user interface, whereas user interface 1102 is displayed as a two-dimensional user interface. The one or more user inputs can include, for example, eye/gaze movement, hand movement, and one or more gestures corresponding to selection of selectable object 1104. In some embodiments, in response to the one or more user inputs corresponding to selection of selectable object 1104, the head-mounted system displays a co-presence user interface substantially similar to user interface 1108. The co-presence user interface may differ in one or more respects from user interface 1108. For example, in some embodiments, the co-presence user interface is a virtual, three-dimensional user interface with avatars (e.g., three-dimensional representations) of each user that is taking part in a co-presence session (similar to avatars 1110 and 1112 of FIG. 11B). Similar to what was described above with reference to FIG. 11B, in some embodiments, the avatar representation of each user has one or more visual features that are selected and/or specified by the respective user the avatar represents. Furthermore, in some embodiments, the avatar representation of each user has one or more visual features that move within the three-dimensional virtual environment based on movement of the respective user the avatar represents.

In FIG. 11C, user 703 has removed electronic device 700 from his body. Electronic device 700 detects that electronic device 700 is no longer positioned on the body of the user. In some embodiments, in response to detecting that electronic device 700 is no longer positioned on the body of the user, electronic device 700 ceases to display avatar 1112 within the co-presence user interface 1108 (similarly, the remote electronic device being operated by the remote user can also cease to display the avatar that is presentative of and corresponds to the first registered user 703).

Figure 11D:
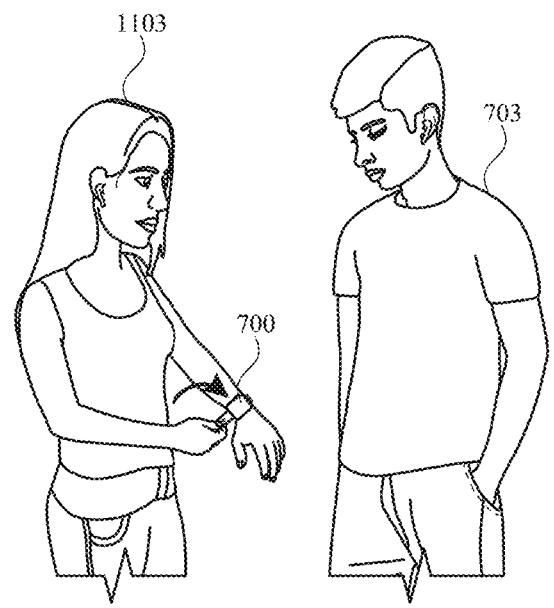
Figure 12A:
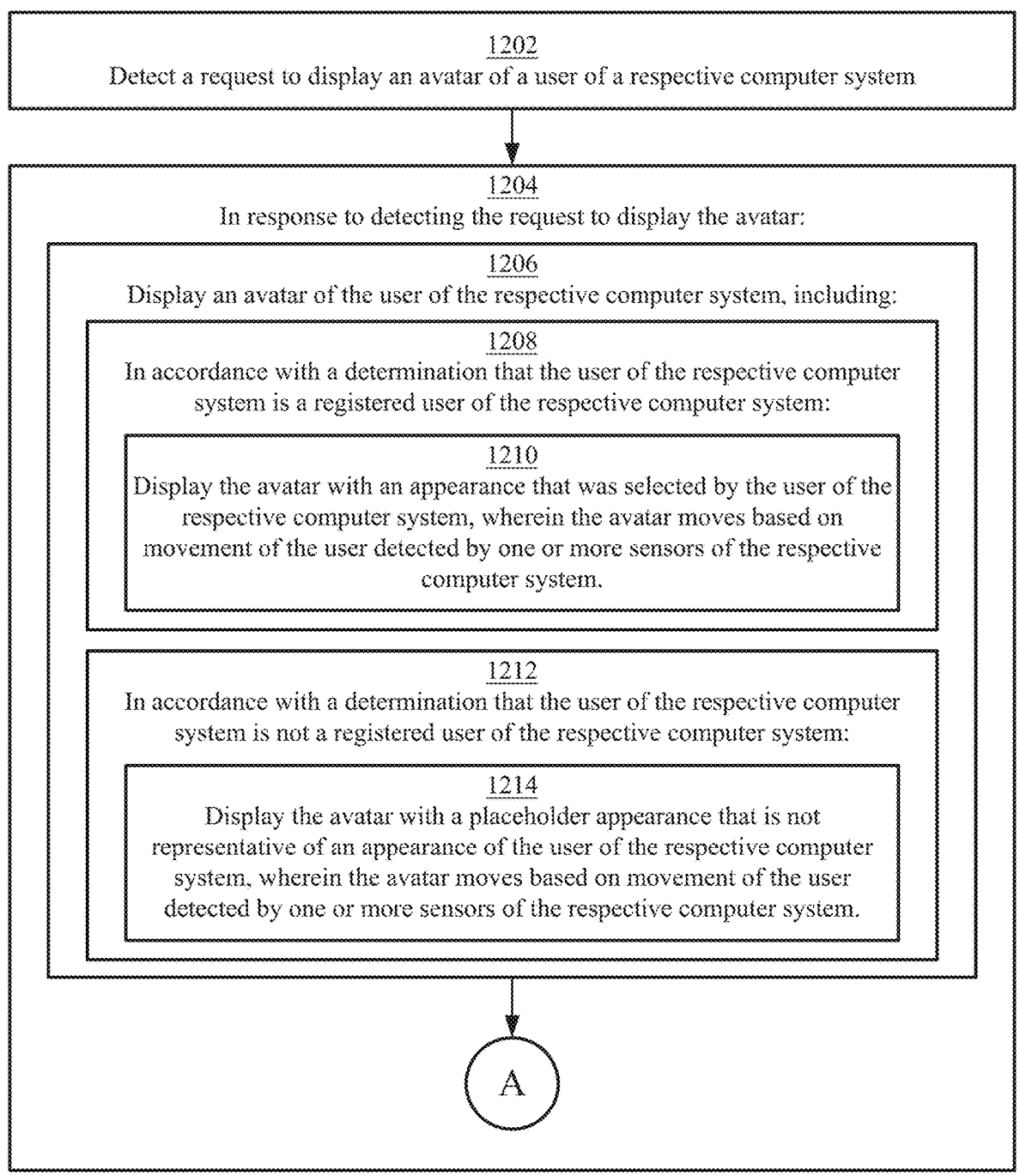

In FIG. 11D, a second user 1103 (different from the first user and different from the remote user), places the electronic device 700 on her wrist. Electronic device 700 detects that electronic device 700 has been placed on the body of a user.

In the depicted embodiment, electronic device 700 is a smartwatch, and FIGS. 11A-11B depict user interfaces (e.g., 1102, 1108) via a touch-screen display 702 of electronic device 700. However, as discussed above, in some embodiments, electronic device 700 is a different device, such as a head-mounted system (e.g., a headset) that is designed to be worn on the user's head. In some such embodiments, in FIG. 11C, the head-mounted system detects that the head-mounted system is no longer positioned on user 703's head. In response to detecting that the head-mounted system is no longer positioned on a user 703's head, the head-mounted system ceases to display a representation of user 703 (e.g., ceases to display an (e.g., three dimensional) avatar associated with user 703) within a virtual (e.g., three-dimensional) co-presence environment. In FIG. 11D, user 1103 places the head-mounted system on her head, and the head-mounted system detects that the head-mounted system has been placed on the head of a user.

In FIG. 11D, in response to detecting that electronic device 700 has been placed on the body of a user, electronic device 700 attempts to automatically identify user 1103. In some embodiments, electronic device 700 optionally attempts to identify user 1103 in various ways. For example, electronic device 700 optionally attempts to automatically identify the user based on biometric information, such as facial recognition, eye (e.g., iris) recognition, and/or fingerprint recognition. In FIG. 11D, electronic device 700 collects biometric information (e.g., a facial scan and/or eye (e.g., iris) scan using camera 708) from user 1103 in response to detecting that electronic device 700 has been placed on the body of the user, and determines that the biometric information corresponds to a second registered user, Sarah.

As discussed above, the first registered user 703 is associated with a particular set of avatar appearance information, and avatar 1112 was displayed using the avatar appearance information that corresponds to the first registered user 703. Similarly, the second registered user, Sarah, is associated with a second set (different from the first set) of avatar appearance information such that the second registered user is represented by an avatar having a visual appearance that is different from the avatar of the first registered user.

Figure 11E:
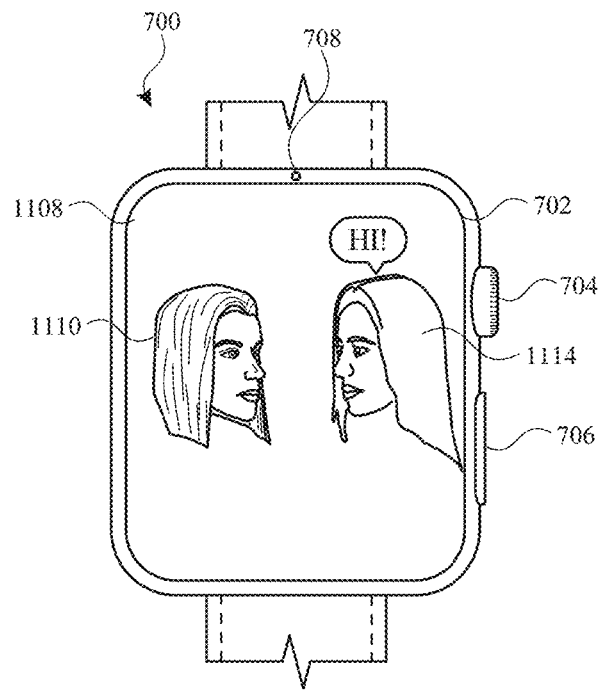

In FIG. 11E, in response to determining that user 1103 is the second registered user (e.g., in response to determining that biometric information corresponds to the second registered user), electronic device 700 displays a new avatar 1114 that has a visual appearance that corresponds to the second registered user (e.g., having one or more visual features that have been selected and/or specified by the second registered user). Similar to avatar 1112, in some embodiments, one or more visual features of avatar 1114 optionally move within user interface 1108 in response to movement by user 1103. For example, if user 1103 moves her head, eyebrows, eyes, nose, and/or mouth, avatar 1114 moves in a corresponding fashion within the co-presence user interface 1108 (though avatar 1114 does not move based on movements of user 703). It can be appreciated that, based on automated user identification (e.g., based on biometric identification), electronic device 700 automatically displayed avatar 1112 that corresponds to the first registered user 703, and then, when the user of electronic device 700 switched from first registered user 703 to second registered user 1103, electronic device 700 automatically replaced display of avatar 1112 with display of avatar 1114 that corresponds to the second registered user.

Figure 11F:
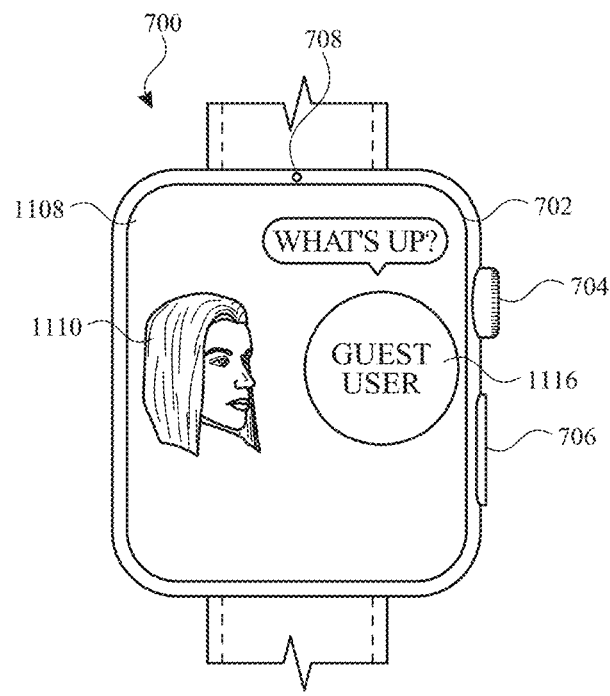

FIG. 11F depicts a different example scenario in which second user 1103 is an unregistered, guest user. In this example scenario, electronic device 700 has determined that second user 1103 is an unregistered user (e.g., based on biometric information). In response to determining that the second user 1103 is an unregistered user, electronic device 700 displays, within co-presence environment 1108, avatar 1116 that has a placeholder appearance with a default set of visual features. For example, in FIG. 11F, the placeholder appearance is an abstract, circle representation. In some embodiments, whereas a registered user can select and/or specify one or more visual characteristics of his or her representative avatar, an unregistered guest user is optionally not given the option to select and/or specify visual characteristics of his or her avatar.

In the illustrated embodiments, electronic device 700 is a smartwatch, and FIGS. 11A-11F depict users 703, 1103 putting the smartwatch on their wrists, or taking the smartwatch off their wrists. However, as discussed above, in some embodiments, electronic device 700 is a different device, such as a head-mounted system (e.g., a headset) that is designed to be worn on the user's head. In such embodiments, electronic device 700 optionally attempts to automatically identify the user when it is determined that electronic device 700 has been placed on the user's head (e.g., based on iris recognition and/or facial recognition when the device is placed on the user's head). Additionally, in such embodiments, content, such as user interface 1108 and avatars 1110, 1112, 1114, 1116, are optionally displayed via the head-mounted system, and one or more user inputs can be received via one or more input devices in communication with the head-mounted system For example, in FIG. 11E, in response to detecting that the head-mounted system has been placed on the head of user 1103, the head-mounted system identifies user 1103 (e.g., via iris-scan authentication) as the second registered user. In some embodiments, in response to identifying user 1103 as the second registered user, the head-mounted system replaces display of an avatar corresponding to user 703 within a three-dimensional virtual co-presence environment with an (e.g., three-dimensional) avatar corresponding to user 1003. In some embodiments, in FIG. 11F, if the head-mounted system identifies user 1103 as an unregistered and/or guest user, the head-mounted system replaces display of an avatar corresponding to user 703 within a three-dimensional co-presence environment with an (e.g., three-dimensional) avatar corresponding to an unregistered and/or guest user.

FIGS. 12A-12B are a flow diagram illustrating a method for automatically applying and displaying a user avatar based on identification of a user using an electronic device in accordance with some embodiments. Method 1200 is performed at a first computing system (e.g., 700, 101) that is in communication with a display generation component and one or more input devices. Some operations in method 1200 are, optionally, combined, the orders of some operations are, optionally, changed, and some operations are, optionally, omitted.

As described below, method 1200 provides an intuitive way for automatically applying and displaying a user avatar based on identification of a user. The method reduces the cognitive burden on a user for displaying a user avatar, thereby creating a more efficient human-machine interface. For battery-operated computing devices, enabling a user to display user avatars faster and more efficiently conserves power and increases the time between battery charges.

In some embodiments, a first computer system (e.g., device 700, computer system 101) (e.g., a smart phone, a smart watch, a tablet, a head-mounted system, a wearable device) that is in communication with a display generation component (e.g., display 702) (e.g., a display controller; a touch-sensitive display system; a display (e.g., integrated or connected), a 3D display, a transparent display, a projector, a heads-up display) and one or more input devices (e.g., 702, 704, 706, 708)(e.g., a touch-sensitive surface (e.g., a touch-sensitive display); a mouse; a keyboard; a remote control; a visual input device (e.g., a camera); an audio input device (e.g., a microphone); a biometric sensor (e.g., a fingerprint sensor, a face identification sensor, an iris identification sensor)) detects (1202) a request to display an avatar (e.g., user input 1106) (e.g., a request to enter a co-presence communication session or display a virtual environment (e.g., XR environment (e.g., virtual reality (VR), augmented reality (AR), and/or mixed reality (MR))) that includes an avatar representation of a user of the first computer system and/or an avatar representation of a user of a second computer system) of a user of a respective computer system (e.g., the first computer system or a second computer system that is different from the first computer system) (e.g., user 703, user 1103, and/or a remote user represented by avatar 1110). In some embodiments, the request to display the avatar of the user of the respective computer system corresponds to a request to enter into a communication session that includes the user of the respective computer system (e.g., and one or more other users of other computer systems). In some embodiments, the request to display the avatar of the user of the respective computer system occurs during a communication session that includes the user of the respective computer system (e.g., and one or more other users of other computer systems)).

In response to detecting the request to display the avatar (1204) (e.g., user input 1106), the first computer system displays (1206) an avatar of the user of the respective computer system (e.g., 1110, 1112, 1114, 1116). In accordance with a determination that the user of the respective computer system is a registered user of the respective computer system (1208) (e.g., based on an option selected by the user and/or one or more user inputs indicating that the user is a registered user, and/or based on automatic biometric identification of the user as a registered user), the first computer system displays (1210) the avatar with an appearance that was selected by the user of the respective computer system (e.g., based on information provided by the user during an enrollment process such as a biometric scan or avatar creation process) (e.g., avatars 1110, 1112, 1114), wherein the avatar moves based on movement of the user detected by one or more sensors of the respective computer system. In some embodiments, facial features of the avatar move based on movement of the user's face detected by one or more sensors of the respective computer system. In some embodiments, the determination that the user of the respective computer system is a registered user of the respective computer system is performed in response to a determination that at least a portion of the respective computer system has been placed on a body of the user of the respective computer system. In some embodiments, biometric information (e.g., corresponding to the user of the respective computer system) is received (e.g., by and/or at the respective computer system) in response to detecting that the respective computer system has been placed on the body of the user of the respective computer system. In some embodiments, the avatar is displayed within an XR environment (e.g., virtual reality (VR), augmented reality (AR), and/or mixed reality (MR)) (e.g., within co-presence user interface 1008).

In accordance with a determination that the user of the respective computer system is not a registered user of the respective computer system (1212) (e.g., based on an option selected by the user and/or one or more user inputs indicating that the user is not a registered user, and/or based on automatic biometric identification of the user as not being a registered user), the first computer system displays (1214) the avatar with a placeholder appearance that is not representative of an appearance of the user of the respective computer system (in some embodiments, and was not selected by the user of the respective computer system) (e.g., avatar 1116 of FIG. 11F), wherein the avatar moves based on movement of the user detected by one or more sensors of the respective computer system. In some embodiments, features of the avatar move based on movement of the user's body detected by one or more sensors of the respective computer system. In some embodiments, the determination that the user of the respective computer system is not a registered user of the respective computer system is performed in response to a determination that at least a portion of the respective computer system has been placed on a body of the user of the respective computer system. In some embodiments, biometric information (e.g., corresponding to the user of the respective computer system) is received (e.g., by and/or at the respective computer system) in response to detecting that the respective computer system has been placed on the body of the user of the respective computer system. In some embodiments, the respective computer system is the first computer system, and the user of the respective computer system is a user of the first computer system. In some embodiments, the determination that the user of the respective computer system is a registered user of the respective computer system is a determination that the user of the first computer system is a registered user of the first computer system. In some embodiments, the determination that the user of the respective computer system is a registered user of the respective computer system is performed at and/or by the first computer system. In some embodiments, the determination that the user of the respective computer system is not a registered user of the respective computer system is performed at and/or by the first computer system. In some embodiments, the respective computer system is a second computer system different from the first computer system, and the user of the respective computer system is a user of second computer system. In some embodiments, the determination that the user of the respective computer system is a registered user of the respective computer system is a determination that the user of the second computer system is a registered user of the second computer system. In some embodiments, the determination that the user of the respective computer system is a registered user of the respective computer system is performed at and/or by the second computer system. In some embodiments, the determination that the user of the respective computer system is not a registered user of the respective computer system is a determination that the user of the second computer system is not a registered user of the second computer system. In some embodiments, the determination that the user of the respective computer system is not a registered user of the respective computer system is performed at and/or by the second computer system.

Displaying an avatar with a particular appearance based on a determination that the user of the respective computer system is a registered user of the respective computer system provides the user with feedback about the current state of the device (e.g., that the user of the respective computer system is a registered user (e.g., a particular registered user)). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically displaying an avatar with a particular appearance based on a determination that the user of the respective computer system is a registered user of the respective computer system provides the device with the ability to switch between different avatars associated with different users without requiring complex and/or numerous user inputs. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying an avatar with a placeholder appearance when it is determined that the user is not a registered user provides security. Displaying an avatar with a placeholder appearance when it is determined that the user is not a registered user provides also enhances the operability of the device and makes the user-device interface more efficient and/or secure (e.g., by restricting unauthorized access) which, additionally, reduces power usage and improves battery life of the device by limiting the performance of restricted operations.

In some embodiments, the avatar (e.g., 1112) is visually representative of a user of the first computer system (1216) (e.g., the respective computer system is the first computer system) (e.g., avatar 1112 is visually representative of user 703, avatar 1114 is visually representative of user 1103). Displaying an avatar that is representative of the user of the first computer system provides the user with feedback about the current state of the device (e.g., that the first computer system has identified the user of the first computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the avatar (e.g., 1110) is visually representative of a user of a second computer system different from the first computer system (1218) (e.g., the respective computer system is a second computer system different from the first computer system) (e.g., avatar 1110 is visually representative of a user of a second computer system different from electronic device 700). Displaying an avatar that is representative of the user of the second computer system provides the user with feedback about the current state of the device (e.g., that the second computer system has identified the user of the second computer system). Providing improved feedback to the user enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, the avatar is displayed at (e.g., is displayed to users of) one or more computer systems of one or more users that are interacting with the user of the respective computer system (1220) (e.g., one or more users in a co-presence communication session with the user of the respective computer system and/or one or more users that are virtually in the same virtual environment as the user of the respective computer system) (e.g., at a remote computer system being used by a remote user that is represented by avatar 1110). Displaying the avatar at one or more computer systems of one or more users that are interacting with the user of the respective computer system provides those users with feedback about the current state of the device (e.g., that the respective computer system has identified the user of the respective computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at least a portion of the avatar (e.g., 1110, 1112, 1114) (e.g., hands, head, and/or body of the avatar) is displayed via a display generation component that is in communication with the respective computer system (1222). In some embodiments, the respective computer system is the first computer system (e.g., device 700), and the display generation component in communication with the respective computer system is the display generation component in communication with the first computer system (e.g., display 702). In some embodiments, the respective computer system is a second computer system different from the first computer system and the display generation component in communication with the respective computer system is a second display generation component different from the display generation component in communication with the first computer system. In some embodiments, the avatar represents a user of the first computer system (e.g., user 703, user 1103) and the first computer system displays, via a display generation component, at least a portion of the avatar (e.g., hands and/or body of the avatar are displayed for the user of the first computer system to view) (e.g., avatar 1112, avatar 1114). Displaying an avatar that is representative of the user of the first computer system provides the user with feedback about the current state of the device (e.g., that the first computer system has identified the user of the first computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the registered user is a first registered user, and the appearance is a first appearance. In accordance with a determination that the user of the respective computer system is a second registered user (e.g., user 1103) of the respective computer system different from the first registered user (e.g., user 703) (e.g., based on an option selected by the user and/or one or more user inputs indicating that the user is the second registered user, and/or based on automatic biometric identification of the user as the second registered user), displaying the avatar (e.g., avatar 1114) with a second appearance different from the first appearance (e.g., avatar 1112), wherein the second appearance was selected by the second registered user (e.g., based on information provided by the second registered user during an enrollment process such as a biometric scan or avatar creation process). In some embodiments, the avatar is displayed within an XR environment (e.g., virtual reality (VR), augmented reality (AR), and/or mixed reality (MR)). In some embodiments, the avatar moves based on movement of the user detected by one or more sensors of the respective computer system. In some embodiments, facial features of the avatar move based on movement of the user's face detected by one or more sensors of the respective computer system. Displaying an avatar with a second appearance that was selected by the second registered user provides the user with feedback about the current state of the device (e.g., that the respective computer system has identified the user of the respective computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the determination that the user of the respective computer system is a registered user of the respective computer system is performed based on automatic biometric identification of the user as a registered user, and wherein the automatic biometric identification comprises eye-based identification (e.g., iris-based identification). In some embodiments, the respective computer system is the first computer system (e.g., device 700), and the user of the respective computer system is a user of the first computer system (e.g., users 703, 1103). In some embodiments, the determination that the user of the respective computer system is a registered user of the respective computer system is a determination that the user of the first computer system is a registered user of the first computer system. In some embodiments, the determination that the user of the respective computer system is a registered user of the respective computer system is performed at and/or by the first computer system. In some embodiments, automatic biometric identification of the user as a registered user is performed at and/or by the first computer system. In some embodiments, the method further comprises: subsequent to detecting that at least a portion of the computer system has been placed on the body of the respective user, identifying the respective user as a registered user of the respective computer system (e.g., a registered user of the first computer system) based on automatic biometric identification, wherein the automatic biometric identification comprises eye-based identification.

In some embodiments, the respective computer system is a second computer system different from the first computer system (e.g., a remote computer system in communication with device 700), and the user of the respective computer system is a user of second computer system (e.g., a remote user represented by avatar 1110). In some embodiments, the determination that the user of the respective computer system is a registered user of the respective computer system is a determination that the user of the second computer system is a registered user of the second computer system. In some embodiments, the determination that the user of the respective computer system is not a registered user of the respective computer system is a determination that the user of the second computer system is not a registered user of the second computer system. In some embodiments, the determination that the user of the respective computer system is a registered user of the respective computer system is performed at and/or by the second computer system. In some embodiments, the determination that the user of the respective computer system is not a registered user of the respective computer system is performed at and/or by the second computer system. In some embodiments, automatic biometric identification of the user as a registered user and/or an unregistered user is performed at and/or by the second computer system (e.g., without being performed by the first computer system).

In some embodiments, the respective computer system is a head-mounted system (e.g., a headset). In some embodiments, automatic biometric identification of the user is performed in response to a determination that the respective computer system has been placed on the head of a user. In some embodiments, eye-based identification is performed by one or more eye-tracking devices in communication with (e.g., incorporated in) the respective computer system. In some embodiments, iris scan information is collected by the respective computer system in response to a determination that the respective computer system has been placed on the head of a user.

Automatically identifying a user based on biometric identification provides the device with the ability to perform various actions without explicit user input (e.g., identifying a user and applying an appropriate (e.g., user-selected avatar) automatically). Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the automatic biometric identification is performed automatically in response to a determination that at least a portion of the respective computer system has been placed on the body of the user (e.g., in response to a determination that the respective computer system has been worn by the user) (e.g., in FIG. 11A, automatic biometric identification is performed automatically in response to a determination that electronic device 700 has been placed on the body of user 703; in FIG. 11D, automatic biometric identification is performed automatically in response to a determination that electronic device 700 has been placed on the body of user 1103).

In some embodiments, the respective computer system is a head-mounted system (e.g., a headset). In some embodiments, automatic biometric identification of the user is performed automatically in response to a determination that the respective computer system has been placed on the head of a user. In some embodiments, biometric information (e.g., iris scan information, facial scan information) is automatically collected by the respective computer system in response to a determination that the respective computer system has been placed on the head of a user.

In some embodiments, the respective computer system is the first computer system (e.g., device 700), and the user of the respective computer system is a user of the first computer system (e.g., users 703, 1103). In some embodiments, the determination that the user of the respective computer system is a registered user of the respective computer system is a determination that the user of the first computer system is a registered user of the first computer system. In some embodiments, the determination that the user of the respective computer system is a registered user of the respective computer system is performed at and/or by the first computer system. In some embodiments, automatic biometric identification of the user as a registered user is performed at and/or by the first computer system. In some embodiments, the method further comprises: in response to detecting that at least a portion of the computer system has been placed on the body of the respective user, identifying the respective user as a registered user of the respective computer system (e.g., a registered user of the first computer system) based on automatic biometric identification, wherein the automatic biometric identification comprises eye-based identification.

In some embodiments, the respective computer system is a second computer system different from the first computer system (e.g., a remote computer system in communication with device 700), and the user of the respective computer system is a user of second computer system (e.g., a remote user represented by avatar 1110). In some embodiments, the determination that the user of the respective computer system is a registered user of the respective computer system is a determination that the user of the second computer system is a registered user of the second computer system. In some embodiments, the determination that the user of the respective computer system is not a registered user of the respective computer system is a determination that the user of the second computer system is not a registered user of the second computer system. In some embodiments, the determination that the user of the respective computer system is a registered user of the respective computer system is performed at and/or by the second computer system. In some embodiments, the determination that the user of the respective computer system is not a registered user of the respective computer system is performed at and/or by the second computer system. In some embodiments, automatic biometric identification of the user as a registered user and/or an unregistered user is performed at and/or by the second computer system (e.g., without being performed by the first computer system).

Automatically identifying a user based on biometric identification when the computer system has been placed on the body of the user provides the device with the ability to perform various actions without explicit user input (e.g., identifying a user and applying an appropriate (e.g., user-selected avatar) automatically). Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the registered user is a first user, and the appearance is a first appearance that was selected by the first user. The computer system detects, via the one or more input devices, that the computer system has been removed from the body of the first user (e.g., the user has stopped wearing the computer system) (e.g., FIG. 11C). After detecting that the computer system has been removed from the body of the first user, the computer system detects, via the one or more input devices, that the computer system has been placed on a body of a respective user (e.g., that a respective user has worn the computer system) (e.g., FIG. 11D). In response to detecting that the computer system has been placed on the body of the respective user, and in accordance with a determination that the first user is no longer the user of the respective computer system (e.g., in accordance with a determination that at least a portion of the respective computer system has been removed from the body of the first registered user (in some embodiments, in accordance with a determination that the respective computer system is no longer being worn by the first registered user)), the computer system ceases display of the avatar with the first appearance that was selected by the first user (e.g., FIG. 11E, avatar 1112 is no longer displayed). In response to detecting that the computer system has been placed on the body of the respective user, and in accordance with a determination that the user of the respective computer system is a second user of the respective computer system (e.g., user 1103) different from the first user (e.g., user 703) (e.g., in accordance with a determination that at least a portion of the respective computer system has been placed on a body of the second registered user (in some embodiments, in accordance with a determination that the second registered user has worn the computer system)), the computer system displays the avatar (e.g., avatar 1114) with a second appearance (e.g., that was selected by the second registered user and is different from the first appearance). In some embodiments, the avatar is displayed within an XR environment (e.g., virtual reality (VR), augmented reality (AR), and/or mixed reality (MR). In some embodiments, the avatar moves based on movement of the user detected by one or more sensors of the respective computer system. In some embodiments, facial features of the avatar move based on movement of the user's face detected by one or more sensors of the respective computer system. In some embodiments, displaying the avatar with the second appearance includes replacing display of the avatar with the first appearance with display of the avatar with the second appearance. In some embodiments, the method further comprises: in response to detecting that the computer system has been placed on the body of the respective user, receiving, via the one or more input devices, biometric information (e.g., corresponding to the respective user). Techniques for handing the device between users (and/or removing/replacing the device among users/the same user) are further described with respect to FIGS. 13A-13K and the corresponding description. The techniques described with respect to FIGS. 13A-13K can be implemented with respect to the technique described in FIGS. 11A-11F.

Displaying an avatar with a second appearance based on a determination that the user of the respective computer system is the second user provides the user with feedback about the current state of the device (e.g., that the respective computer system has identified the user of the respective computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the placeholder appearance is an abstract representation (e.g., avatar 1116) (e.g., geometric shape, point cloud, blurred figure, non-humanoid shape). In some embodiments, one or more visual characteristics of the avatar move based on movement of the user's face detected by one or more sensors of the respective computer system. Displaying an avatar with a placeholder appearance that is an abstract representation based on a determination that the user of the respective computer system is not a registered user of the respective computer system provides the user with feedback about the current state of the device (e.g., that the user of the respective computer system is not a registered user). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1200 (e.g., FIGS. 12A-12B) are also applicable in an analogous manner to the methods described elsewhere herein. For example, methods 800, 1000, and/or 1400 optionally include one or more of the characteristics of the various methods described above with reference to method 1200. For example, an avatar that is specific to a user can be automatically applied as part of the one or more settings associated with a user recited in method 800, and/or a user-specific avatar can be automatically applied along with a set of device calibration settings that are specific to a user, as recited in method 1000. In another example, user-specific avatars can be applied and/or unapplied based on automatic user identification when a device is handed off between users, as recited in method 1400. For brevity, these details are not repeated below.

FIGS. 13A-13K illustrate exemplary user interfaces for displaying content based on handover criteria, in accordance with some embodiments. The user interfaces in these figures are used to illustrate the processes described below, including the processes in FIGS. 14A-14B.

Figure 13A:
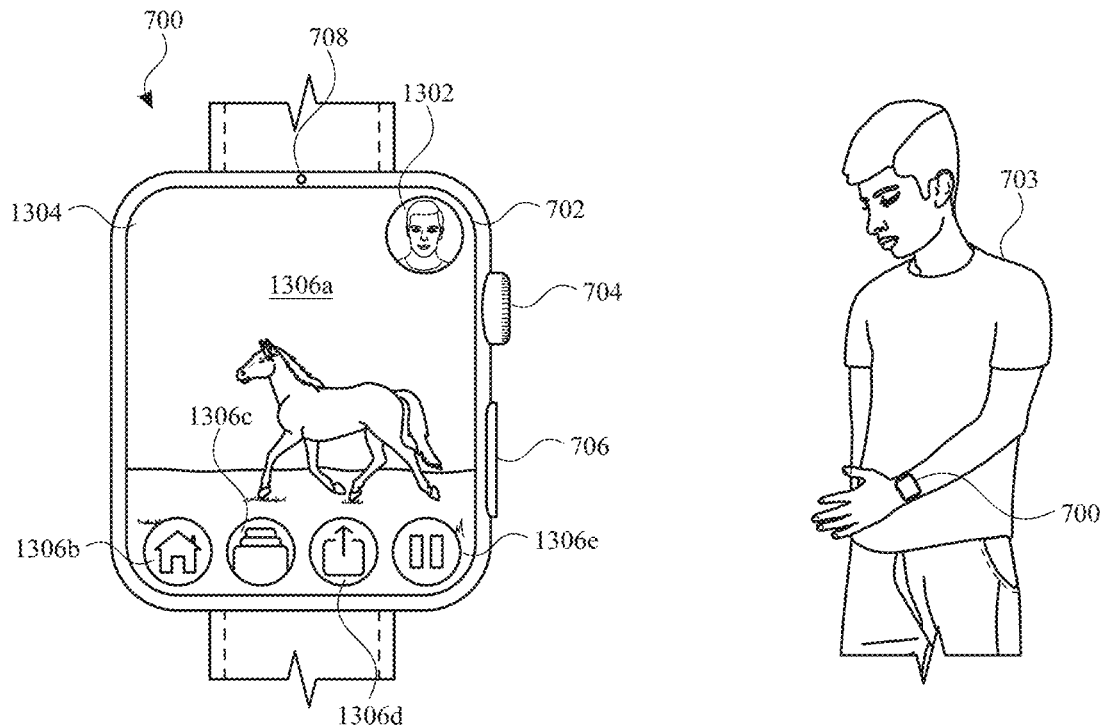
FIGS. 13A-13K illustrate exemplary user interfaces for displaying content based on handover criteria, in accordance with some embodiments.

FIG. 13A depicts an electronic device 700, which is a smartwatch that includes a touch-sensitive display 702, a rotatable and depressible input mechanism 704 (e.g., rotatable and depressible in relation to a housing or frame of the device), a button 706, and a camera 708. In some embodiments described below, electronic device 700 is a wearable smartwatch device. In some embodiments, electronic device 700 is a smart phone, a tablet, a head-mounted system (e.g., a headset), or other computer system that includes and/or is in communication with a display device (e.g., display screen, projection device, and the like). Electronic device 700 is a computer system (e.g., computer system 101 in FIG. 1).

At FIG. 13A, user 703 is wearing electronic device 700. Electronic device 700 has identified user 703 as a first registered user (e.g., via login credentials and/or passcode entry, and/or via automated biometric identification, as discussed above). Electronic device 700 displays user avatar 1302 to indicate that electronic device 700 is being used by the first registered user. Electronic device 700 also displays a video player user interface 1304, which includes video content 1306a, home affordance 1306b, multi-tasking affordance 1306c, share affordance 1306d, and play/pause affordance 1306e. Home affordance 1306b is selectable by a user to navigate to a home user interface (e.g., replace display of video player user interface 1304 with a home user interface). Multi-tasking affordance 1306c is selectable by a user to navigate to a multi-tasking user interface (e.g., replace display of video player user interface 1304 with a multi-tasking user interface). Share affordance 1306d is selectable by a user to share content (e.g., to share video content 1306a) (e.g., to display a content sharing user interface). Play/pause affordance 1306e is selectable by a user to pause and/or play video content 1306a.

Figure 13B:
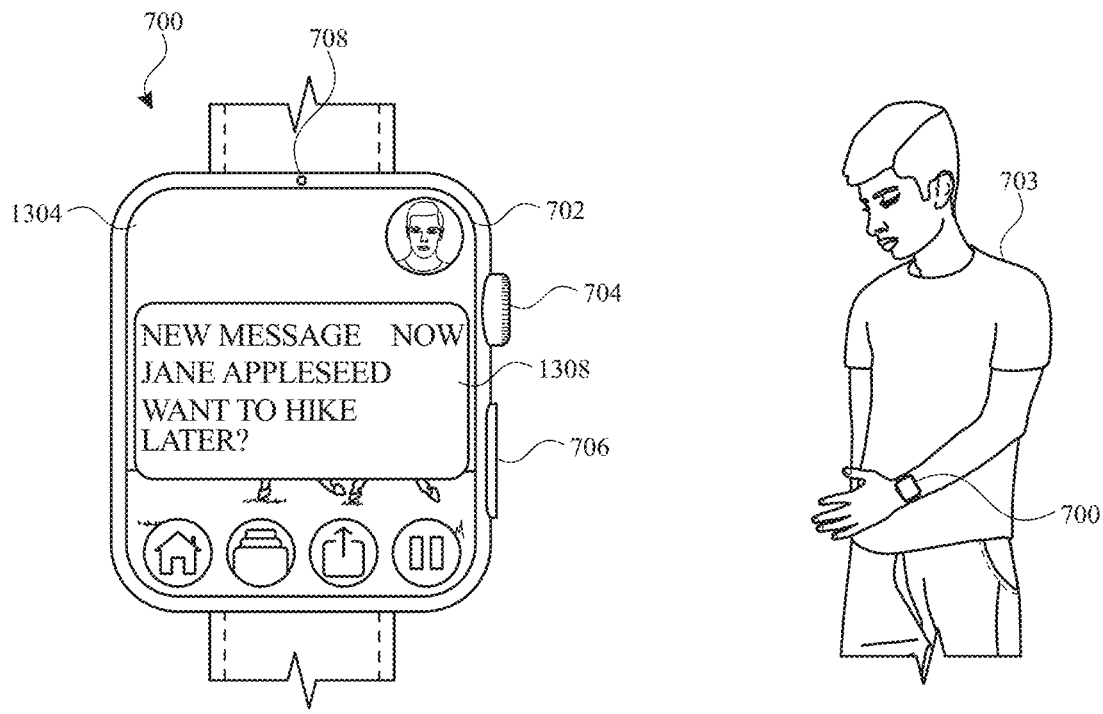

At FIG. 13B, while user 703 is still wearing electronic device 700, electronic device 700 receives an indication of a new message for the first registered user. Electronic device 700 displays notification 1308 corresponding to the new message overlaid on video player user interface 1304.

Figure 13C:
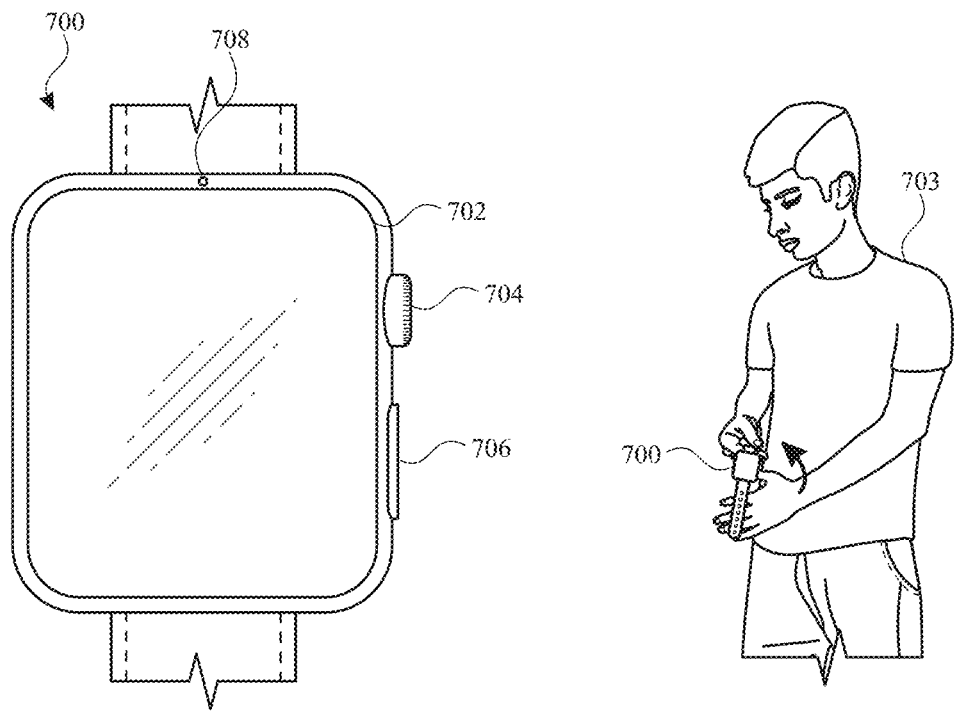

FIG. 13C depicts user 703 removing electronic device 700 from his body. Electronic device 700 detects that electronic device 700 is no longer positioned on the body of a user. In response to detecting that electronic device 700 is no longer positioned on the body of a user, electronic device 700 optionally ceases to display video player user interface 1304.

In the depicted embodiment, electronic device 700 is a smartwatch, and FIG. 13C depicts user 703 removing the smartwatch from his wrist. However, as discussed above, in some embodiments, electronic device 700 is a different device, such as a head-mounted system (e.g., a headset) that is designed to be worn on the user's head. In some such embodiments, the head-mounted system detects that it has been removed from a user's head.

FIGS. 13D-13K depict various example scenarios that optionally take place after electronic device 700 is removed from the body of user 703.

Figure 13D:
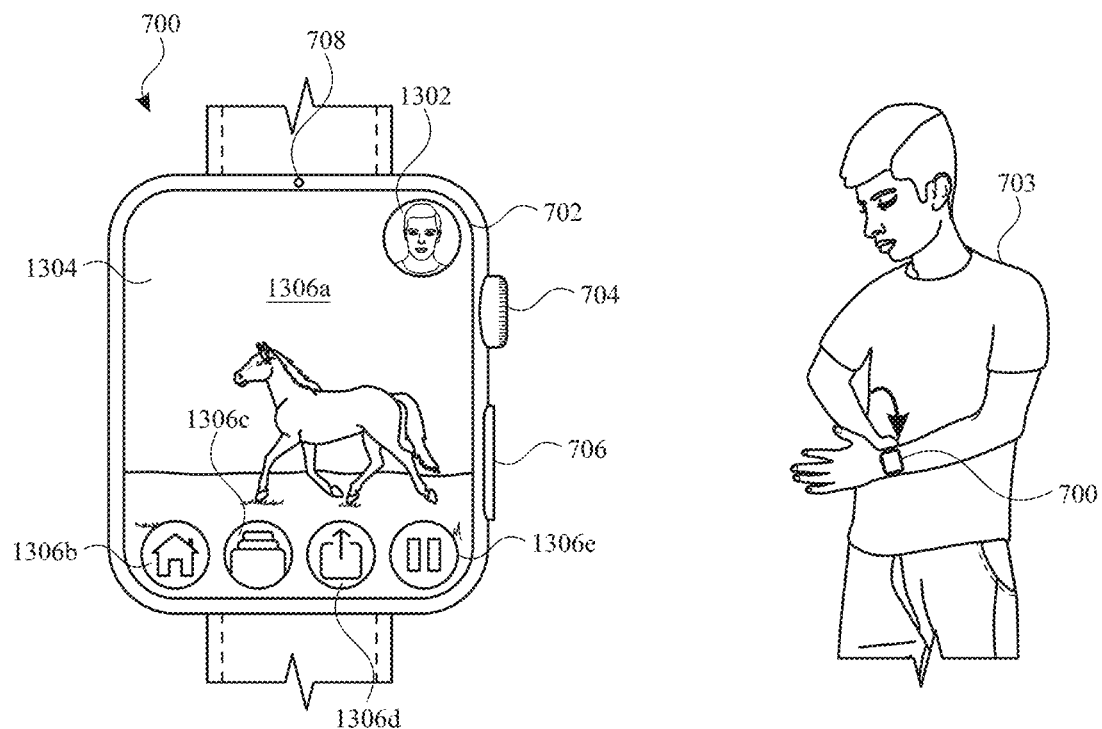

FIG. 13D depicts a first example scenario in which, after electronic device 700 is removed from the body of user 703 (and without any intervening users), the same user 703 puts electronic device 700 back on his body. Electronic device 700 detects and/or determines that electronic device 700 has been placed on the body of a user, and identifies the user as the first registered user 703 (e.g., via automatic biometric identification and/or login credentials).

In FIG. 13D, in response to determining that electronic device 700 has been placed on the body of the first registered user 703 (e.g., in response to determining that electronic device 700 has been placed on the body of the first registered user 703, who was also the last previous user of electronic device 700), electronic device 700 re-displays the same user interface and/or content that was displayed immediately prior to electronic device 700 being removed from the user's body (e.g., video player user interface 1304).

In the depicted embodiment, electronic device 700 is a smartwatch, and FIG. 13D depicts user 703 placing the smartwatch on his wrist. However, as discussed above, in some embodiments, electronic device 700 is a different device, such as a head-mounted system (e.g., a headset) that is designed to be worn on the user's head. In some such embodiments, user 703 places the head-mounted system on his head, and the head-mounted system detects that the head-mounted system has been placed on a user's head. In some embodiments, in response to determining that the head-mounted system has been placed on a user's head, the head-mounted system automatically identifies the user (e.g., based on automated biometric identification). In the scenario depicted in FIG. 13D, the head-mounted system determines that the user is the first registered user 703, and re-displays the same user interface and/or content that was displayed immediately prior to the head-mounted system being removed from user 703's body. In this way, when a user removes the head-mounted system, and then re-wears the head-mounted system (e.g., without any intervening users), the user can return to his or her previous viewing experience.

Figure 13E:
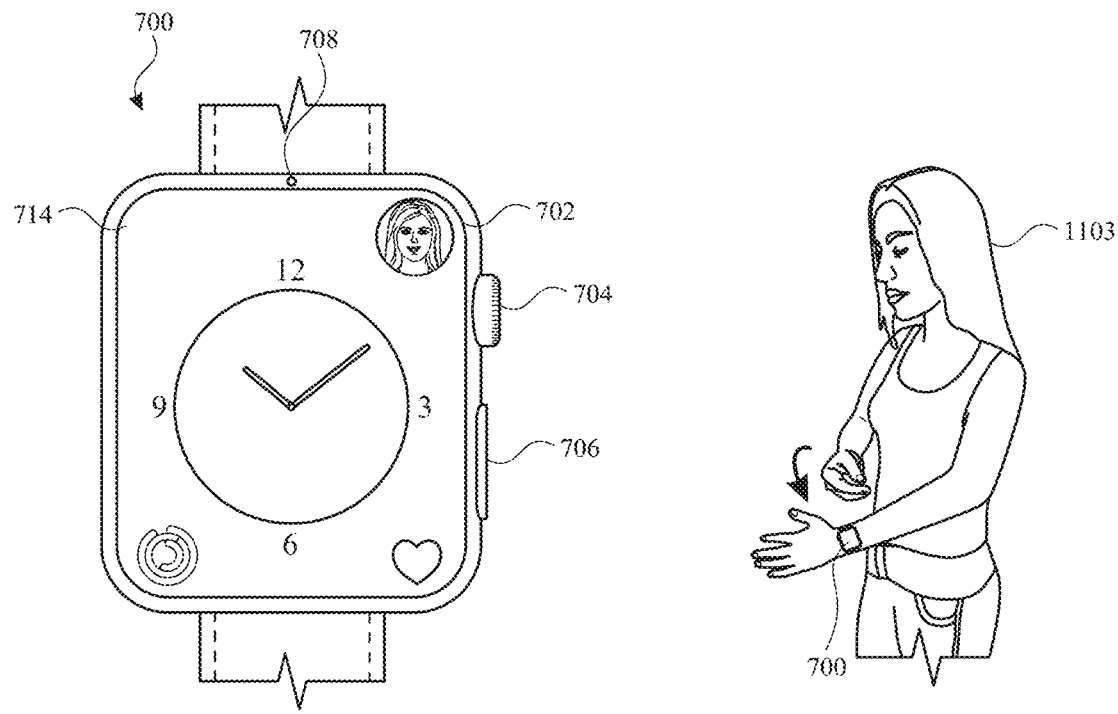

FIG. 13E depicts a second example scenario in which, after electronic device 700 is removed from the body of user 703 (e.g., without any intervening users wearing electronic device 700), a different user 1103 puts electronic device 700 on her body. Electronic device 700 detects and/or determines that electronic device 700 has been placed on the body of a user, and determines that the user (e.g., user 1103) is a different user from the last previous user (e.g., user 703). Additionally, in the scenario of FIG. 13E, electronic device 700 detects and/or determines that handover criteria have not been satisfied.

In some embodiments, handover criteria optionally includes, for example, a criterion that is satisfied when electronic device 700 does not receive: a user input corresponding to a request to lock electronic device 700, a user input corresponding to a request to turn off electronic device 700, and/or a user input corresponding to a request to put electronic device 700 to sleep (e.g., when electronic device 700 does not receive such user input during a predefined period of time, such as in the period of time between user 703 removing electronic device 700 and user 1103 wearing electronic device 700). For example, if user 703 provides a user input corresponding to a request to lock electronic device 700 prior to user 1103 putting on the electronic device 700, handover criteria would not be satisfied. Such user inputs are optionally provided, for example, within a digital user interface, and/or via a physical button (e.g., button 706, depressible and rotatable input mechanism 704, etc.). In some embodiments, the handover criteria is satisfied when all criterions of the handover criteria are satisfied. In embodiments in which electronic device 700 is a different device, such as a head-mounted system, similar handover criteria can be applied. For example, in some embodiments, handover criteria can include a criterion that is satisfied when electronic device 700 does not receive: a user input corresponding to a request to lock the head-mounted system, a user input corresponding to a request to turn off the head-mounted system, and/or a user input corresponding to a request to put the head-mounted system to sleep (e.g., when the head-mounted system does not receive such user input during a predefined period of time, such as in the period of time between user 703 removing the head-mounted system and user 1103 wearing the head-mounted system). Such user inputs are optionally provided, for example, within a digital user interface (e.g., a virtual environment displayed by the head-mounted system), and/or via a physical button (e.g., a physical button on the head-mounted system).

In some embodiments, handover criteria optionally includes a criterion that is satisfied when less than a threshold period of time has elapsed between detecting that electronic device 700 has been removed from a first user's body (e.g., user 703) and detecting that electronic device 700 has been placed on a subsequent user's body (e.g., user 1103). For example, if greater than a threshold period of time has elapsed between user 703 removing electronic device 700 and user 1103 putting on electronic device 700, handover criteria would not be satisfied. In embodiments in which electronic device 700 is a different device, such as a head-mounted system, similar handover criteria can be applied. For example, in some embodiments, handover criteria can include a criterion that is satisfied when less than a threshold period of time has elapsed between detecting that the head-mounted system has been removed from a first user's body (e.g., user 703) (e.g., removed from the first user's head) and detecting that the head-mounted system has been placed on a subsequent user's body (e.g., user 1103) (e.g., placed on the subsequent user's head).

In some embodiments, handover criteria optionally includes a criterion that is satisfied when the previous user (e.g., first registered user 703) is a registered user. For example, if the previous user (e.g., user 703) had been an unregistered user using electronic device 700 in a guest mode, then handover criteria would not be satisfied, and subsequent user 1103 would not be able to view user interface 1304, even in a restricted capacity. In embodiments in which electronic device 700 is a different device, such as a head-mounted system, similar handover criteria can be applied.

In FIG. 13E, in response to determining that electronic device 700 has been placed on the body of a user that is different from the first registered user 703, and in response to determining that handover criteria have not been satisfied, electronic device 700 forgoes displaying video player user interface 1304, and displays different content (e.g., a different user interface). In the depicted example, electronic device 700 has identified user 1103 as a second registered user, Sarah. In response to this determination, electronic device 700 displays a personalized user interface 714 that corresponds to the second registered user (personalized user interface 714 was discussed in greater detail above with reference to FIG. 7C). In an alternative scenario, in which electronic device 700 identifies user 1103 as an unregistered user, electronic device 700 displays, for example, a guest user interface (e.g., guest user interface 718 of FIG. 7D) and/or a user picker user interface (e.g., user picker user interface 722 of FIG. 7E).

In the depicted embodiment, electronic device 700 is a smartwatch, and FIG. 13E depicts user 1103 placing the smartwatch on her wrist. However, as discussed above, in some embodiments, electronic device 700 is a different device, such as a head-mounted system (e.g., a headset) that is designed to be worn on the user's head. In some such embodiments, user 1103 places the head-mounted system on her head, and the head-mounted system detects that the head-mounted system has been placed on a user's head. In some embodiments, in response to determining that the head-mounted system has been placed on a user's head, the head-mounted system automatically identifies the user (e.g., based on automated biometric identification). In the scenario depicted in FIG. 13E, the head-mounted system determines that the user is a second registered user 1103. The head-mounted system further determines that handover criteria have not been satisfied. In some embodiments, in accordance with the determination that the user is a second registered user 1103 different from the previous user (user 703), and that handover criteria have not been satisfied, the head-mounted system displays content (e.g., a personalized user interface) that corresponds to the second registered user 1103. In some embodiments, the content that corresponds to the second registered user 1103 is presented by the head-mounted system within a three-dimensional virtual environment.

Figure 13F:
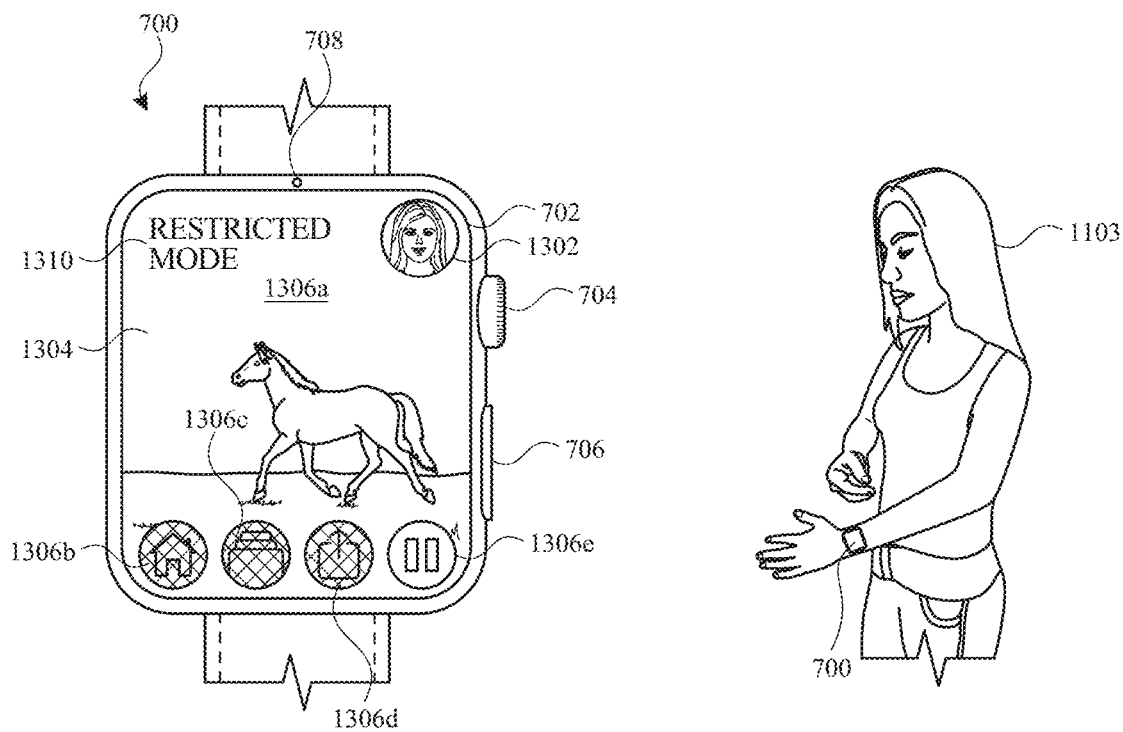

FIG. 13F depicts a third example scenario in which, after electronic device 700 is removed from the body of user 703 (e.g., without any intervening users), second user 1103 puts electronic device 700 on her body, and handover criteria have been satisfied. Electronic device 700 detects that a user different from the first registered user (user 703) has put on the electronic device 700, and that handover criteria are satisfied.

In FIG. 13F, in response to determining that a user different from the first registered user 703 has put on the electronic device 700 and that handover criteria have been satisfied, electronic device 700 displays user interface 1304 in a restricted mode. In some embodiments, electronic device 700 remains logged into a user account corresponding to previous user/first registered user 703 while displaying user interface 1304 in the restricted mode.

In the restricted mode, subsequent user 1103 is able to view content that was being viewed by previous user 703 (e.g., video player user interface 1304 and video content 1306a). However, this content is presented with some restrictions. For example, in FIG. 13F, user 1103 is able to view user interface 1304 and video content 1306a, but user 1103 is not permitted to navigate away from this content. This is optionally done, for example, to prevent user 1103 from accessing secure content or other private information belonging to user 703. Accordingly, home affordance 1306b, multi-tasking affordance 1306c, and share affordance 1306d are disabled, and user 1103 is not able to access and/or select these affordances.

In FIG. 13F, electronic device 700 has identified the subsequent user 1103 as a second registered user, Sarah. Despite electronic device 700 remaining logged into a user account associated with the previous user/first registered user, electronic device 700 displays an avatar 1302 corresponding to the second registered user to indicate that the electronic device 700 is being operated by the second registered user. Electronic device 700 also displays an indicator 1310 to indicate that electronic device 700 is being operated in the restricted mode (e.g., that video player user interface 1304 is displayed in the restricted mode).

In some embodiments, when electronic device 700 is being operated in the restricted mode, electronic device 700 ceases to apply one or more user settings associated with the previous user (e.g., the first registered user 703). For example, when electronic device 700 is being operated in the restricted mode, electronic device 700 ceases to apply device calibration settings (e.g., eye movement calibration settings, hand movement calibration settings, head movement calibration settings) that are associated with (e.g., specific to) the first registered user. In some embodiments, electronic device 700 applies a generic (e.g., default) set of device calibration settings while electronic device 700 is operated in the restricted mode. In some embodiments, rather than (or in addition to) applying generic settings, electronic device 700 ceases applying user-specific settings for the previous user, and can enable and/or begin applying user-specific settings for the subsequent user (e.g., user 1103). For example, in FIG. 13F, electronic device 700 optionally ceases to apply device calibration settings associated with the first registered user 703, and electronic device 700 applies device calibration settings associated and/or specific to the second registered user 1103.

In some embodiments, when electronic device 700 is being operated in the restricted mode, electronic device 700 optionally maintains one or more user settings that are associated with and/or were applied by the previous user (e.g., the first registered user 703). For example, one or more accessibility settings (e.g., font size settings, display size settings, accessibility zoom settings, accessibility gestures settings, and/or audio accessibility settings) that were applied by the first registered user 703 prior to handing off electronic device 700 to second user 1103 are maintained while the second user 1103 operates electronic device 700 in the restricted mode. This, for example, allows the previous user (e.g., user 703) to apply one or more accessibility settings that are suitable for the intended subsequent user (e.g., user 1103) to make the subsequent user's viewing experience more enjoyable. In some embodiments, the previous user (e.g., user 703) is provided with the option of whether or not to maintain applied accessibility settings when electronic device 700 is operated in the restricted mode. In some embodiments, accessibility settings remain available and/or accessible to the subsequent user 1103 when electronic device 700 is being operated in the restricted mode.

Figure 13G:
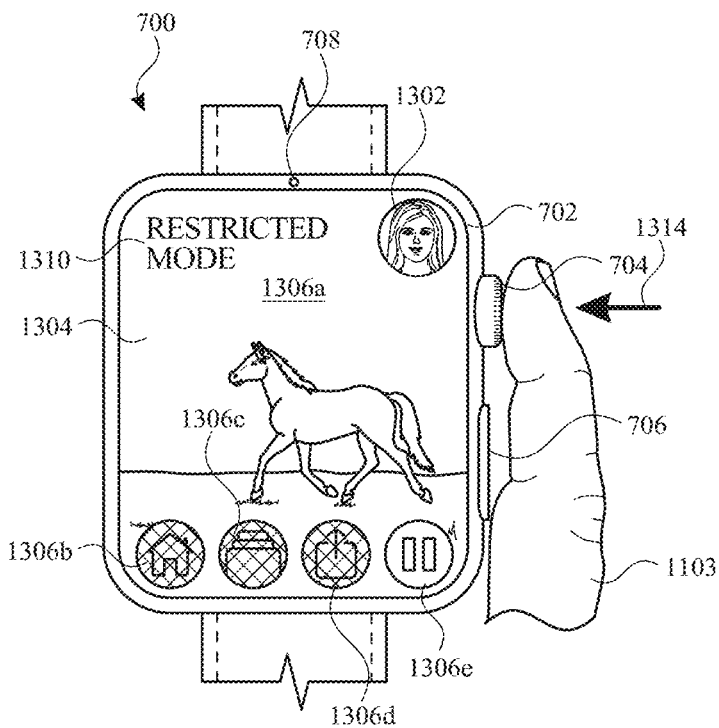

In FIG. 13G, user 1103 depresses rotatable and depressible input mechanism 704 (user input 1314), and electronic device 700 detects user input 1314 corresponding to depression and/or activation of the rotatable and depressible input mechanism 704. In an unrestricted experience, as was presented in FIGS. 13A, 13B, and 13D, user input 1314 would normally cause electronic device 700 to navigate away from the video player user interface 1304 to a home user interface. However, because electronic device 700 is operating in the restricted mode, user 1103 is prohibited from navigating away from user interface 1304. Accordingly, despite detecting user input 1314, electronic device 700 forgoes navigating away from video player user interface 1304.

Figure 13H:
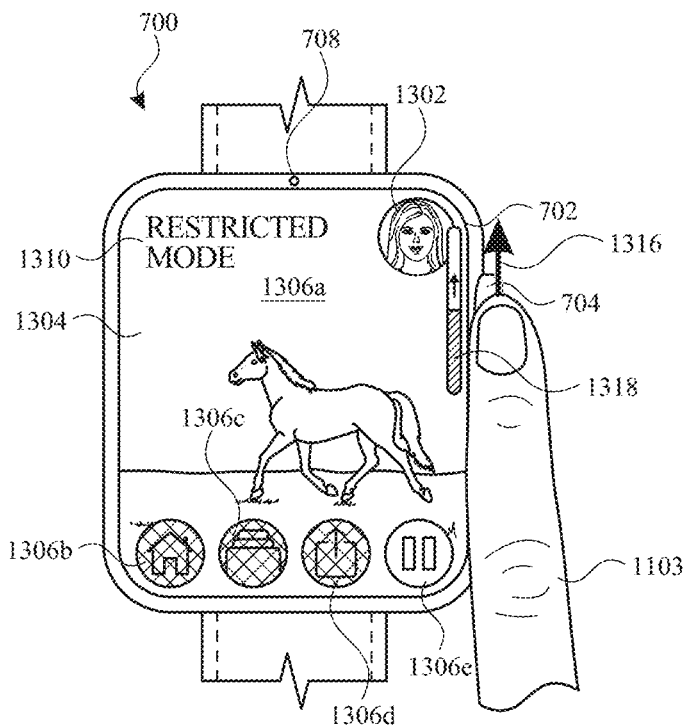

In FIG. 13H, user 1103 rotates input mechanism 704 (user input 1316), and electronic device 700 detects user input 1316 corresponding to rotation of input mechanism 704. Although certain functions are restricted while electronic device 700 is operated in the restricted mode, other operations are optionally not restricted. For example, certain system controls, such as volume control and/or display brightness control, remain accessible to the user 1103, as these controls do not provide access to sensitive or private information. Accordingly, in FIG. 13H, in response to detecting user input 1316, electronic device 700 increases a volume setting, and displays a volume slider 1318. In some embodiments, one or more accessibility settings are also accessible to user 1103 while electronic device 700 is operated in the restricted mode.

FIGS. 13F-13G depict an example embodiment in which electronic device 700 is a smartwatch, and handover criteria are satisfied for a subsequent user (e.g., user 1103), and electronic device 700 is accordingly operated in a restricted mode. As discussed above, in some embodiments, electronic device 700 is a different device, such as a head-mounted system (e.g., a headset) that is designed to be worn on the user's head. In some such embodiments, user 1103 places the head-mounted system on her head, and the head-mounted system detects that the head-mounted system has been placed on a user's head. In some embodiments, in response to determining that the head-mounted system has been placed on a user's head, the head-mounted system automatically identifies the user (e.g., based on automated biometric identification). In the scenario depicted in FIG. 13F, the head-mounted system determines that the user is a second registered user 1103. The head-mounted system further determines that handover criteria have been satisfied. In some embodiments, in accordance with the determination that the user is a second registered user 1103 different from the previous user (user 703), and that handover criteria have been satisfied, the head-mounted system displays content that was previously being accessed by the previous user (user 703) in a restricted mode. For example, if the previous user was viewing video content within a three-dimensional virtual environment (e.g., in an unrestricted mode with access to one or more features), the head-mounted system displays the same video content within the three-dimensional virtual environment for the subsequent user, but in a restricted mode (e.g., with restricted access to at least some of the one or more features). In some embodiments, features of the restricted mode that were described above, and additional features which are described below, with reference to electronic device 700 are also applicable to the head-mounted system. For example, in some embodiments, when the head-mounted system is operating in the restricted mode, one or more system controls and accessibility settings are accessible to the subsequent user, but certain functions, such as navigation away from the displayed application and/or user interface, are restricted. In this way, a user using a head-mounted system (e.g., user 703) can remove the head-mounted system and pass the head-mounted system to another subsequent user (e.g., user 1103) in order to share content that he or she was viewing without risk of the subsequent user accessing personal or sensitive information.

Figure 13I:
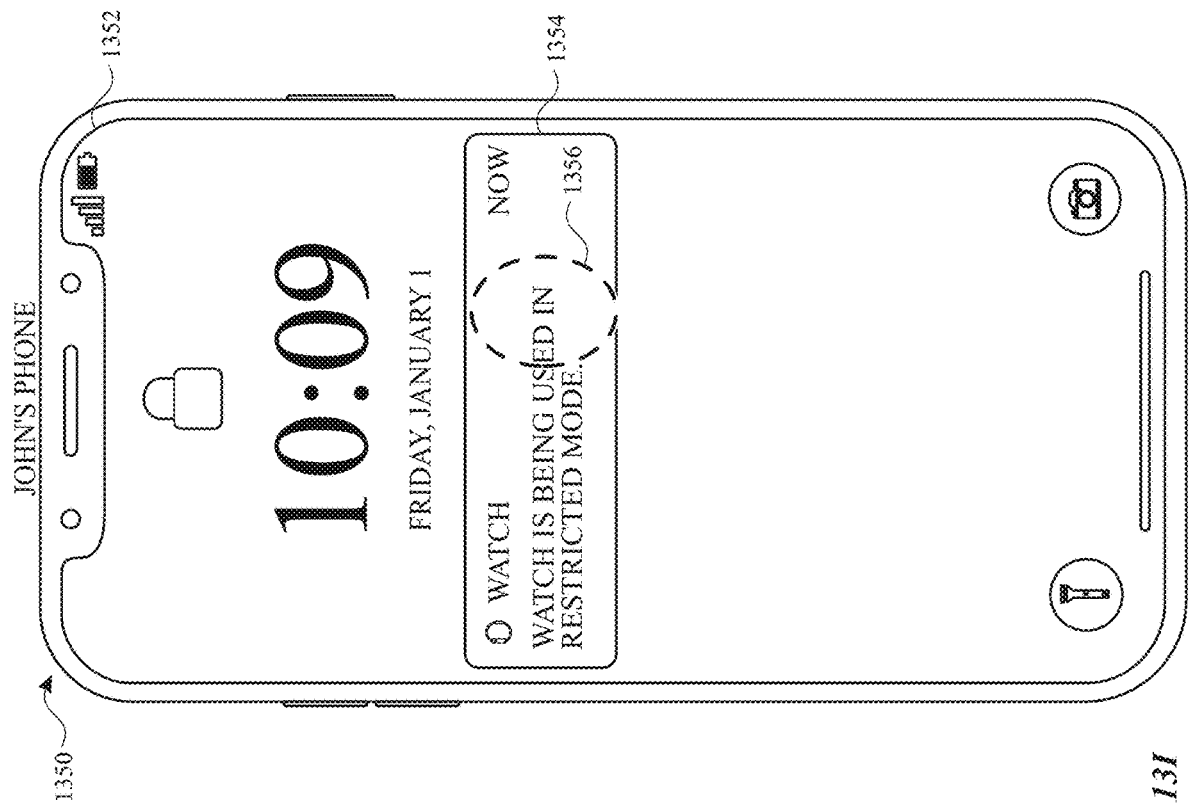
Figure 13I:
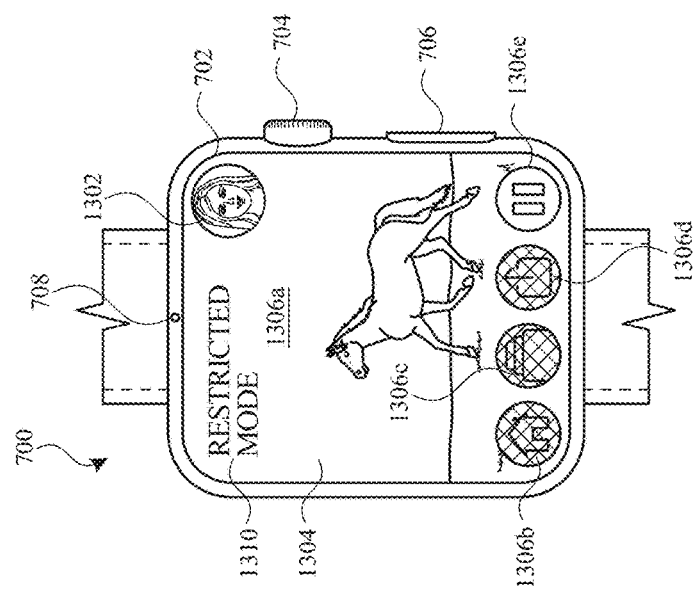

FIG. 13I depicts, in addition to electronic device 700, electronic device 1350. Electronic device 1350 is a smart phone with a touch-screen display 1352. In the embodiments described below, electronic device 1350 is a smart phone. In some embodiments, electronic device 1350 is a tablet, a smartwatch, a laptop computer, or other computer system that includes and/or is in communication with a display device (e.g., display screen, projection device, and the like).

In FIG. 13I, electronic device 1350 is associated with the first registered user 703. For example, electronic device 1350 is logged into a user account associated with the first registered user 703. As discussed above, electronic device 700 is also logged into a user account (e.g., the same user account logged into electronic device 1350) associated with the first registered user 703 while the second registered user 1103 operates electronic device 700 in the restricted mode. In FIG. 13I, in response to determining that electronic device 700 is being operated in the restricted mode, electronic device 700 transmits to electronic device 1350 (e.g., via direct connection and/or via a network) a notification that electronic device 700 is being operated in the restricted mode. Electronic device 1350 displays a notification 1354 that electronic device 700 is being operated in the restricted mode. Electronic device 1350 detects a user input 1356 corresponding to selection of the notification 1354. As discussed above, in some embodiments, electronic device 700 is a different device, such as a head-mounted system. In some embodiments, the head-mounted system is associated with (e.g., logged into a user account associated with) the first registered user 703 while the head-mounted system is operated in the restricted mode. In some embodiments, in response to determining that the head-mounted system is being operated in the restricted mode, the head-mounted system transmits to another computer system associated with the first registered user 703 (e.g., device 1350) a notification that the head-mounted system is being operated in the restricted mode.

Figure 13J:
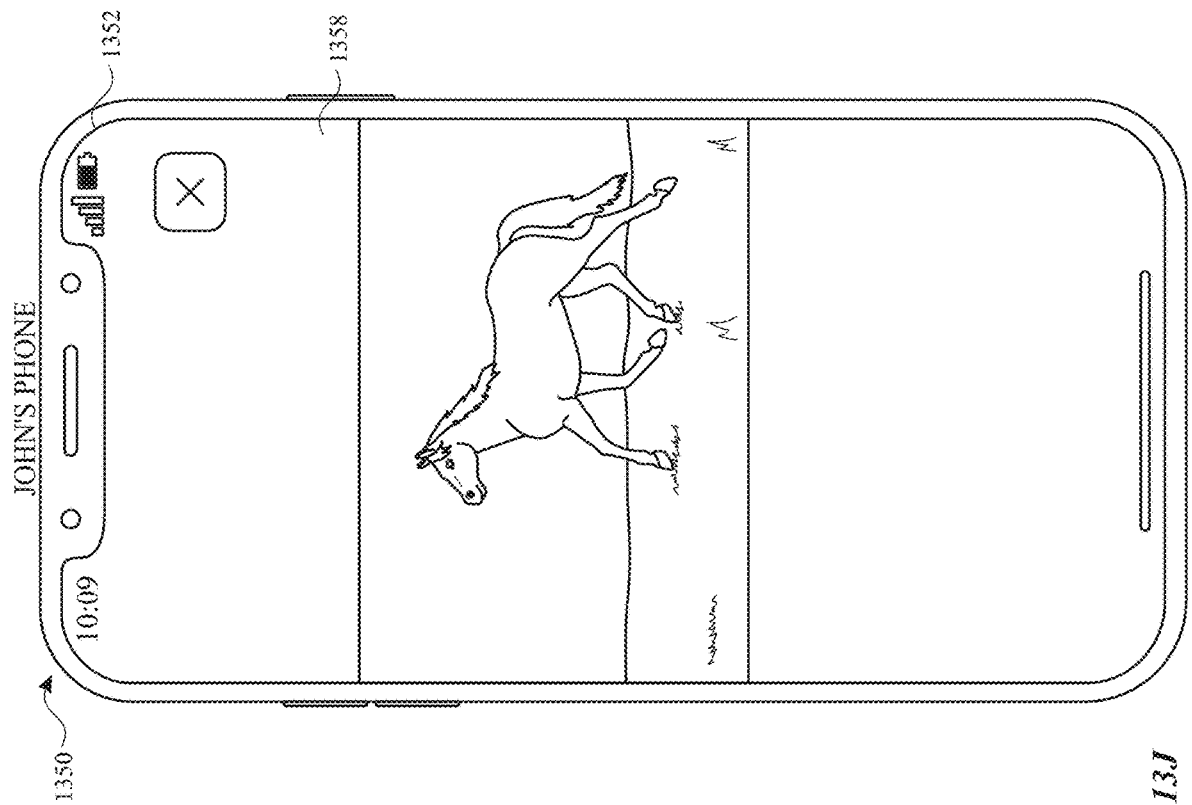
Figure 13J:
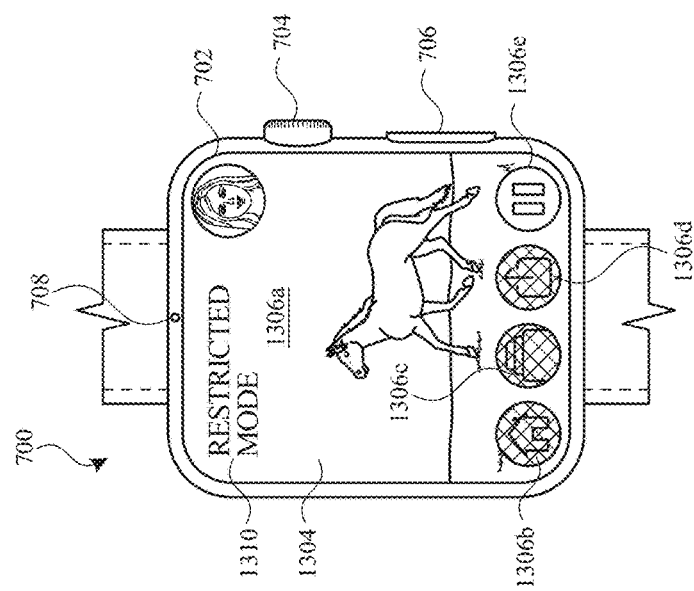

In FIG. 13J, in response to user input 1356, electronic device 1350 displays device mirroring user interface 1358. Device mirroring user interface 1358 displays content that is being displayed on electronic device 700 while electronic device 700 is being operated in the restricted mode. Electronic device 700 transmits content information to electronic device 1350 (e.g., via direct connection and/or via a network) so that electronic device 1350 can display content in device mirroring user interface 1358. In this way, first registered user 703 can monitor (on electronic device 1350) what second user 1103 is viewing on electronic device 700 while electronic device 700 is logged into the first registered user's user account and is operating in the restricted mode.

As discussed above, in some embodiments, electronic device 700 is a different device, such as a head-mounted system. In some embodiments, the head-mounted system transmits content information to a second device associated with the previous user (e.g., first registered user 703) so that the second device (e.g., electronic device 1350) can display content in a device mirroring user interface. In this way, the previous user (e.g., first registered user 703) can monitor (e.g., on electronic device 1350) what a subsequent user (e.g., second registered user 1103) is viewing on the head-mounted system while the head-mounted system is logged into the first registered user's user account and is operating in the restricted mode.

Figure 13K:
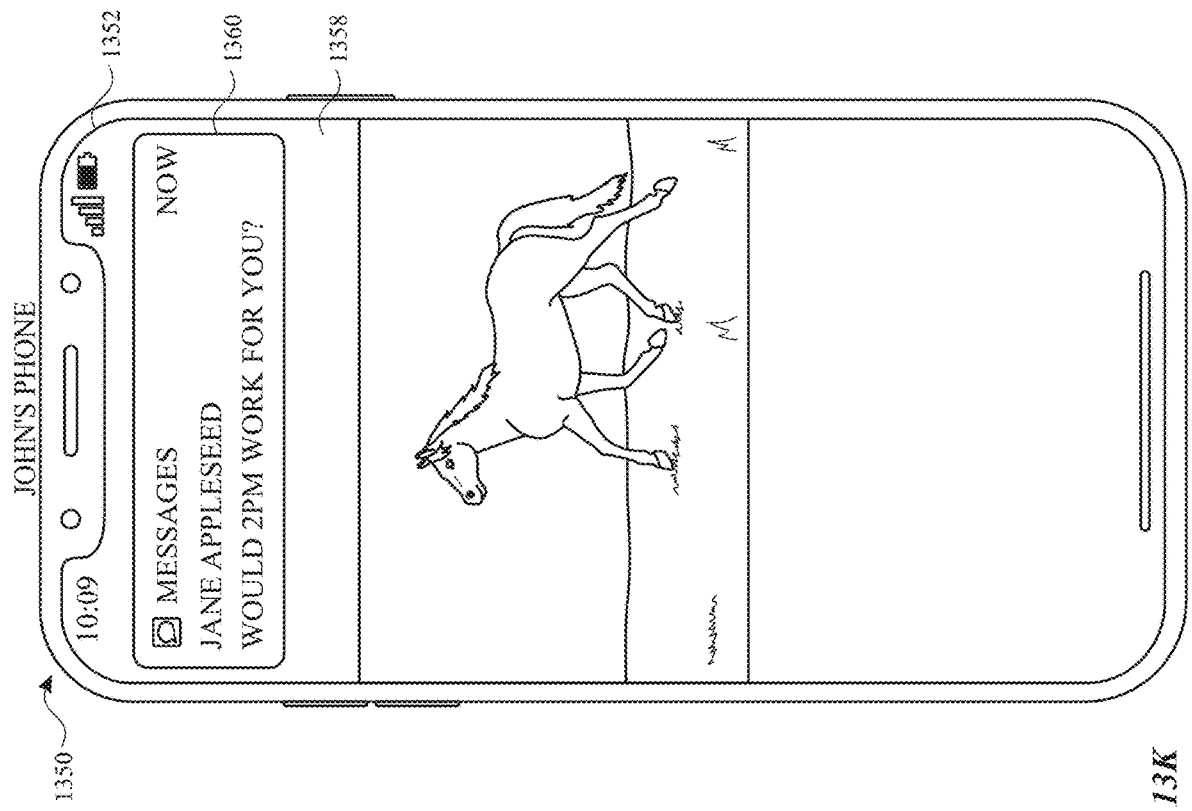
Figure 13K:
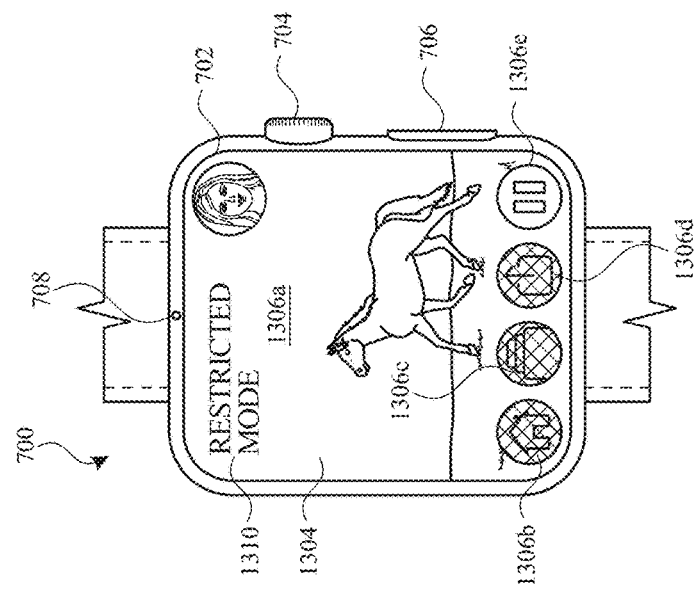

In FIG. 13K, both electronic device 700 and electronic device 1350 receive information indicative of a new message for the first registered user. Electronic device 1350 displays notification 1360 corresponding to the new message for the first registered user. However, electronic device 700 forgoes displaying a notification corresponding to the new message for the first registered user, because electronic device 700 is operating in the restricted mode. As discussed above, in some embodiments, electronic device 700 is a different device, such as a head-mounted system. In some embodiments, similar to device 700, the head-mounted system can forgo displaying notifications while the head-mounted system is operating in the restricted mode.

In the depicted embodiments, electronic device 700 is a smartwatch, and FIGS. 13A-13K depict users 7603, 1103 putting the smartwatch on their wrists, or taking the smartwatch off their wrists, and content being displayed on the smartwatch. However, as discussed above, in certain embodiments, electronic device 700 is optionally a different device, such as a head-mounted system (e.g., a headset) that is designed to be worn on the user's head. In such embodiments, electronic device 700 optionally attempts to automatically identify a user that is wearing the device when it is determined that the electronic device 700 has been placed on the user's head (e.g., based on iris recognition and/or facial recognition when the device is placed on the user's head). Additionally, in such embodiments, content, such as user interface 1304, is optionally displayed via the head-mounted system, and one or more user inputs are optionally received via one or more input devices in communication with the head-mounted system. Similarly, the head-mounted system can be operated in the regular, unrestricted mode (e.g., FIGS. 13A-13B, 13D), or operated in the restricted mode (e.g., FIGS. 13F-13K). In some embodiments, an outer portion (e.g., an outer display separate from an interior display that is visible only to the operating user) of the head-mounted system can display an indication when the head-mounted system is being operated in the restricted mode, and can also display an indication of who (e.g., user name) is operating the head-mounted system in the restricted mode and/or what content is being displayed by the head-mounted system in the restricted mode. In some embodiments, device calibration settings are applied for the head-mounted system and one or more input devices in communication with the head-mounted system. For example, device calibration settings include eye gaze calibration settings, head movement calibration settings, hand and/or arm movement calibration settings, torso calibration settings, and/or foot and/or leg calibration settings. In some embodiments, when a device is being used by a first user (e.g., user 703), electronic device 700 applies device calibration settings associated with the first user, and when electronic device is handed off from a previous user (e.g., user 703) to a subsequent user (e.g., user 1103), electronic device 700 ceases applying the device calibration settings associated with the first user. In some embodiments, device calibration settings associated with the subsequent user (e.g., user 1103) are applied while the subsequent user operates the electronic device 700 in the restricted mode. In some embodiments, generic and/or default device calibration settings are applied while electronic device 700 is operated in the restricted mode.

FIGS. 14A-14B are a flow diagram illustrating a method for displaying content based on handover criteria using an electronic device in accordance with some embodiments. Method 1400 is performed at a computer system (e.g., 700, 101) that is in communication with a display generation component and one or more input devices. Some operations in method 1400 are, optionally, combined, the orders of some operations are, optionally, changed, and some operations are, optionally, omitted.

As described below, method 1400 provides an intuitive way for displaying content based on handover criteria. The method reduces the cognitive burden on a user for retrieving and displaying content, thereby creating a more efficient human-machine interface. For battery-operated computing devices, enabling a user to retrieve and display content faster and more efficiently conserves power and increases the time between battery charges.

In some embodiments, a computer system (e.g., device 700) (e.g., a smart phone, a smart watch, a tablet, a head-mounted system, and/or a wearable device) that is in communication with a display generation component (e.g., display 702) (e.g., a display controller; a touch-sensitive display system; a display (e.g., integrated and/or connected), a 3D display, a transparent display, a projector, and/or a heads-up display) and one or more input devices (e.g., 702, 704, 706, 708) (e.g., a touch-sensitive surface (e.g., a touch-sensitive display); a mouse; a keyboard; a remote control; a visual input device (e.g., a camera); an audio input device (e.g., a microphone); and/or a biometric sensor (e.g., a fingerprint sensor, a face identification sensor, and/or an iris identification sensor)), while the computer system is placed on a body of a first user (1402) (e.g., user 703, FIG. 13A) (e.g., while the computer system is worn by the first user) (in some embodiments, and while the computer system is logged in to a first user account associated with the first user), displays (1404), via the display generation component, a first user interface (e.g., 1304) corresponding to a first application (e.g., a video player application displaying video content 1306*a* in FIG. 13A), wherein the first user interface is displayed in a first mode with permitted access to a plurality of features associated with the first user (e.g., FIGS. 13A-13B) (e.g., a plurality of features associated with a logged in user experience). While the first user interface is displayed in the first mode with permitted access to the plurality of features associated with the first user (1406), the computer system detects (1408), via the one or more input devices, that the computer system has been removed from the body of the first user (e.g., the user has stopped wearing the computer system) (e.g., FIG. 13C). After detecting that the computer system has been removed from the body of the first user (1410), the computer system detects (1412), via the one or more input devices, that the computer system has been placed on a body of a respective user (e.g., that a respective user has worn the computer system).

In response to detecting that the computer system has been placed on the body of the respective user (1414) (in some embodiments, in response to detecting that the computer system has been placed on the body of the respective user, receiving, via the one or more input devices, biometric information (e.g., corresponding to the respective user)), and in accordance with a determination that biometric information received via the one or more input devices (e.g., a fingerprint, an image (e.g., a photograph and/or a scan) representative of the face of the respective user, and/or iris identification information (e.g., iris scan information)) (in some embodiments, biometric information is received while the computer system is being worn by the respective user) corresponds to the first user (e.g., user 703) (1416) (e.g., in accordance with a determination that the respective user is the first user (e.g., regardless of whether the set of handover criteria has been satisfied)) (e.g., FIG. 13D), the computer system displays (1418), via the display generation component, the first user interface (e.g., 1304) in the first mode with permitted access to the plurality of features associated with the first user.

In response to detecting that the computer system has been placed on the body of the respective user (1414) (in some embodiments, in response to detecting that the computer system has been placed on the body of the respective user, receiving, via the one or more input devices, biometric information (e.g., corresponding to the respective user)), and in accordance with a determination that the biometric information received via the one or more input devices does not correspond to the first user (e.g., in accordance with a determination that the respective user is not the first user) (e.g., the respective user is not the first user 603), and that a set of handover criteria has been satisfied (1420), the computer system displays (1422), via the display generation component, the first user interface (e.g., user interface 1304) in a second mode (e.g., a restricted mode, a guest mode, and/or a handover mode) with restricted access to one or more of the plurality of features associated with the first user (e.g., FIGS. 13F-13K). In some embodiments, the second mode with restricted access to one or more of the plurality of features associated with the first user prohibits access to a subset of content that is accessible to the first user (e.g., that is accessible in the first mode). In some embodiments, the second mode with restricted access provides access to only the first user interface corresponding to the first application. In some embodiments, the second mode with restricted access provides access to only the first application (e.g., prohibits access to other applications).

Displaying the first user interface in a second mode with restricted access based on a determination that the biometric information received via the one or more input devices does not correspond to the first user and that the set of handover criteria has been satisfied enhances security and can prevent unauthorized users from initiating sensitive operations (e.g., by allowing the user to view the user interface only within a restricted access mode with fewer permissions). Displaying the first user interface in a second mode with restricted access based on a determination that the biometric information received via the one or more input devices does not correspond to the first user and that the set of handover criteria has been satisfied also enhances the operability of the device and makes the user-device interface more efficient (e.g., by restricting unauthorized access) which, additionally, reduces power usage and improves battery life of the device by limiting the performance of restricted operations.

Displaying the first user interface in the first mode with permitted access based on a determination that the biometric information received via the one or more input devices corresponds to the first user provides the user the ability to resume his or her viewing experience without additional user input. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of handover criteria includes a first criterion that is satisfied when the computer system does not receive user input corresponding to a request to lock the computer system prior to detecting that the computer system has been placed on the body of the respective user (e.g., electronic device 700 does not receive a user input corresponding to a request to lock the computer system in the time between user 703 removing electronic device 700 in FIG. 13C and subsequent user 1103 putting on electronic device 700 in FIG. 13E) (and, optionally, after detecting that the computer system has been removed from the body of the first user (e.g., in the time period between the computer system being removed from the body of the first user and placed on the body of the respective user)). In some embodiments, the first criterion is satisfied when a user input corresponding to a request to lock the computer system is not received in the time period between two predefined events (e.g., in the time period after the computer system is removed from the body of the first user and placed on the body of the respective user). In some embodiments, the method further comprises: in response to detecting that the computer system has been placed on the body of the respective user: in accordance with a determination that the biometric information received via the one or more input devices does not correspond to the first user and that a user input corresponding to a request to lock the computer system has been received prior to detecting that the computer system has been placed on the body of the respective user (and, optionally, after detecting that the computer system has been removed from the body of the first user (e.g., in the time period between the computer system being removed from the body of the first user and placed on the body of the respective user)), forgoing display of the first user interface (e.g., forgoing display of the first user interface in either the first mode or the second mode) (in some embodiments, displaying a logged out user interface).

A handover criterion that is satisfied when the computer system does not receive user input corresponding to a request to lock the computer system enhances security and can prevent unauthorized users from initiating sensitive operations (e.g., by preventing unauthorized access when a user does provide an input corresponding to a request to lock the computer system). A handover criterion that is satisfied when the computer system does not receive user input corresponding to a request to lock the computer system also enhances the operability of the device and makes the user-device interface more efficient (e.g., by restricting unauthorized access) which, additionally, reduces power usage and improves battery life of the device by limiting the performance of restricted operations.

In some embodiments, the set of handover criteria includes a second criterion that is satisfied when less than a threshold period of time has elapsed since detecting that the computer system has been removed from the body of the first user (e.g., less than a threshold period of time has elapsed between user 703 removing electronic device 700 in FIG. 13C and subsequent user 1103 putting on electronic device 700 in FIG. 13E) (e.g., less than x seconds have elapsed since the computer system has been removed from the body of the first user). In some embodiments, the method further comprises: in response to detecting that the computer system has been placed on the body of the respective user: in accordance with a determination that the biometric information received via the one or more input devices does not correspond to the first user and that a threshold period of time has elapsed since detecting that the computer system has been removed from the body of the first user, forgoing display of the first user interface (e.g., forgoing display of the first user interface in either the first mode or the second mode) (in some embodiments, displaying a logged out user interface). A handover criterion that is satisfied when less than a threshold period of time has elapsed since detecting that the computer system has been removed from the body of the first user enhances security and can prevent unauthorized users from initiating sensitive operations (e.g., by preventing an unauthorized user from accessing privileged information after the threshold period of time has passed since the computer system has been removed from the body of the first user). A handover criterion that is satisfied when less than a threshold period of time has elapsed since detecting that the computer system has been removed from the body of the first user also enhances the operability of the device and makes the user-device interface more efficient (e.g., by restricting unauthorized access) which, additionally, reduces power usage and improves battery life of the device by limiting the performance of restricted operations.

In some embodiments, the set of handover criteria includes a third criterion that is satisfied when the computer system is not turned off or put into a sleep mode after detecting that the computer system has been removed from the body of the first user and prior to detecting that the computer system has been placed on the body of the respective user (e.g., electronic device 700 is not turned off or put into a sleep mode in the time between user 703 removing electronic device 700 in FIG. 13C and subsequent user 1103 putting on electronic device 700 in FIG. 13E) (e.g., between the computer system being removed from the body of the first user and placed on the body of the respective user). In some embodiments, the third criterion is satisfied when, within a predefined period of time (e.g., in the time period after the computer system is removed from the body of the first user and placed on the body of the respective user), a user input corresponding to a request to put the computer system to sleep or a user input corresponding to a request to turn off the computer system is not received. In some embodiments, the method further comprises: in response to detecting that the computer system has been placed on the body of the respective user: in accordance with a determination that the biometric information received via the one or more input devices does not correspond to the first user and that the computer system has been turned off or put into a sleep mode after detecting that the computer system has been removed from the body of the first user and prior to detecting that the computer system has been placed on the body of the respective user, forgoing display of the first user interface (e.g., forgoing display of the first user interface in either the first mode or the second mode) (in some embodiments, displaying a logged out user interface).

A handover criterion that is satisfied when the computer system is not turned off or put into a sleep mode after being removed from the body of the first user enhances security and can prevent unauthorized users from initiating sensitive operations (e.g., by preventing unauthorized access when a user does turn the computer system off or put the computer system into sleep mode). A handover criterion that is satisfied when the computer system is not turned off or put into a sleep mode after being removed from the body of the first user also enhances the operability of the device and makes the user-device interface more efficient (e.g., by restricting unauthorized access) which, additionally, reduces power usage and improves battery life of the device by limiting the performance of restricted operations.

In some embodiments, the set of handover criteria includes a fourth criterion that is satisfied when the first user (e.g., user 703) is a registered user (e.g., a user that is registered on the computer system and/or a user that is registered on a service). In some embodiments, the fourth criterion is not satisfied if the first user is an unregistered user (e.g., a guest, a user that is not registered on the computer system and/or a user that is not registered on a service). In some embodiments, the computer system being moved from being worn by a registered user to being worn by an unregistered user (e.g., a guest user) will result in the first user interface continuing to be displayed in the first mode. In some embodiments, the computer system subsequently being moved from being worn by the unregistered user to another unregistered user results in ceasing to display first user interface in the first mode (e.g., displaying the first user interface in a second mode). In some embodiments, the method further comprises: in response to detecting that the computer system has been placed on the body of the respective user: in accordance with a determination that the biometric information received via the one or more input devices does not correspond to the first user and that the first user is not a registered user, forgoing display of the first user interface (e.g., forgoing display of the first user interface in either the first mode or the second mode) (in some embodiments, displaying a logged out user interface).

A handover criterion that is satisfied when the first user is a registered user enhances security and can prevent unauthorized users from initiating sensitive operations (e.g., by preventing a guest/unauthorized user from providing access to another guest/unauthorized user). A handover criterion that is satisfied when the first user is a registered user also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system has been placed on the body of the respective user (1414), and in accordance with a determination that the biometric information received via the one or more input devices does not correspond to the first user and that the set of handover criteria has not been satisfied (1424), the computer system forgoes display of the first user interface (e.g., FIG. 13E, displaying user interface 714 instead of user interface 1304) (e.g., forgoing display of the first user interface in either the first mode or the second mode) (in some embodiments, displaying a logged out user interface). Forgoing display of the first user interface when biometric information does not correspond to the first user and the set of handover criteria has not been satisfied enhances security and can prevent unauthorized users from initiating sensitive operations. Forgoing display of the first user interface when biometric information does not correspond to the first user and the set of handover criteria has not been satisfied also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system has been placed on the body of the respective user, and in accordance with the determination that the biometric information received via the one or more input devices does not correspond to the first user and that the set of handover criteria has not been satisfied, and in accordance with a determination that biometric information received via the one or more input devices does not correspond to a previously-registered user (e.g., a user that has been previously registered on the computer system) (e.g., in accordance with a determination that the respective user is not a registered user), the computer system displays a user interface for unregistered users indicative of a determination that the respective user is not a registered user (e.g., user interface 718 of FIG. 7D).

Displaying the user interface for unregistered users based on a determination that biometric information does not correspond to a previously-registered user provides the user with feedback about the current state of the device (e.g., that the computer system has determined that the user is an unregistered user). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with the determination that the biometric information received via the one or more input devices does not correspond to the first user and that the set of handover criteria has not been satisfied, and in accordance with a determination that biometric information received via the one or more input devices corresponds to a second registered user (e.g., user 1103) different from the first user (e.g., user 703) (e.g., a user that has been previously registered on the computer system) (e.g., in accordance with a determination that the respective user is the second registered user), displaying a second user interface (e.g., personalized user interface 714 in FIG. 13E) different from the first user interface (e.g., user interface 1304), wherein the second user interface corresponds to the second registered user (e.g., a home user interface for the second user, and/or a previously displayed user interface for the second user). Displaying the second user interface based on a determination that biometric information corresponds to the second registered user provides the user with feedback about the current state of the device (e.g., that the computer system has identified the user as being the second registered user). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with a determination that the set of handover criteria has not been satisfied, and that the biometric information received via the one or more input devices corresponds to the first user (e.g., user 703) (e.g., in accordance with a determination that the respective user is the first user), the computer system displays, via the display generation component, the first user interface (e.g., user interface 1304) in the first mode with permitted access to the plurality of features associated with the first user (e.g., FIG. 13D). Displaying the first user interface in the first mode with permitted access based on a determination that the biometric information received via the one or more input devices corresponds to the first user provides the user the ability to resume his or her viewing experience without additional user input. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second mode with restricted access to one or more of the plurality of features associated with the first user further includes maintaining one or more user settings associated with the first user (e.g., an avatar associated with the first user, and/or device calibration settings associated with the first user (e.g., hand calibration settings, eye calibration settings, body calibration settings)). Maintaining one or more user settings associated with the first user allows the user to utilize the computer system without providing additional user inputs to apply one or more settings. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system is placed on the body of the respective user and while displaying the first user interface (e.g., user interface 1304), the computer system receives a navigational user input (e.g., a user input corresponding to a request to navigate within and/or from the first user interface) (e.g., a user input to navigate to (e.g., to display) a different application from the first application, a user input to navigate from the first user interface to a different user interface (e.g., to display a different user interface), a user input to navigate to a particular portion of the first user interface (e.g., to display a particular portion of the first user interface), a user input to access a particular feature within the first user interface (e.g., to display a particular feature within the first user interface), and/or a user input to access particular content within the first user interface (e.g., to display particular content within the first user interface)) (e.g., user input 1314, and/or a user input on any of icons 1306*b*, 1306*c*, 1306*d*). In response to receiving the navigational user input, and in accordance with a determination that the first user interface is displayed in the first mode with permitted access to the plurality of features associated with the first user, navigating through the user interface in accordance with the navigational user input (e.g., displaying a different application from the first application, displaying a different user interface from the first user interface, displaying a particular portion of the first user interface, displaying a particular feature of the first user interface, and/or displaying particular content within the first user interface) (e.g., user input 1314, when the first user interface is displayed in the first mode with permitted access, causes electronic device 700 to replace display of user interface 1304 with a home user interface). In response to receiving the navigational user input (e.g., user input 1314), and in accordance with a determination that the first user interface is displayed in the second mode with restricted access to one or more of the plurality of features associated with the first user, forgoing navigating through the user interface in accordance with the navigation user input (e.g., FIG. 13G).

Allowing for navigation within and/or from the first user interface when the first user interface is displayed in the first mode, and prohibiting navigation when the first user interface is displayed in the second mode enhances security. For example, prohibiting navigation when the first user interface is displaying in the second mode can prevent unauthorized users from initiating sensitive operations or accessing sensitive information. Allowing for navigation within and/or from the first user interface when the first user interface is displayed in the first mode, and prohibiting navigation when the first user interface is displayed in the second mode also enhances the operability of the device and makes the user-device interface more efficient (e.g., by restricting unauthorized access) which, additionally, reduces power usage and improves battery life of the device by limiting the performance of restricted operations.

In some embodiments, while the computer system is placed on the body of the respective user and while displaying the first user interface, the computer system receives a user input (e.g., user input 1314, user input 1316). In response to receiving the user input, and in accordance with a determination that the user input corresponds to a request to access a system control (e.g., user input 1316) (e.g., volume control, and/or display brightness control) (e.g., a user input to display a system control user interface (e.g., a volume control user interface and/or a display brightness user interface), a user input to modify a system control setting (e.g., a volume setting and/or a display brightness setting)), the computer system performs an operation associated with the system control (e.g., regardless of whether the first user interface is displayed in the first mode or the second mode). In response to receiving the user input, and in accordance with a determination that the user input corresponds to a request to access a non-system control and the first user interface is displayed in the first mode with permitted access to the plurality of features associated with the first user (e.g., FIG. 13A-13B), the computer system performs an operation associated with the non-system control. In response to receiving the user input, and in accordance with a determination that the user input corresponds to a request to access a non-system control and the first user interface is displayed in the second mode with restricted access to one or more of the plurality of features associated with the first user (e.g., user input 1314, FIG. 13G), the computer system forgoes performance of the operation associated with the non-system control.

In some embodiments, the method further comprises: in response to receiving the user input: in accordance with a determination that the user input is a navigational input (e.g., a user input corresponding to a request to navigate within and/or from the first user interface) (e.g., a user input to navigate to (e.g., to display) a different application from the first application, a user input to navigate from the first user interface to a different user interface (e.g., to display a different user interface), a user input to navigate to a particular portion of the first user interface (e.g., to display a particular portion of the first user interface), a user input to access a particular feature within the first user interface (e.g., to display a particular feature within the first user interface), and/or a user input to access particular content within the first user interface (e.g., to display particular content within the first user interface)): in accordance with a determination that the first user interface is displayed in the first mode with permitted access to the plurality of features associated with the first user, displaying a navigational effect corresponding to the navigational user input (e.g., displaying a different application from the first application, displaying a different user interface from the first user interface, displaying a particular portion of the first user interface, displaying a particular feature of the first user interface, and/or displaying particular content within the first user interface); and in accordance with a determination that the first user interface is displayed in the second mode with restricted access to one or more of the plurality of features associated with the first user, forgoing displaying the navigational effect corresponding to the navigation user input.

Providing a user with access to one or more system controls, while limiting access to other (e.g., more sensitive or user-confidential) aspects of the systems, enhances the operability of the device and makes the user-device interface more efficient (e.g., by allowing the user to configure the system for their own use, by helping the user to provide proper inputs and reducing user mistakes when operating/interacting with the device) which, additionally, reduces power usage and improves battery life of the device by enabling the user to use the device more quickly and efficiently.

In some embodiments, while the computer system is placed on the body of the respective user and while displaying the first user interface (e.g., user interface 1304), the computer system receives a user input. In response to receiving the user input, and in accordance with a determination that the user input corresponds to a request to access one or more accessibility settings (e.g., display size settings, accessibility zoom settings, accessibility gestures settings, and/or audio accessibility settings) (e.g., a request to display an accessibility settings user interface, a request to modify one or more accessibility settings), the computer system performs an operation associated with the one or more accessibility settings (e.g., regardless of whether the first user interface is displayed in the first mode or the second mode). In response to receiving the user input, and in accordance with a determination that the user input corresponds to a request to access a non-accessibility setting and the first user interface is displayed in the first mode with permitted access to the plurality of features associated with the first user (e.g., FIGS. 13A-13B), the computer system performs an operation associated with the non-accessibility setting. In response to receiving the user input, and in accordance with a determination that the user input corresponds to a request to access a non-accessibility setting and the first user interface is displayed in the second mode with restricted access to one or more of the plurality of features associated with the first user (e.g., FIGS. 13F-13K), forgoing performance of the operation associated with the non-accessibility setting.

In some embodiments, the method further comprises, in response to receiving the user input: in accordance with a determination that the user input is a navigational input (e.g., a user input corresponding to a request to navigate within and/or from the first user interface) (e.g., a user input to navigate to (e.g., to display) a different application from the first application, a user input to navigate from the first user interface to a different user interface (e.g., to display a different user interface), a user input to navigate to a particular portion of the first user interface (e.g., to display a particular portion of the first user interface), a user input to access a particular feature within the first user interface (e.g., to display a particular feature within the first user interface), and/or a user input to access particular content within the first user interface (e.g., to display particular content within the first user interface)): in accordance with a determination that the first user interface is displayed in the first mode with permitted access to the plurality of features associated with the first user, displaying a navigational effect corresponding to the navigational user input (e.g., displaying a different application from the first application, displaying a different user interface from the first user interface, displaying a particular portion of the first user interface, displaying a particular feature of the first user interface, and/or displaying particular content within the first user interface); and in accordance with a determination that the first user interface is displayed in the second mode with restricted access to one or more of the plurality of features associated with the first user, forgoing displaying the navigational effect corresponding to the navigation user input.

Providing a user with access to one or more accessibility settings, while limiting access to other (e.g., more sensitive or user-confidential) aspects of the systems, enhances the operability of the device and makes the user-device interface more efficient (e.g., by allowing the user to configure the system for their own use, by helping the user to provide proper inputs and reducing user mistakes when operating/ interacting with the device) which, additionally, reduces power usage and improves battery life of the device by enabling the user to use the device more quickly and efficiently.

In some embodiments, while the computer system is placed on the body of the first user and while the first user interface is displayed in the first mode with permitted access to the plurality of features associated with the first user (e.g., FIGS. 13A-13B), the computer system receives a user input corresponding to a request to enable one or more accessibility settings (e.g., display size settings, accessibility zoom settings, accessibility gestures settings, and/or audio accessibility settings). In response to the user input corresponding to a request to enable one or more accessibility settings, the computer system enables the one or more accessibility settings. While the one or more accessibility settings are enabled, the computer system detects, via the one or more input devices, that the computer system has been removed from the body of the first user (e.g., user 703, FIG. 13C) (e.g., the user has stopped wearing the computer system). After detecting that the computer system has been removed from the body of the first user, detecting, via the one or more input devices, that the computer system has been placed on the body of a second respective user (e.g., FIGS. 13D, 13E, 13F) (e.g., that the second respective user has worn the computer system). In response to detecting that the computer system has been placed on the body of the second respective user, and in accordance with a determination that biometric information received via the one or more input devices (e.g., a fingerprint, an image (e.g., a photograph and/or a scan) representative of the face of the respective user, and/or iris identification information (e.g., iris scan information)) (in some embodiments, biometric information is received while the computer system is being worn by the second respective user) corresponds to the first user (e.g., user 703, FIG. 13D) (e.g., in accordance with a determination that the second respective user is the first user (e.g., regardless of whether the set of handover criteria has been satisfied)), the computer system displays, via the display generation component, the first user interface (e.g., user interface 1304) in the first mode with permitted access to the plurality of features associated with the first user while maintaining the one or more accessibility settings in an enabled state.

In response to detecting that the computer system has been placed on the body of the second respective user, and in accordance with a determination that the biometric information received via the one or more input devices does not correspond to the first user (e.g., in accordance with a determination that the second respective user is not the first user), and that a set of handover criteria has been satisfied (e.g., FIG. 13F), the computer system displays, via the display generation component, the first user interface (e.g., user interface 1304) in a second mode (e.g., a restricted mode, a guest mode, and/or a handover mode) with restricted access to one or more of the plurality of features associated with the first user while maintaining the one or more accessibility settings in the enabled state. In some embodiments, the first user can enable one or more accessibility settings (e.g., making fonts larger, turning on accessibility gesture settings) while in the first mode before handing the device to the respective user. As a result, the one or more accessibility settings remain enabled for the benefit of the respective user, even while in the second mode.

Maintaining one or more accessibility settings set by the first user allows the user to utilize the computer system without providing additional user inputs to apply one or more settings. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the first user interface (e.g., user interface 1304) (and, optionally, subsequent to detecting that the computer system has been placed on the body of the respective user), the computer system receives information (e.g., an email message, an SMS message, an instant message, an alarm, calendar information, and/or other information). In response to receiving the information, and in accordance with a determination that the first user interface is displayed in the first mode with permitted access to the plurality of features associated with the first user (e.g., FIG. 13B), the computer system provides (e.g., displaying, outputting audio, and/or performing a tactile output) a notification (e.g., notification 1308) corresponding to the received information (e.g., a visual indication of the received email, SMS message, instant message, alarm, calendar information, and/or other information). In response to receiving the information, and in accordance with a determination that the first user interface is displayed in the second mode with restricted access to one or more of the plurality of features associated with the first user (e.g., FIGS. 13F-13K), the computer system forgoes providing (e.g., displaying, outputting audio, and/or performing a tactile output) the notification corresponding to the received information (e.g., FIG. 13K, device 700 forgoes providing a notification corresponding to a new message for the first user 703). In some embodiments, in accordance with a determination that the first user interface is displayed in the first mode, providing (e.g., displaying) the notification (e.g., a visual indication of the received email) corresponding to the received notification information. In some embodiments, displaying the first user interface in the second mode with restricted access to one or more of the plurality of features associated with the first user includes forgoing display of one or more notifications for the first user (e.g., the user viewing the user interface in the second mode with restricted access does not see notifications that would have been displayed for the first user in the first mode).

Forgoing providing notifications when the computer system is operating in the second mode with restricted access enhances security and can prevent unauthorized users from initiating sensitive operations (e.g., by preventing a user that is not the first user from viewing notifications intended for the first user). Forgoing providing notifications when the computer system is operating in the second mode with restricted access also enhances the operability of the device and makes the user-device interface more efficient (e.g., by restricting unauthorized access) which, additionally, reduces power usage and improves battery life of the device by limiting the performance of restricted operations.

In some embodiments, the notification that was not provided during display of the first user interface in the second mode with restricted access is provided on an external computer system (e.g., a smart phone, a smart watch, a tablet, and/or a wearable device) (e.g. notification 1360 on device 1350, FIG. 13K) that is different from the computer system and that is associated with the first user. Providing a notification on an external computer system provides the user with feedback about the current state of the device (e.g., that the computer system has received information and/or a notification). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Providing a notification on an external computer system while a user other than the first user is using the computer system enhances security. For example, providing a notification on an external computer system can prevent unauthorized users from viewing sensitive information. Providing a notification on an external computer system while a user other than the first user is using the computer system also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system has been placed on the body of the respective user, and in accordance with a determination that the biometric information received via the one or more input devices does not correspond to the first user (e.g., FIG. 13E, electronic device 700 determines that biometric information for user 1103 does not correspond to the first user (e.g., user 703)) (in some embodiments, regardless of whether the set of handover criteria have been satisfied) the computer system switches eye tracking calibration settings from a first set of eye tracking calibration settings specific to the first user (e.g., eye calibration settings specific to user 703) to a second set of eye tracking calibration settings different from the first set of eye tracking calibration settings (e.g., a generic and/or default set of eye tracking calibration settings, and/or a set of eye tracking calibration settings specific to the respective user). In some embodiments, the method further comprises: in response to detecting that the computer system has been placed on the body of the respective user: in accordance with a determination that the biometric information received via the one or more input devices corresponds to the first user, maintaining the first set of eye tracking calibration settings specific to the first user.

Automatically switching eye tracking calibration settings from a first set of eye tracking calibration settings to a second set based on a determination that the biometric information does not correspond to the first user provides the user with the ability to apply various settings (e.g., eye tracking calibration settings) without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically switching eye tracking calibration settings from a first set of eye tracking calibration settings to a second set based on a determination that the biometric information does not correspond to the first user makes device calibration more accurate by removing calibration corrections that may be specific to the first user when a different user is using the computer system. Improving calibration accuracy enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with a determination that the biometric information received via the one or more input devices does not correspond to the first user (e.g., FIG. 13E, electronic device 700 determines that biometric information for user 1103 does not correspond to the first user (e.g., user 703)) (in some embodiments, regardless of whether the set of handover criteria have been satisfied), the computer system switches hand tracking calibration settings from a first set of hand tracking calibration settings specific to the first user (e.g., a set of hand tracking calibration settings specific to user 703) to a second set of hand tracking calibration settings different from the first set of hand tracking calibration settings (e.g., a generic and/or default set of hand tracking calibration settings, and/or a set of hand tracking calibration settings specific to the respective user). In some embodiments, the method further comprises: in response to detecting that the computer system has been placed on the body of the respective user: in accordance with a determination that the biometric information received via the one or more input devices corresponds to the first user, maintaining the first set of hand tracking calibration settings specific to the first user. In some embodiments, the method further comprises: in response to detecting that the computer system has been placed on the body of the respective user: in accordance with a determination that the biometric information received via the one or more input devices corresponds to the first user, maintaining the first set of eye tracking calibration settings specific to the first user.

Automatically switching hand tracking calibration settings from a first set of hand tracking calibration settings to a second set based on a determination that the biometric information does not correspond to the first user provides the user with the ability to apply various settings (e.g., hand tracking calibration settings) without explicitly requesting application of those settings. Performing an operation when a set of conditions has been met without requiring further user input enhances the operability of the device (e.g., by performing operations without additional user input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Automatically switching hand tracking calibration settings from a first set of hand tracking calibration settings to a second set based on a determination that the biometric information does not correspond to the first user makes device calibration more accurate by removing calibration corrections that may be specific to the first user when a different user is using the computer system. Improving calibration accuracy enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface (e.g., user interface 1304) is displayed in the second mode with restricted access on a first display portion of the computer system (e.g. a first display, an interior display). In response to detecting that the computer system has been placed on the body of the respective user, and in accordance with a determination that the biometric information received via the one or more input devices does not correspond to the first user, and that the set of handover criteria has been satisfied, and that the computer system is being operated in the second mode with restricted access to one or more of the plurality of features associated with the first user, the computer system displays, on a second display portion of the computer system different from the first display portion (e.g., a second display separate from and different from the first display, an exterior display), an indication of what is being displayed on the first display portion. In some embodiments, the method further comprises: in response to detecting that the computer system has been placed on the body of the respective user: in accordance with the determination that the biometric information received via the one or more input devices corresponds to the first user, forgoing display, on the second display portion, of the indication of what is being displayed on the first display portion. Displaying, on a second display portion of the computer system, an indication of what is being displayed on the first display portion provides the user with feedback about the current state of the device (e.g., what is being displayed on the first display portion of the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, on an external portion (e.g., on a second display) of the computer system, an indication of a currently signed-in user (e.g., displaying a name, a username, and/or an avatar (e.g., avatar 1302) corresponding to the user that is currently signed into the computer system). In some embodiments, in accordance with the determination that the biometric information received via the one or more input devices does not correspond to the first user (e.g., in accordance with a determination that the respective user is not the first user), and that the set of handover criteria has been satisfied, the computer system displays, on the external portion of the computer system, an indication that the first user is currently signed in to the computer system even while the computer system is placed on the body of the respective user that is not the first user. In some embodiments, the computer system is a head-mounted system (e.g., headset). In some embodiments, the head-mounted system has an internal display displaying a user interface (e.g., user interface 1304) and an external display (e.g., separate from the internal display) displaying the indication of the currently signed-in user. In some embodiments, the internal display is visible to (e.g., visible only to) a user of the head-mounted system. In some embodiments, the external display is visible to other individuals that are not the user of the head-mounted system. In some embodiments, the external display is not visible to the user of the head-mounted system while using the head-mounted system. Displaying, on an external portion of the computer system, an indication of a currently signed-in user provides the user with feedback about the current state of the device (e.g., who is currently signed into the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system has been placed on the body of the respective user, and in accordance with the determination that the biometric information received via the one or more input devices does not correspond to the first user, and that the set of handover criteria has been satisfied, the computer system (e.g., electronic device 700) transmits, to a second computer system of the first user (e.g., electronic device 1350) (e.g., a smart phone, a tablet, a desktop computer, a laptop computer, a smart watch, and/or a wearable device), a notification (e.g., notification 1354) that the computer system is being operated in the second mode with restricted access to one or more of the plurality of features associated with the first user. In some embodiments, in response to detecting that the computer system has been placed on the body of the respective user, and in accordance with the determination that the biometric information received via the one or more input devices does not correspond to the first user, and that the set of handover criteria has been satisfied, the computer system initiates a process to display, on an external computer system corresponding to the first user (e.g., a smart phone, a tablet, a desktop computer, a laptop computer, a smart watch, and/or a wearable device) and different from the computer system, a notification that the computer system is being operated in the second mode with restricted access to one or more of the plurality of features associated with the first user.

In some embodiments, in response to detecting that the computer system has been placed on the body of the respective user, and in accordance with the determination that the biometric information received via the one or more input devices corresponds to the first user, the computer system forgoes transmitting the notification that the computer system is being operated in the second mode with restricted access to one or more of the plurality of features associated with the first user. In some embodiments, in response to detecting that the computer system has been placed on the body of the respective user, and in accordance with a determination that the biometric information received via the one or more input devices does not correspond to the first user, and that the set of handover criteria has not been satisfied, the computer system forgoes transmitting the notification that the computer system is being operated in the second mode with restricted access to one or more of the plurality of features associated with the first user.

Transmitting a notification that the computer system is being operated in the second mode with restricted access provides the user with feedback about the current state of the device (e.g., that the computer system is being operated in the second mode with restricted access). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Transmitting a notification to a second computer system that the computer system is being operated in the second mode with restricted access enhances security. For example, transmitting a notification to the second computer system that the computer system is being operated in the second mode can notify a user if their computer system is being used by other users, and can prevent unauthorized users from viewing sensitive information or performing sensitive operations. Transmitting a notification to a second computer system that the computer system is being operated in the second mode with restricted access also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system has been placed on the body of the respective user, and in accordance with the determination that the biometric information received via the one or more input devices does not correspond to the first user, and that the set of handover criteria has been satisfied, the computer system transmits, to a second computer system of the first user (e.g., electronic device 1350) (e.g., a smart phone, a tablet, a desktop computer, a laptop computer, a smart watch, and/or a wearable device), a visual indication of content that is being displayed by the computer system while the computer system is operated in the second mode with restricted access to one or more features of the plurality of features associated with the first user (e.g., user interface 1358 on electronic device 1350) (e.g., duplicating, on an external computer system, content that is being displayed by the computer system while the computer system is being operated in the second mode with restricted access).

In some embodiments, in response to detecting that the computer system has been placed on the body of the respective user, and in accordance with the determination that the biometric information received via the one or more input devices does not correspond to the first user, and that the set of handover criteria has been satisfied, the computer system initiates a process to display, on an external computer system corresponding to the first user (e.g., a smart phone, a tablet, a desktop computer, a laptop computer, a smart watch, and/or a wearable device) and different from the computer system, content being displayed by the computer system while the computer system is operated in the second mode with restricted access to one or more features of the plurality of features associated with the first user (e.g., duplicating, on an external computer system, content that is being displayed by the computer system while the computer system is being operated in the second mode with restricted access).

In some embodiments, in response to detecting that the computer system has been placed on the body of the respective user, and in accordance with the determination that the biometric information received via the one or more input devices corresponds to the first user, the computer system forgoes transmitting, to the second computer system of the first user, content being displayed by the computer system. In some embodiments, in response to detecting that the computer system has been placed on the body of the respective user, and in accordance with a determination that the biometric information received via the one or more input devices does not correspond to the first user, and that the set of handover criteria has not been satisfied, the computer system forgoes transmitting, to the second computer system of the first user, content being displayed by the computer system.

Transmitting, to a second computer system of the first user, content being displayed on the computer system provides the user with feedback about the current state of the device (e.g., what is being displayed on the computer system). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Transmitting, to a second computer system of the first user, content being displayed on the computer system enhances security. For example, transmitting content being displayed on the computer system to a second computer system of the first user allows the first user to know what information is being presented on the computer system, and can prevent unauthorized users from viewing sensitive information or performing sensitive operations. Transmitting, to a second computer system of the first user, content being displayed on the computer system also enhances the operability of the device and makes the user-device interface more efficient (e.g., by restricting unauthorized access) which, additionally, reduces power usage and improves battery life of the device by limiting the performance of restricted operations.

In some embodiments, in response to detecting that the computer system has been placed on the body of the respective user, and in accordance with the determination that the biometric information received via the one or more input devices does not correspond to the first user, and that the set of handover criteria has been satisfied, the computer system displays, concurrently with the first user interface in the second mode with restricted access (e.g., user interface 1304 in FIGS. 13F-13K), a visual indication that the computer system is being operated in the second mode with restricted access (e.g., indication 1310) (e.g., displaying text and/or a visual symbol indicating that the computer system is being operated in the second mode with restricted access). In some embodiments, in response to detecting that the computer system has been placed on the body of the respective user, and in accordance with a determination that the biometric information received via the one or more input devices corresponds to the first user, the computer system forgoes display of the visual indication that the computer system is being operated in the second mode with restricted access (e.g., FIG. 13D).

Displaying a visual indication that the computer system is being operated in the second mode with restricted access provides the user with feedback about the current state of the device (e.g., that the computer system is being operated in the second mode with restricted access). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying a visual indication that the computer system is being operated in the second mode with restricted access enhances security. For example, displaying a visual indication that the computer system is being operated in the second mode with restricted access notifies the first user that the computer system is being operated by another user, and can prevent unauthorized users from viewing sensitive information or performing sensitive operations. Displaying a visual indication that the computer system is being operated in the second mode with restricted access also enhances the operability of the device and makes the user-device interface more efficient (e.g., by restricting unauthorized access) which, additionally, reduces power usage and improves battery life of the device by limiting the performance of restricted operations.

Note that details of the processes described above with respect to method 1400 (e.g., FIGS. 14A-14B) are also applicable in an analogous manner to the methods described above. For example, methods 800, 1000, and/or 1200 optionally include one or more of the characteristics of the various methods described above with reference to method 1400. For example, in method 800, enabling and/or forgoing enabling the computer system to be used with one or more settings associated with the first user account associated with the first registered user is optionally performed based on a determination as to whether or not handover criteria have been satisfied. In another example, user-specific device calibration settings and/or avatars, as recited in methods 1000 and 1200, respectively, can be selectively applied when a device is handed off between different users. For brevity, these details are not repeated herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user authentication, the present technology can be configured to allow users to select to "opt in" or "opt out" of participation in the collection of personal information data during registration for services or anytime thereafter. In another example, users can select not to provide personal information, such as biometric information, for user authentication. In yet another example, users can select to limit the length of time personal information is maintained or entirely prohibit the collection of personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available, or publicly available information.

What is claimed is:

1. A computer system, comprising:
   a display generation component;
   one or more input devices;
   one or more processors; and
   memory storing one or more programs configured to be executed by the one or more processors, the one or more programs including instructions for:
      while at least a portion of the computer system is placed on a body of a first registered user, enabling the computer system to be operated in a first mode that includes permitted access to a plurality of features associated with the first registered user, and with one or more settings associated with a first user account associated with the first registered user, wherein enabling the computer system to be operated with the one or more settings associated with the first user account includes loading first gaze calibration information associated with the first user account, wherein the first gaze calibration information is used by the computer system in conjunction with one or more user inputs by the first registered user to respond to the one or more user inputs by the first registered user;
      subsequent to enabling the computer system to be used in the first mode and with the one or more settings associated with the first user account associated with the first registered user, detecting that at least a portion of the computer system has been placed on a body of a respective user;
      in response to detecting that at least a portion of the computer system has been placed on the body of the respective user:
         in accordance with a determination that guest user criteria are satisfied, including a determination that biometric information received from the respective user does not correspond to the first registered user:
            receiving one or more gaze calibration inputs from the respective user;
            determining guest gaze calibration information based on the one or more gaze calibration inputs from the respective user; and
            enabling the computer system to be operated in a second mode that includes restricted access to one or more of the plurality of features associated with the first registered user, and with one or more guest settings, wherein enabling the computer system to be operated with the one or more guest settings includes loading the guest gaze calibration information, wherein the guest gaze calibration information is different from the first gaze calibration information and is used by the computer system in conjunction with one or more user inputs by the respective user to respond to the one or more user inputs by the respective user;
      subsequent to enabling the computer system to be used in the second mode and with the one or more guest settings, detecting that at least a portion of the computer system has been placed on a body of a second respective user; and
      in response to detecting that at least a portion of the computer system has been placed on the body of the second respective user:
         in accordance with a determination that biometric information received from the second respective user corresponds to the first registered user, enabling the computer system to be operated in the first mode and with the one or more settings associated with the first user account associated with the first registered user, including loading the first gaze calibration information associated with the first user account.

2. The computer system of claim 1, the one or more programs further including instructions for:
   in response to detecting that at least a portion of the computer system has been placed on the body of the second respective user:
      in accordance with a determination that the biometric information received from the second respective user does not correspond to the first registered user and that the biometric information received from the second respective user corresponds to a second registered user different from the first registered user, enabling the computer system to be used with one or more settings associated with a second user account different from the first user account and associated with the second registered user.

3. The computer system of claim 1, the one or more programs further including instructions for:
   in response to detecting that at least a portion of the computer system has been placed on the body of the second respective user:
      in accordance with a determination that the biometric information received from the second respective user does not correspond to a registered user, forgoing logging the computer system into any user account.

4. The computer system of claim 1, the one or more programs further including instructions for:
   while the computer system is enabled to be used in the first mode and with the one or more settings associated with the first user account associated with the first registered user, detecting that the at least the portion of the computer system has been removed from the body of the first registered user; and
   in response to detecting that the at least the portion of the computer system has been removed from the body of the first registered user, ceasing to enable the computer system to be used in the first mode and with the one or more settings associated with the first user account associated with the first registered user.

5. The computer system of claim 1, wherein:
   the biometric information received from the respective user is iris identification information;
   the biometric information received from the second respective user is iris identification information;
   the determination that biometric information received from the second respective user corresponds to the first registered user comprises a determination that iris identification information received from the second respective user corresponds to the first registered user; and the determination that biometric information received from the respective user does not correspond to the first registered user comprises a determination that iris identification information from the respective user does not correspond to the first registered user.

6. The computer system of claim 1, the one or more programs further including instructions for:
in response to detecting that at least a portion of the computer system has been placed on the body of the second respective user:
in accordance with the determination that the biometric information received from the second respective user corresponds to a respective registered user, displaying a visual indication that the computer system has been enabled to be used with one or more settings associated with the respective registered user.

7. The computer system of claim 1, the one or more programs further including instructions for:
in response to detecting that at least a portion of the computer system has been placed on the body of the second respective user:
in accordance with a determination that the biometric information received from the second respective user does not correspond to a registered user, displaying a user selection user interface comprising a plurality of selectable options including:
a first selectable option corresponding to the first registered user; and
a second selectable option corresponding to a second registered user different from the first registered user.

8. The computer system of claim 7, the one or more programs further including instructions for:
while displaying the user selection user interface comprising the plurality of selectable options, receiving a user input corresponding to selection of a respective selectable option of the plurality of selectable options, the respective selectable option corresponding to a respective registered user;
after receiving the user input corresponding to selection of the respective selectable option, receiving, via the one or more input devices, updated biometric information; and
in response to receiving the updated biometric information:
in accordance with a determination that biometric information received via the one or more input devices corresponds to the respective registered user, enabling the computer system to be used with one or more settings associated with a respective user account associated with the respective registered user; and
in accordance with a determination that biometric information received via the one or more input devices does not correspond to the respective registered user, forgoing enabling the computer system to be used with the one or more settings associated with the respective user account associated with the respective registered user.

9. The computer system of claim 7, the one or more programs further including instructions for:
while displaying the user selection user interface comprising the plurality of selectable options, receiving a user input corresponding to selection of a respective selectable option of the plurality of selectable options, the respective selectable option corresponding to a respective registered user;
after receiving the user input corresponding to selection of the respective selectable option and in accordance with a biometric criterion not being met:
in accordance with a determination that a first setting of the respective registered user is not enabled, displaying, via the display generation component, a passcode entry user interface, and
in accordance with a determination that the first setting of the respective registered user is enabled, performing automatic biometric authentication, including:
in accordance with a determination that updated biometric information received via the one or more input devices corresponds to the respective registered user, enabling the computer system to be used with one or more settings associated with a respective user account associated with the respective registered user; and
in accordance with a determination that the updated biometric information received via the one or more input devices does not correspond to the respective registered user, forgoing enabling the computer system to be used with one or more settings associated with the respective user account associated with the respective registered user.

10. The computer system of claim 1, wherein enabling the computer system to be operated with the one or more settings associated with the first user account further includes loading hand movement calibration settings associated with the first user account, wherein the hand movement calibration settings are used by the computer system in conjunction with one or more user inputs by the first registered user to respond to the one or more user inputs by the first registered user.

11. A non-transitory computer-readable storage medium storing one or more programs configured to be executed by one or more processors of a computer system that is in communication with a display generation component and one or more input devices, the one or more programs including instructions for:
while at least a portion of the computer system is placed on a body of a first registered user, enabling the computer system to be operated in a first mode that includes permitted access to a plurality of features associated with the first registered user, and with one or more settings associated with a first user account associated with the first registered user, wherein enabling the computer system to be operated with the one or more settings associated with the first user account includes loading first gaze calibration information associated with the first user account, wherein the first gaze calibration information is used by the computer system in conjunction with one or more user inputs by the first registered user to respond to the one or more user inputs by the first registered user;
subsequent to enabling the computer system to be used in the first mode and with the one or more settings associated with the first user account associated with the first registered user, detecting that at least a portion of the computer system has been placed on a body of a respective user;
in response to detecting that at least a portion of the computer system has been placed on the body of the respective user:

in accordance with a determination that guest user criteria are satisfied, including a determination that biometric information received from the respective user does not correspond to the first registered user:
receiving one or more gaze calibration inputs from the respective user;
determining guest gaze calibration information based on the one or more gaze calibration inputs from the respective user; and
enabling the computer system to be operated in a second mode that includes restricted access to one or more of the plurality of features associated with the first registered user, and with one or more guest settings, wherein enabling the computer system to be operated with the one or more guest settings includes loading the guest gaze calibration information, wherein the guest gaze calibration information is different from the first gaze calibration information and is used by the computer system in conjunction with one or more user inputs by the respective user to respond to the one or more user inputs by the respective user;
subsequent to enabling the computer system to be used in the second mode and with the one or more guest settings, detecting that at least a portion of the computer system has been placed on a body of a second respective user; and
in response to detecting that at least a portion of the computer system has been placed on the body of the second respective user:
in accordance with a determination that biometric information received from the second respective user corresponds to the first registered user, enabling the computer system to be operated in the first mode and with the one or more settings associated with the first user account associated with the first registered user, including loading the first gaze calibration information associated with the first user account.

12. The non-transitory computer-readable storage medium of claim 11, the one or more programs further including instructions for:
in response to detecting that at least a portion of the computer system has been placed on the body of the second respective user:
in accordance with a determination that the biometric information received from the second respective user does not correspond to the first registered user and that the biometric information received from the second respective user corresponds to a second registered user different from the first registered user, enabling the computer system to be used with one or more settings associated with a second user account different from the first user account and associated with the second registered user.

13. The non-transitory computer-readable storage medium of claim 11, the one or more programs further including instructions for:
in response to detecting that at least a portion of the computer system has been placed on the body of the second respective user:
in accordance with a determination that the biometric information received from the second respective user does not correspond to a registered user, forgoing logging the computer system into any user account.

14. The non-transitory computer-readable storage medium of claim 11, the one or more programs further including instructions for:

while the computer system is enabled to be used in the first mode and with the one or more settings associated with the first user account associated with the first registered user, detecting that the at least the portion of the computer system has been removed from the body of the first registered user; and
in response to detecting that the at least the portion of the computer system has been removed from the body of the first registered user, ceasing to enable the computer system to be used in the first mode and with the one or more settings associated with the first user account associated with the first registered user.

15. The non-transitory computer-readable storage medium of claim 11, wherein:
the biometric information received from the respective user is iris identification information;
the biometric information received from the second respective user is iris identification information;
the determination that biometric information received from the second respective user corresponds to the first registered user comprises a determination that iris identification information received from the second respective user corresponds to the first registered user; and
the determination that biometric information received from the respective user does not correspond to the first registered user comprises a determination that iris identification information from the respective user does not correspond to the first registered user.

16. The non-transitory computer-readable storage medium of claim 11, the one or more programs further including instructions for:
in response to detecting that at least a portion of the computer system has been placed on the body of the second respective user:
in accordance with the determination that the biometric information received from the second respective user corresponds to a respective registered user, displaying a visual indication that the computer system has been enabled to be used with one or more settings associated with the respective registered user.

17. The non-transitory computer-readable storage medium of claim 11, the one or more programs further including instructions for:
in response to detecting that at least a portion of the computer system has been placed on the body of the second respective user:
in accordance with a determination that the biometric information received from the second respective user does not correspond to a registered user, displaying a user selection user interface comprising a plurality of selectable options including:
a first selectable option corresponding to the first registered user; and
a second selectable option corresponding to a second registered user different from the first registered user.

18. The non-transitory computer-readable storage medium of claim 17, the one or more programs further including instructions for:
while displaying the user selection user interface comprising the plurality of selectable options, receiving a user input corresponding to selection of a respective selectable option of the plurality of selectable options, the respective selectable option corresponding to a respective registered user;

after receiving the user input corresponding to selection of the respective selectable option, receiving, via the one or more input devices, updated biometric information; and in response to receiving the updated biometric information:
in accordance with a determination that biometric information received via the one or more input devices corresponds to the respective registered user, enabling the computer system to be used with one or more settings associated with a respective user account associated with the respective registered user; and
in accordance with a determination that biometric information received via the one or more input devices does not correspond to the respective registered user, forgoing enabling the computer system to be used with the one or more settings associated with the respective user account associated with the respective registered user.

19. The non-transitory computer-readable storage medium of claim 17, the one or more programs further including instructions for:
while displaying the user selection user interface comprising the plurality of selectable options, receiving a user input corresponding to selection of a respective selectable option of the plurality of selectable options, the respective selectable option corresponding to a respective registered user;
after receiving the user input corresponding to selection of the respective selectable option and in accordance with a biometric criterion not being met:
in accordance with a determination that a first setting of the respective registered user is not enabled, displaying, via the display generation component, a passcode entry user interface, and
in accordance with a determination that the first setting of the respective registered user is enabled, performing automatic biometric authentication, including:
in accordance with a determination that updated biometric information received via the one or more input devices corresponds to the respective registered user, enabling the computer system to be used with one or more settings associated with a respective user account associated with the respective registered user; and
in accordance with a determination that the updated biometric information received via the one or more input devices does not correspond to the respective registered user, forgoing enabling the computer system to be used with one or more settings associated with the respective user account associated with the respective registered user.

20. The non-transitory computer-readable storage medium of claim 11, wherein enabling the computer system to be operated with the one or more settings associated with the first user account further includes loading hand movement calibration settings associated with the first user account, wherein the hand movement calibration settings are used by the computer system in conjunction with one or more user inputs by the first registered user to respond to the one or more user inputs by the first registered user.

21. A method, comprising:
at a computer system that is in communication with a display generation component and one or more input devices:
while at least a portion of the computer system is placed on a body of a first registered user, enabling the computer system to be operated in a first mode that includes permitted access to a plurality of features associated with the first registered user, and with one or more settings associated with a first user account associated with the first registered user, wherein enabling the computer system to be operated with the one or more settings associated with the first user account includes loading first gaze calibration information associated with the first user account, wherein the first gaze calibration information is used by the computer system in conjunction with one or more user inputs by the first registered user to respond to the one or more user inputs by the first registered user;
subsequent to enabling the computer system to be used in the first mode and with the one or more settings associated with the first user account associated with the first registered user, detecting that at least a portion of the computer system has been placed on a body of a respective user;
in response to detecting that at least a portion of the computer system has been placed on the body of the respective user:
in accordance with a determination that guest user criteria are satisfied, including a determination that biometric information received from the respective user does not correspond to the first registered user:
receiving one or more gaze calibration inputs from the respective user;
determining guest gaze calibration information based on the one or more gaze calibration inputs from the respective user; and
enabling the computer system to be operated in a second mode that includes restricted access to one or more of the plurality of features associated with the first registered user, and with one or more guest settings, wherein enabling the computer system to be operated with the one or more guest settings includes loading the guest gaze calibration information, wherein the guest gaze calibration information is different from the first gaze calibration information and is used by the computer system in conjunction with one or more user inputs by the respective user to respond to the one or more user inputs by the respective user;
subsequent to enabling the computer system to be used in the second mode and with the one or more guest settings, detecting that at least a portion of the computer system has been placed on a body of a second respective user; and
in response to detecting that at least a portion of the computer system has been placed on the body of the second respective user:
in accordance with a determination that biometric information received from the second respective user corresponds to the first registered user, enabling the computer system to be operated in the first mode and with the one or more settings associated with the first user account associated with the first registered user, including loading the first gaze calibration information associated with the first user account.

22. The method of claim 21, further comprising:
in response to detecting that at least a portion of the computer system has been placed on the body of the second respective user:
in accordance with a determination that the biometric information received from the second respective user does not correspond to the first registered user and that the biometric information received from the second respective user corresponds to a second registered user different from the first registered user, enabling the computer system to be used with one or more settings associated with a second user account different from the first user account and associated with the second registered user.

23. The method of claim 21, further comprising:
in response to detecting that at least a portion of the computer system has been placed on the body of the second respective user:
in accordance with a determination that the biometric information received from the second respective user does not correspond to a registered user, forgoing logging the computer system into any user account.

24. The method of claim 21, further comprising:
while the computer system is enabled to be used in the first mode and with the one or more settings associated with the first user account associated with the first registered user, detecting that the at least the portion of the computer system has been removed from the body of the first registered user; and
in response to detecting that the at least the portion of the computer system has been removed from the body of the first registered user, ceasing to enable the computer system to be used in the first mode and with the one or more settings associated with the first user account associated with the first registered user.

25. The method of claim 21, wherein:
the biometric information received from the respective user is iris identification information;
the biometric information received from the second respective user is iris identification information;
the determination that biometric information received from the second respective user corresponds to the first registered user comprises a determination that iris identification information received from the second respective user corresponds to the first registered user; and
the determination that biometric information received from the respective user does not correspond to the first registered user comprises a determination that iris identification information from the respective user does not correspond to the first registered user.

26. The method of claim 21, further comprising:
in response to detecting that at least a portion of the computer system has been placed on the body of the second respective user:
in accordance with the determination that the biometric information received from the second respective user corresponds to a respective registered user, displaying a visual indication that the computer system has been enabled to be used with one or more settings associated with the respective registered user.

27. The method of claim 21, further comprising:
in response to detecting that at least a portion of the computer system has been placed on the body of the second respective user:
in accordance with a determination that the biometric information received from the second respective user does not correspond to a registered user, displaying a user selection user interface comprising a plurality of selectable options including:
a first selectable option corresponding to the first registered user; and
a second selectable option corresponding to a second registered user different from the first registered user.

28. The method of claim 27, further comprising:
while displaying the user selection user interface comprising the plurality of selectable options, receiving a user input corresponding to selection of a respective selectable option of the plurality of selectable options, the respective selectable option corresponding to a respective registered user;
after receiving the user input corresponding to selection of the respective selectable option, receiving, via the one or more input devices, updated biometric information; and
in response to receiving the updated biometric information:
in accordance with a determination that biometric information received via the one or more input devices corresponds to the respective registered user, enabling the computer system to be used with one or more settings associated with a respective user account associated with the respective registered user; and
in accordance with a determination that biometric information received via the one or more input devices does not correspond to the respective registered user, forgoing enabling the computer system to be used with the one or more settings associated with the respective user account associated with the respective registered user.

29. The method of claim 27, further comprising:
while displaying the user selection user interface comprising the plurality of selectable options, receiving a user input corresponding to selection of a respective selectable option of the plurality of selectable options, the respective selectable option corresponding to a respective registered user;
after receiving the user input corresponding to selection of the respective selectable option and in accordance with a biometric criterion not being met:
in accordance with a determination that a first setting of the respective registered user is not enabled, displaying, via the display generation component, a passcode entry user interface, and
in accordance with a determination that the first setting of the respective registered user is enabled, performing automatic biometric authentication, including:
in accordance with a determination that updated biometric information received via the one or more input devices corresponds to the respective registered user, enabling the computer system to be used with one or more settings associated with a respective user account associated with the respective registered user; and
in accordance with a determination that the updated biometric information received via the one or more input devices does not correspond to the respective registered user, forgoing enabling the computer system to be used with one or more settings associated with the respective user account associated with the respective registered user.

30. The method of claim 21, wherein enabling the computer system to be operated with the one or more settings associated with the first user account further includes loading hand movement calibration settings associated with the first user account, wherein the hand movement calibration settings are used by the computer system in conjunction with one or more user inputs by the first registered user to respond to the one or more user inputs by the first registered user.

* * * * *